United States Patent [19]
Sankrithi

[11] Patent Number: 6,065,798
[45] Date of Patent: May 23, 2000

[54] MOTOR VEHICLE MEANS FOR CARRYING PASSENGERS AND CARGO

[75] Inventor: Mithra M. K. V. Sankrithi, Seattle, Wash.

[73] Assignee: RSV Invention Enterprises, Federal Way, Wash.

[21] Appl. No.: 08/923,904

[22] Filed: Sep. 4, 1997

[51] Int. Cl.$^7$ ............................................. B60P 3/00

[52] U.S. Cl. ..................... 296/183; 296/64; 296/26.09; 296/26.13; 296/37.6

[58] Field of Search .................. 296/10, 64, 19, 296/183, 185, 26.09, 26.13, 37.6; D12/96, 98

[56] References Cited

U.S. PATENT DOCUMENTS

| | | | |
|---|---|---|---|
| 2,063,388 | 12/1936 | Larsen | 296/64 |
| 2,324,508 | 7/1943 | Johnson | 296/64 X |
| 4,303,271 | 12/1981 | Law | 296/64 X |

FOREIGN PATENT DOCUMENTS 363173736  7/1988  Japan ........................... 296/64

*Primary Examiner*—Dennis H. Pedder

[57] ABSTRACT

The invention provides a new class of motor vehicle means for carrying passengers and cargo. This new class of motor vehicle provides, in an inventive way, a combination of the passenger-carrying advantages offered by van or minivan type vehicles and the cargo-carrying advantages offered by pickup truck type vehicles.

17 Claims, 43 Drawing Sheets

MOTOR VEHICLE MEANS FOR CARRYING PASSENGERS AND CARGO

BACKGROUND OF THE INVENTION

Prior art vehicles for transporting passengers and cargo include motor vehicles such as automobiles, minivans, passenger vans, sport-utility vehicles, and pickup trucks. Some vehicles such as automobiles, minivans, passenger vans and sport-utility vehicles tend to be more suited to passenger transport while other vehicles such as pickup trucks tend to be more suited to cargo transport. In particular, automobiles, minivans, passenger vans and sport-utility vehicles using a shared fully enclosed cabin volume for many passenger seats and a limit amount of cargo space are not very well suited to carrying oversize or "dirty" cargo such as a Queen-size bed, snowmobile, sheets of 4'×8' plywood or a load of fertilizer. By contrast, a pickup truck is good for carrying oversize or "dirty" cargo in its cargo bed, but is deficient in providing really comfortable seating for a plurality of passengers. Even full size pickup trucks with an extended cab do not offer anything nearly as comfortable as bucket seats with good legroom for rear seat passengers.

BRIEF SUMMARY OF THE INVENTION

It is an object of the present invention to provide a new class of motor vehicles which are very well suited to both passenger and cargo transport.

It is an object of the invention to provide very comfortable seats with good legroom for a plurality of passengers, including non-front-seat passengers.

It is an object of the invention to enable transport of oversize or "dirty" cargo in a cargo area separate from the passenger seating area.

It is an object of the invention to provide a versatile capability to transport typical cargoes that range from utility cargoes (lawn mower, lawn tractor, a stack of 4'×8' plywood sheets on edge, a load of fertilizer or wood chips) to furniture (Queen or King-size bed on edge, sofa, sofabed, dresser, armoire, table, desk, entertainment center) to appliances (washer, dryer, combined washer-dryer, refrigerator, dishwasher, range-oven) to sport or camping equipment (snowmobile, waterscooter, scooter, motorcycle, many bicycles including tandems, toboggans, sleds, tents, a canoe, a kayak).

It is an object of the invention to maximize payload-carrying capability, both passenger and cargo, within limited values of overall vehicle length, width, and height.

These and other further objects will become more fully evident in the following descriptive portion of the specification, drawings and claims.

The invention provides a new class of motor vehicles which satisfy the above and additional objects, by employing inventive and space-efficient configurations to better combine the passenger-carrying advantages offered by minivan, passenger van, or sport-utility type vehicles and the cargo-carrying advantages offered by pickup truck type vehicles.

DETAILED DESCRIPTION

Figure 1A:
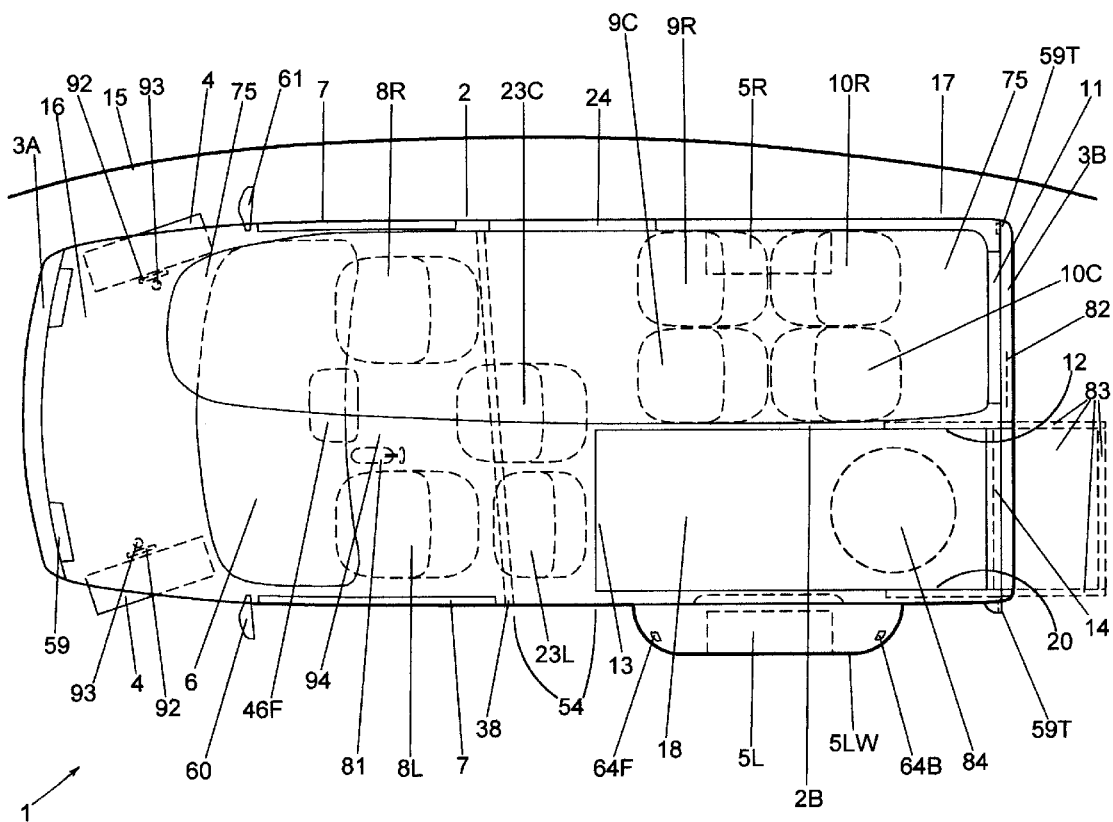
FIGS. 1A and 1B show top views of representative preferred embodiments of one class of embodiments of the invention.
Figure 2A:
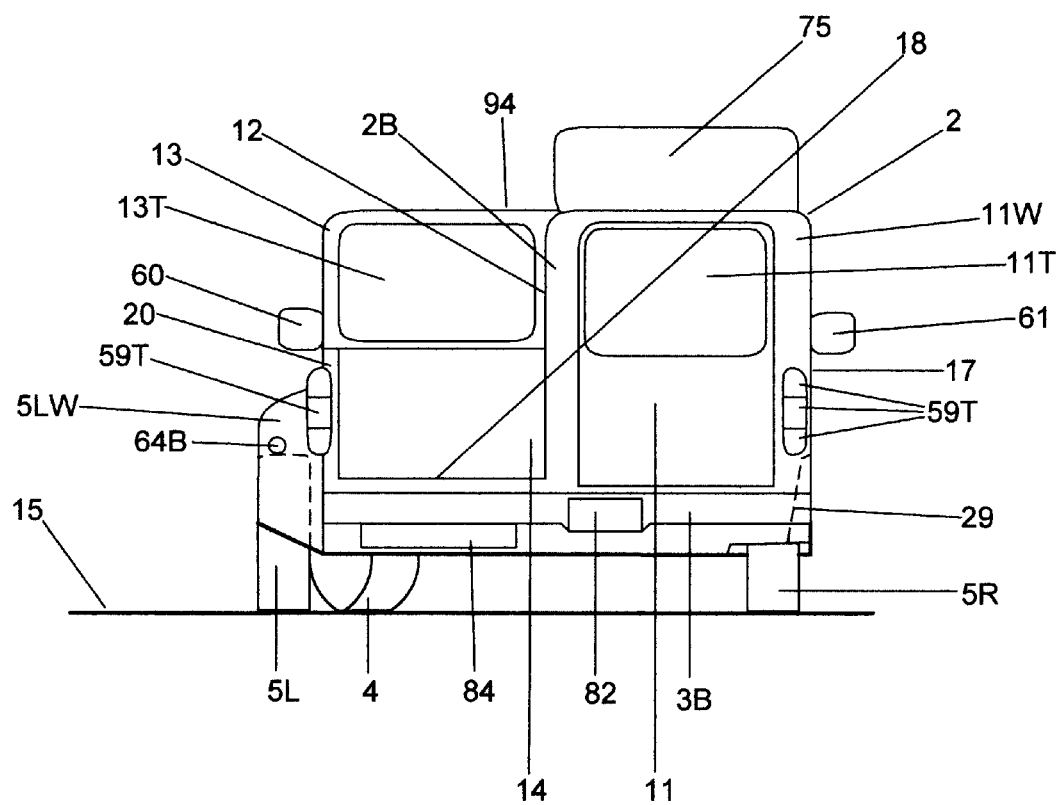
FIGS. 2A, 2B, 2C and 2D show rear views of the FIG. 1 embodiments and additional variations thereof.
Figure 3A:
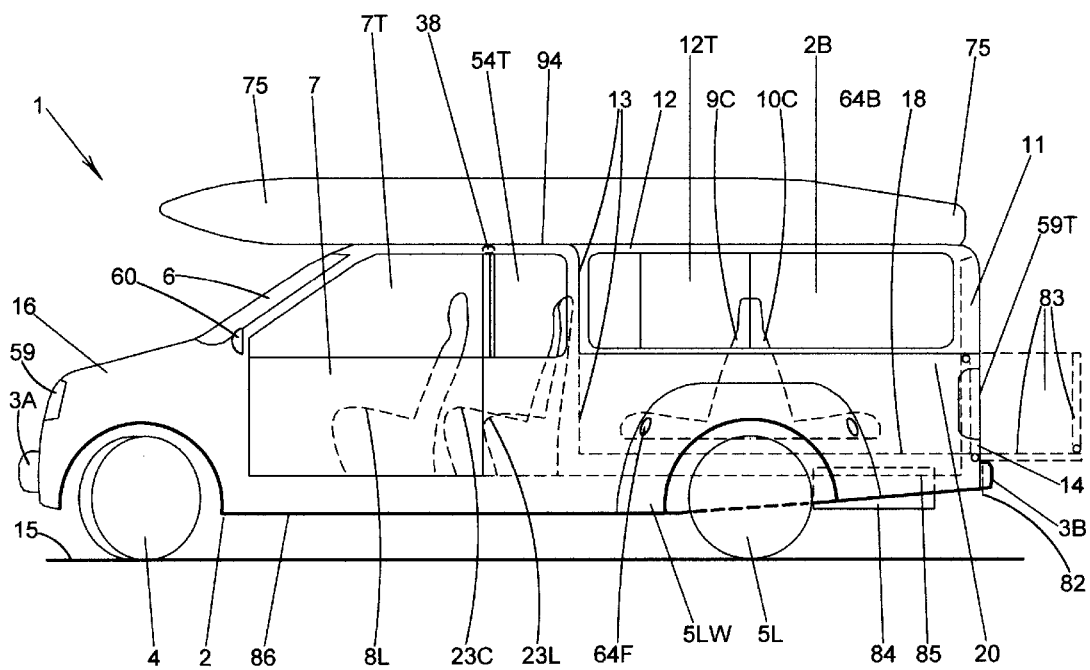
FIGS. 3A, 3B and 3C show side views corresponding to the rear views of FIGS. 2A, 2C and 2D.

FIG. 1A illustrates atypical preferred embodiment of the invention. A motor vehicle 1 is shown from a top view in FIG. 1A. The corresponding rear view is shown in FIG. 2A, and the corresponding left side view is shown in FIG. 3A. The general layout of the vehicle can be seen with a vehicle body 2 including an engine compartment 16 (with a covering hood) in front, front bumper 3A and rear bumper 3B, front tires 4, rear left tire 5L and rear right tire 5R, front windshield 6, roof 94, forward or front left and right seats 8L and 8R, front doors 7 for providing access to these front seats and side door means 24 for providing access to non-front seat passengers. The particular elements recited immediately above in this paragraph are typical elements also used in prior art vehicles.

Engine and transmission means may be installed in the engine compartment in a variety of possible positions and orientations, as is known in the prior art. The large width of the engine compartment in this embodiment can be used to advantage in fitting in the engine and transmission within a relatively short length while still providing good crash loads absorption capability (e.g., through the use of a transversely mounted engine). A grille (not shown) will typically be provided in front of the engine compartment. While a variety of engine types could be used, typically a four to ten cylinder spark-ignited or diesel engine will be used. The engine will typically be connected to a transmission (either automatic or manual, which then transmits torque and power to drive wheels, which may be the front wheels, rear wheels, or all wheels of the vehicle depending on whether the vehicle is front-wheel drive, rear-wheel drive, or all-wheel drive.

The front bumper 3A and rear bumper 3B are part of safety-enhancing means for contributing to the safety and protection of persons seated in said body means (the vehicle body 2).

The illustrated front tires 4 and rear tires 5L and 5R, along with suspension means (not shown) comprise the running gear means for permitting said motor vehicle to move and maneuver upon a road surface 15. Said running gear means has four tires contacting the road, and includes at least three tires which normally contact said road surface. Brakes 92 will be furnished on at least some of the tires to facilitate vehicle stopping. Preferably brakes will be furnished on all tires contacting the road surface, and an anti-lock braking system will also preferably be provided to improve braking performance under adverse conditions. In the illustrated embodiment the front tires 4 are steerable, and are illustrated in a steered configuration; and the rear tires may also be optionally steerable, as is provided in some current high performance automobiles. Large front tire steering angle will preferably be provided to enable tight turn and U-turn capabilities. Thus the illustrated motor vehicle includes drive means for driving at least one tire using power from a motor in said motor vehicle, and includes braking means for braking at least one tire of the motor vehicle 1, and includes tire steering means acting on at least one tire for permitting the motor vehicle 1 to be steered so as to maneuver laterally upon the road surface 15. A driver of the vehicle seated in the driver's seat (seat 8L in this embodiment) in the body means (vehicle body 2) will have control means to command the speed and direction of travel of the motor vehicle 1 upon the road surface 15, through control commands to the drive means, the braking means, and the steering means.

The suspension means provide means for the tires to support the vehicle body 2, and means for enhancing the ride quality and handling qualities of the vehicle. In other words, the vehicle 1 includes suspension means connecting said running gear means with said body means (vehicle body 2), for supporting said body means and for improving the ride quality and maneuver handling characteristics of said motor vehicle 1. Illustrated shock absorbers 93 for the front wheels and tires are a key part of said suspension means. As the vehicle is fairly tall and could be asymmetrically loaded (e.g., full passengers and rooftop storage compartment and no pickup bed cargo; or heavy pickup bed cargo and no passengers or rooftop storage compartment cargo), it may be advantageous to have a more sophisticated suspension system especially for the rear tires—e.g., extra-heavy-duty shock absorbers, a load-sensing suspension, roll compensating/lean-control/vehicle levelling suspension, and/or a variable height suspension. The technology for these more sophisticated suspension systems does exist in the prior art, for instance a variable height suspension was developed by Citroen in France many decades ago.

The vehicle body 2 serves as body means for carrying a load, which body means is supported by said running gear means (described above). The front seats comprise a forward or front left seat 8L (typically a driver's seat in countries with left hand drive) and a forward or front right seat 8R (typically a forward passenger's seat in countries with left hand drive). Clearly the configuration can be reversed left-to-right for countries with right hand drive. More generally, for left-to-right asymmetric configurations such as the FIG. 1A configuration, various left/right asymmetrically located features can be switched right/left within the spirit and scope of the invention.

In the FIG. 1A embodiment, a lengthened forward passenger accommodating area 54 (extended cab) is provided behind the front left seat 8L. A second row forward left seat 23L is illustrated behind the front left seat 8L, in a manner similar to a second row forward seat being provided in an extended cab pickup truck. Laterally offset and substantially adjacent to this seat 23L, another more comfortable bucket seat with more legroom is provided—this is the second row forward center seat 23C. A fold-down armrest may optionally be provided between seats 23L and 23C. The greater legroom for the passenger in 23C is available as the passenger occupying this seat can extend his/her legs into the floor area between the front seats 8L and 8R. Access to the second row forward seats 23L and 23C is via side door means 24 on the right hand side of the vehicle, which may typically comprise a sliding or hinged door, and possibly also via an increased length front door 7 on the left hand side of the vehicle, as illustrated, perhaps also in conjunction with a foldable-forward seatback on the front left seat 8L. The increased length front door 7 illustrated on the left hand side of the vehicle may optionally be a two door-panel door, with the forward panel hinged on its forward end and the aft panel hinged on its aft end, as is known in the prior art for some pickup trucks with extended cabs. An open cabin floor area is illustrated to the right of the seat 23C in the illustrated embodiment and adjacent to side door means 24, to facilitate access to seats 23C and 23L and 9C and 9R, and to enable large seatback recline of the forward right seat 8R. In variant embodiments, an additional seat similar to 23L could be installed in this location, or an additional floor mounted storage unit could be installed in this location. Side door means 24 provides door means for permitting entry into and egress from the at least partially enclosed compartment means 2B, for accessing seats 9C and 9R in the at least partially enclosed compartment means 2B.

A forward-facing rear center seat 9C and aft-facing rearmost center seat 10C are located with their centerlines to the right side of the vehicle centerline, and situated behind the front seats 8R and 8L and behind the second row forward seats 23C and 23L. Similarly a forward-facing rear right seat 9R and aft-facing rearmost right seat 10R are located directly or approximately behind the forward right seat 8R, and also behind the second row forward seats 23C and 23L. Seats 9C and 9R may be individual, adjacent bucket seats, or a combined bench seat. Similarly, seats 10C and 10R may be individual, adjacent bucket seats, or a combined bench seat. The seat cushion & seat back intersection area for seats 9R and 10R are very close to and may be in contact with the top of the wheel well enclosure above the rear right tire 5R, and may employ thinned-down cushioning in this area A fold-down armrest may optionally be provided between seats 9C and 9R, and between seats 10C and 10R. For the sides of the seats 9C, 9R, 10C, and 10R which are not adjacent to another seat, outboard armrests may be "built-in" to lower windowsill contours of the windows adjacent to these seats (not shown).

The forward-facing rear center seat 9C and aft-facing rearmost center seat 10C together provide seat means for seating at least two persons substantially longitudinally disposed one in front of the other. The forward-facing rear right seat 9R and aft-facing rearmost right seat 10R similarly together provide seat means for seating at least two persons substantially longitudinally disposed one in front of the other. Said seat means is intended to include not just the seats, but also means for securing said seats to said body means, and seat belt means for contributing to the restraint and protection of persons seated in said seats in the event of an accident involving said motor vehicle. The seat belt means are also part of the safety-enhancing means for contributing to the safety and protection of persons seated in said body means (the vehicle body 2). The means for securing said seats to said body means will preferably also provide means for quickly detaching said seats from said body means when it is desired to remove said seats from said motor vehicle.

In the illustrated embodiment of the invention, the vehicle body 2 serves as body means for carrying a load, wherein said body means comprises at least partially enclosed compartment means 2B for housing said seat means for seating at least two persons substantially longitudinally disposed one in front of the other (in seats 9C and 10C, or in seats 9R and 10R). Enclosing wall means 17 serve as means for contributing to enclosing the at least partially enclosed compartment means 2B. Rear door means 11, when closed behind the aft-facing rearmost center seat 10C and rearmost right seat 10R, also serve as means for contributing to enclosing the at least partially enclosed compartment means 2B. Rear door means 11 provides door means for permitting entry into and egress from the at least partially enclosed compartment means 2B, for accessing seats 10C and 10R. Rear door means 11 will preferably but not necessarily be hinged on the side toward the center of the vehicle.

The body means also comprises the area of the vehicle body 2 wherein the front left seat 8L and front right seat 8R are located, which area can be designated as a front at least partially enclosed compartment means for housing front seat means (8L and 8R) for seating at least two persons substantially laterally disposed one aside the other, which front at least partially enclosed compartment means is located substantially contiguously and in front of said at least partially enclosed compartment means 2B for housing said seat means for seating at least two persons substantially longitudinally disposed one in front of the other (e.g., in seats 9C and 10C, or in seats 9R and 10R). Airbag supplementary restraint systems will preferably be provided for the occupants of the front seats 8L and 8R, to also serve as part of safety-enhancing means for contributing to the safety and protection of persons seated in said body means (the vehicle body 2). The front at least partially enclosed compartment means can also be construed to include second row forward seats 23L and 23C in this extended cab embodiment of the invention.

A pickup truck type of cargo bed 18, without a permanent covering roof structure, is located between the seats 9C, 10C and side wall 12 on one side, and cargo bed side wall means 20 on the other side. The rear left tire 5L is located in a housing area for the left wheel and tire 5LW, outboard of sidewall means 20 in the illustrated embodiment. This facilitates a wider minimum width, substantially constant width (pickup)cargo bed 18. Thus, said tires of said vehicle include a tire which is located substantially to a side of said cargo bed means with the outer face of said tire located outboard of the corresponding side of said body means, as illustrated. In a variant embodiment, the rear left tire 5L and its associated housing area 5LW could be moved to a further aft location, in conjunction with an angled rear axle, to provide better load support for heavy cargo loads in the pickup or cargo bed, while avoiding excessively aft center of gravity locations.

While the rear left tire and wheel are moved outboard, the rear right tire 5R is not moved outboard. This facilitates parallel parking of the vehicle 1 on the right side of a road with a left-hand drive vehicle configuration, as illustrated. In alternate embodiments the use of outboard located rear tires may occur on the cargo bed and/or non-cargo bed side of the vehicle, and on the driver's or non-driver's side of the vehicle.

The cargo bed 18 serves as cargo bed means for carrying cargo thereon, on a cargo bed section (essentially the entire cargo bed in this illustrated embodiment) at a location which is substantially laterally disposed on a side of a person's seat in said seat means (i.e., this could be any of the seats 9C, 10C, 9R, 10R in the illustrated embodiment. Thus the cargo bed means for carrying cargo thereon includes a cargo bed section which is substantially located laterally disposed on a side of a person's seat in said seat means in said at least partially enclosed compartment means In the illustrated embodiment of FIG. 1A, we can also say that said cargo bed means comprises means for carrying cargo on a long cargo bed section which is substantially laterally disposed on a side of both of two persons' seats substantially longitudinally disposed one in front of the other (e.g., seats 9C and 10C) in said seat means. Note that the cargo bed 18 serves as the long cargo bed section, and is at least 5 ft. long (it is a bit over 6.5 ft. long in the illustrated embodiment in FIG. 1A).

In FIG. 1A, said cargo bed means comprises the pickup truck type of cargo bed 18, without a permanent covering roof structure. Cargo bed rear closure means 14 provides means for enclosing the cargo bed on its rear side, and could comprise a tailboard, tailgate, liftgate, or sideways-opening door(s). The illustrated cargo bed rear closure means 14 comprises a tailgate hingedly attached at its lower end to the vehicle body just behind the aft end of the cargo bed 18. The tailgate serves as gate means for enclosing (he aft portion of) the perimeter of the cargo bed means, and its hinged attachment serves as gate movement means for enabling said gate means to be moved to an alternate nonenclosing position so as to facilitate loading and unloading of cargo onto and from said cargo bed means. The forward end of the cargo bed is enclosed by front wall means 13. The front wall means 13 and side wall 12 will preferably include transparent surfaces (i.e., windows) in their upper parts. The combination of the front wall means 13, cargo bed side wall means 20, rear closure means 14, and side wall 12 provide wall means and gate means for enclosing the perimeter of said cargo bed means.

Side wall 12 serves as a partition means (e.g., a substantially vertically oriented separating wall for separating said cargo bed means from said at least partially enclosed compartment means 2B, as described above. In other words, side wall 12 serves as partition means with a substantially longitudinal orientation for separating said cargo bed section from the area of said body means (vehicle body 2) wherein said seat means (for seating at least two persons substantially longitudinally disposed one in front of the other—e.g., in seats 9C and 10C, or in seats 9R and 10R) are located. Seats 9C and 9R in conjunction, or seats 10C and 10R in conjunction, comprise two-abreast seats on the side of said partition means wherein said seat means are located. Seats 9C and 10C in conjunction, or seats 9R and 10R in conjunction, comprise in combination both forward-facing and at-facing seats on the side of said partition means wherein said seat means are located.

Similarly, front wall means 13 serves as a partition means (e.g., a substantially vertically oriented separating wall) for separating said cargo bed means from said front at least partially enclosed compartment means, also as described above.

FIG. 1A also includes in dashed lines an optional pickup bed extension 83, which can be deployed to enable carriage of longer items in the pickup or cargo bed 18. A pickup bed extension 83 serves as means for extending the effective length of said cargo bed 18. A preferred mechanization of the pickup bed extension 83 is described in the following. The illustrated cargo bed rear closure means 14 comprises a double panel tailgate hingedly attached at the bottom of the rear panel to the vehicle structure just below the rear extremity of the fixed portion of the cargo bed 18, and with the front panel hingedly attached to the rear panel at its upper extremity. For normal, non-extended pickup bed use this double panel tailgate folds down as a single entity to a horizontal configuration. For conversion to the pickup bed extension configuration, the rear panel stays folded down to a horizontal configuration to serve as the acting floor of the pickup bed extension, and the front panel now folds up to a vertical position at the rear end of the rear panel, to serve as the acting tailgate of the pickup bed extension 83. The enclosing acting sidewalls of the pickup bed extension 83, are preferably formed by rotating back panels around a substantially vertical hingeline from the rear sides of the side wall 12 and the cargo bed side wall means 20, as illustrated. Mechanical means will preferably be provided for securing the acting sidewalls to the acting floor of the pickup bed extension, and for securing the acting tailgate in its pickup bed enclosing configuration when desired. Mechanical means will also preferably be provided for securing the various deployable panels which constitute the pickup bed extension 83, in their stowed or non-deployed locations. As the pickup bed extension extends behind the normal rear end of the vehicle 1, over-length red indication flags may optionally be fastened into pockets in the upper corners of the acting tailgate panel, for deployment when the pickup bed extension is deployed. Additional reflectors or lights may also be built into the rear face of the acting tailgate panel when the pickup bed extension is deployed (note that this is the forward face of the same panel when the pickup bed extension is undeployed, and this front panel is mated flush with the rear panel to together form the rear closure means 14 as illustrated). The pickup bed extension 83 may, in variant embodiments, be formed by telescoping rearward floor and/or sidewall mechanisms in lieu of the illustrated folding panels.

A variant embodiment with the cargo bed on the right side of the vehicle and the rear passenger compartment on the left side of the vehicle is also possible, as are other left/right side switches for other elements of this and other embodiments of the invention, within the spirit and scope of the invention defined herein. The illustrated right side location of the rear passenger seating area in conjunction with a left-hand drive configuration has the advantage of the passengers being able to board from the curb side rather than the road side of the vehicle. The same advantage would occur for a vehicle with a left side location of the rear passenger seating area in conjunction with a right-hand drive configuration.

Some additional features of the FIG. 1A embodiment will be described in the following. Representative head lights 59 and tail lights 59T are illustrated at the front and rear ends of the vehicle, respectively. The illustrated preferred tail light assembly is narrow and tall, to minimize width intrusions into the cargo bed rear closure means 14 or into the rear door means 11. The illustrated left tail light assembly is shown projecting to the left of the cargo bed side wall means 20 a small amount, so that it can be of sufficient width without penetrating into the area of the cargo bed rear closure means 14, and as the left mirror housing 60 and the housing area for the left wheel and tire 5LW already project to the left of the cargo bed side wall means 20 by a greater amount, as illustrated in FIG. 1A. Also illustrated are a wheel housing front light 64F and a wheel housing back (or rear) light 64B, to provide visibility of the wheel housing to other vehicle drivers at night. Additional lights and reflectors including parking lights, back-up lights, turn signal lights, and a high elevation brake light can be furnished according to known approaches in the prior art.

In addition to a conventional internal rearview mirror (not shown), the vehicle of FIG. 1A is fitted with two external rearview mirrors housed in the left mirror housing 60 and the right mirror housing 61, respectively. The mirror housings will preferably fold back rather than break when impacted, and have a spring-back-to-position or snap-back-to-position feature as is know in the prior art. As the right mirror housing adds to the width of this wide vehicle, optional motor driven, remotely-controlled-by-driver mirror housing retraction means may be furnished to retract the mirror when driving into a narrow garage door opening or other width-restricted area. The left mirror housing 60 may be fitted with an optional flexible or bendable wand of a kind known in the prior art (not shown), extending outward from the mirror housing out to substantially the width of the housing area 5LW for the left wheel and tire, so as to help a driver guage wheel housing clearance to a garage door frame when driving into a garage. Variant embodiments of the invention may utilize a periscope or video camera in lieu of a conventional internal rearview mirror.

In the embodiment of the invention illustrated in FIG. 1A, a floor-mounted transmission shifter control 81 is shown on the right side of the front left (driver's) seat 8L. This may comprise a one-degree-of-freedom shifter control for an automatic transmission, or a two-degree-of-freedom shifter control for a manual transmission. Of course, a steering wheel column or front console mounted shifter (not shown) may be used in lieu of the illustrated floor mounted shifter.

A conventional floor-mounted parking brake handle (not shown) may also be provided adjacent to the illustrated floor-mounted transmission shifter control 81. A floor-mounted storage. compartment 46F is also illustrated, which may include enclosed and/or open-top storage for audio tapes or CDs, (compact discs) a tissue box, trash container, mug/cup-holders, cold/hot insulated or refrigerated storage, coin storage, and miscellaneous storage. This storage compartment may alternatively be structurally supported from its forward side rather than from the floor of the vehicle.

The embodiment of FIG. 1A also illustrates an optional built-in rooftop storage compartment 75 running longitudinally above the right hand side of the vehicle. This rooftop storage compartment 75 serves as enclosable storage compartment means for carrying and storing articles at a location above the at least partially enclosed compartment means 2B. The illustrated enclosed rooftop storage compartment is quite large, and could carry six full-size suitcases or long items such as skis for all the passengers. Access to this storage compartment will preferably be provided from the right hand side of the vehicle. Radio antenna(s) may optionally be mounted pointing down or up from the front end of the rooftop storage compartment, in lieu of more conventional mounting on a side of the hood to the engine compartment 16. A variant embodiment could feature a roof rack in lieu of the illustrated rooftop storage compartment 75, or in addition to the rooftop storage compartment 75 but located on the roof above the front left seat 8L.

Roll-bar means 38 serve as means for contributing to the protection of occupants of the vehicle in the event of a roll-overtype accident The roll-bar means enhance the safety of the vehicle in the event of a roll-over-type of accident, and are illustrated running across the top of the vehicle body 2 just behind the front seats 8L and 8R. The roll-bar means may be located below, at, or above the ceiling panel, and below or above the rooftop storage compartment 75. Alternate variant embodiments may be fitted with multiple roll bars instead of a single roll bar—e.g., at different longitudinal locations along the length of the vehicle and possibly connected longitudinally as well to form a roll cage type of protective structure around the passenger and driver seating areas. Various combinations, locations, and orientations of roll-bars, and/or use of roll-cage type structures, may be used within the spirit and scope of this invention. These roll protection enhancement devices also serve as part of the safely-enhancing means for contributing to the safety and protection of persons seated in said body means (vehicle body 2). Airbag supplementary restraint systems, anti-lock brakes, and daytime running lights will also preferably be provided to serve as safely-enhancing means for contributing to the safety and protection of persons seated in said body means (vehicle body 2).

A spare tire 84 is illustrated located under the pickup or cargo bed 18. This spare tire is accessible from behind the vehicle, and a front-hinged, drop-down cradle fitting for supporting the spare tire may be provided to facilitate removal or reinsertion of the spare tire into its under-cargo bed holding position. Alternate spare tire locations could be under the passenger cabin floor under seats 10C and 10R; behind or in the rear door means 11; on the front wall means 13 of the cargo bed; outside the cargo bed side wall means 20 just ahead of the left wheel housing 5LW; on the roof above the left front seat 8L; or in the rooftop storage compartment 75. A license plate holder plate 82 is illustrated in or under the rear bumper 3B.

Some typical dimensions of the preferred embodiment of FIG. 1A are cited below. Please note that these typical dimensions are not to be construed as limiting in terms of the invention as defined in the accompanying claims, The typical overall length is 199 inches, the typical body width (excluding rearview mirrors and the left wheel housing) is 79 inches, and the typical overall height including the rooftop storage unit 75 is 79 inches. These typical dimensions make the vehicle "garagable" in a typical garage, and comparable in overall size to current minivans, sport-utility vehicles, passenger vans, and full-size pickup trucks—for example, length×width×height of the 1997 Dodge Grand Caravan is 199.6"×76.8"×68.5"; the Ford Expedition is 204.6"×77.5"×764"; the GMC Suburban is 219.5"×76.7"×71.3"; the Chevrolet Express passenger van is 218.7"×79.2"×80.7"; the Ford F-150 pickup truck is 202.2"×78.4"×72.4"; and the Dodge RAM pickup truck is 204.1"×79.4"×71.9" (source: Popular Mechanics New Car and Truck Buyer's Guide 1997, Popular Mechanics, 224 W. 57th St., New York, N.Y. 10019).

Seats 9C, 9R, 10C and 10R are constrained in width, and in the illustrated embodiment have typical seat width dimensions of 19.75 inches, which is wider than the widest known airplane economy class seat (the Boeing 777's. With bucket seat contouring and generous legroom, these seats should be very comfortable despite their constrained width. The illustrated pickup (cargo) bed has typical dimensions of 33" wide by 78.5" long, and with the pickup bed extension 83 deployed, 33"×101". Thus the vehicle with this pickup bed could typically carry either 6.5 ft. long cargo or 8 ft. long cargo (or still more if "long" cargo extends forward over the vehicle rod). Typical cargo that could be carried ranges from utility cargoes (lawn mower/tractor, a stack of 4"×8" plywood sheets, a load of fertilizer or wood chips) to furniture (Queen or King-size bed, sofa, sofabed, dresser, armoire, table, desk entertainment center) to appliances (washer, dryer, refrigerator, dishwasher, range-oven) to sport or camping equipment (snowmobile, waterscooter, motorcycle, many bicycles including tandems, canoe/kayak, toboggans/sleds, tents), etc. Additional enclosed storage can be provided in the rooftop storage compartment 75, which could have typical internal maximum dimensions of 163" (length)×38" (width)×13.25 (height) to enable carriage of typically six full size suitcases, or multiple pairs of skis and ski equipment.

Figure 1B:
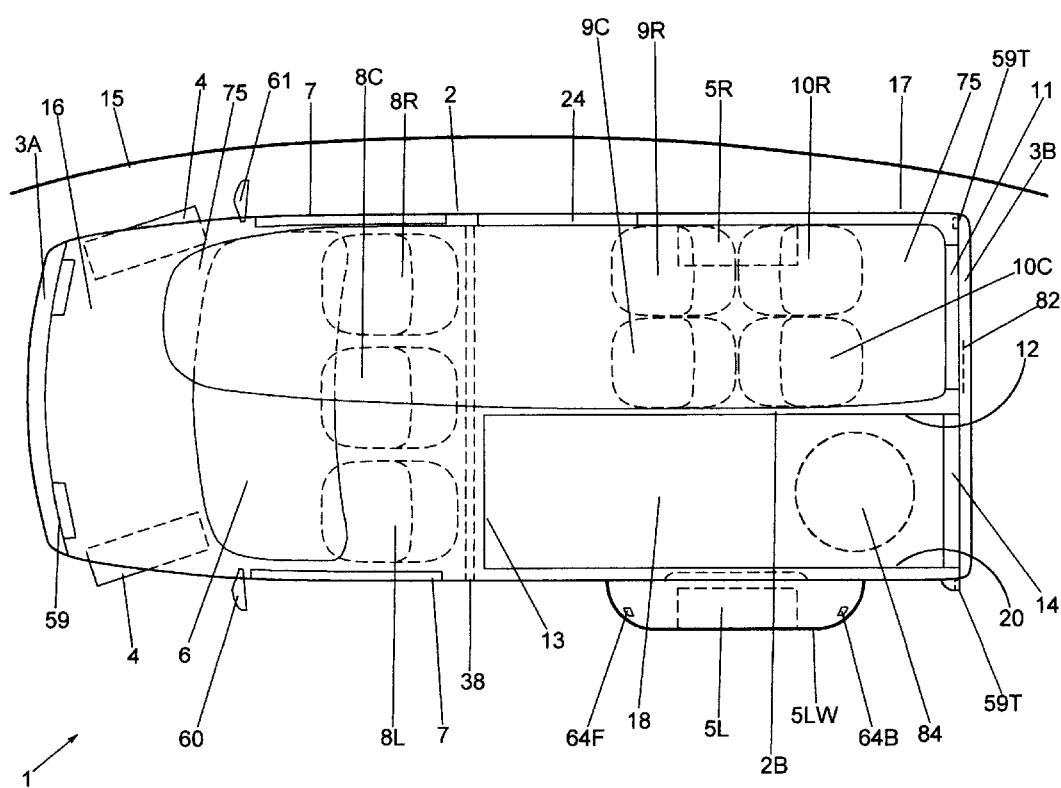

FIG. 1B shows a top view of an embodiment of the invention which is a variant of the FIG. 1A embodiment A longer (pickup) cargo bed 18 is provided in FIG. 1B, which may for instance be 96.5" long instead of 78.5" long, while retaining an exemplary width of 33". Once again, these dimensions are cited for example and should not be construed to limit the invention. This longer pickup bed is possible even without increasing the overall length of the vehicle, because the embodiment of FIG. 1B no longer has the lengthened forward passenger accommodating area (extended cab) 54, nor the seats 23L and 23C that were fit in the extended cab. With the longer pickup cargo bed, the embodiment of FIG. 1B could carry a stack of 4"×8" plywood sheets (on edge), within the length of the pickup bed terminated in the rear by the tailgate or cargo bed rear closure means 14, even without the need for something like the pickup bed extension 83 illustrated in the FIG. 1A embodiment.

The body means (vehicle body 2) now includes an area of the vehicle body 2 comprising a forward left section, forward center section, and forward right section wherein up to three forward or front seats comprising a forward or front left seat 8L, an optional forward or front center seat 8C, and a forward or front right seat 8R are located. Thus in the motor vehicle 1 of FIG. 1B, the vehicle body 2 serves as body means for carrying a load, wherein said body means comprises at least partially enclosed compartment means 2B for housing seat means for seating at least two persons substantially longitudinally disposed one in front of the other (in seats 9C and 10C, or in seats 9R and 10R), and wherein said compartment means also includes contiguously a forward center section and two forward side sections which are the forward left section and forward right section, and wherein said forward left section, forward center section, and forward right section together provide means for accommodating a forward left seat (8L) and a forward right seat (8R) which is substantially located laterally disposed relative to said forward left seat. The illustrated embodiment in FIG. 1B includes (optional) forward center seat 8C located substantially in the forward center section between said forward left seat 8L and said forward right seat 8R. Said forward left seat 8L or said forward right seat 8R serves as a drivers seat, depending on whether the vehicle is intended for use in jurisdictions with left-hand drive or right-hand drive. In addition to seat and shoulder belts, preferably airbag supplementary restraint systems will be provided for the occupants of each of the forward or front seats 8L, 8C, and 8R. Preferably means for disabling the airbag SRS for the front center seat 8C or the front passenger seat (e.g., 8R, in jurisdictions with left-hand drive where the driver's seat is 8L) will be provided, for cases when a child or infant seat is installed in the front center seat or front passenger seat.

In the illustrated embodiment of FIG. 1B, said seat means for seating at least two persons (in seats 9C and 10C, or in seats 9R and 10R) is contained in a rear side section of said compartment means substantially located behind a forward side section (the forward right section containing seat 8R), and said cargo bed section in cargo bed 18 is substantially located laterally disposed on a side of said rear side section of said compartment means.

FIG. 2A shows a rear view of the FIG. 1A embodiment. The vehicle body 2 includes at least partially enclosed compartment means 2B, located on one side of the cargo bed 18. A typical transparency/window in the rear door means is designated 11T, and is contained in the rear door means 11. The rear door means 11 in turn is contained in the rear wall means 11W. A typical transparency/window in the front wall means is designated 13T, and is contained in the front wall means 13 at the forward end of the cargo bed 18. As described with reference to FIG. 1A, the illustrated taillights 59T use a preferred tail light assembly which is narrow and tall, to minimize width intrusions into the cargo bed rear closure means 14 or into the rear door means 11. Representative triple lights are shown in each assembly, which may for example be a red taillight cum brake light, amber turn indicator light, and white back-up light. The cargo bed rear closure means 14 is seen at the aft end of the cargo bed 18.

Side impact energy absorbing panel means 29 are also illustrated, which provide means for enhancing side impact protection for passengers seated in compartment means 2B. (Such side impact energy absorbing panel means may also of course be used on either or both sides of the vehicle in this or other embodiments within the spirit and scope of the invention). The side impact energy absorbing panel means 29 serve as safety-enhancing means for contributing to the safety and protection of persons seated in said body means.

Figure 2B:
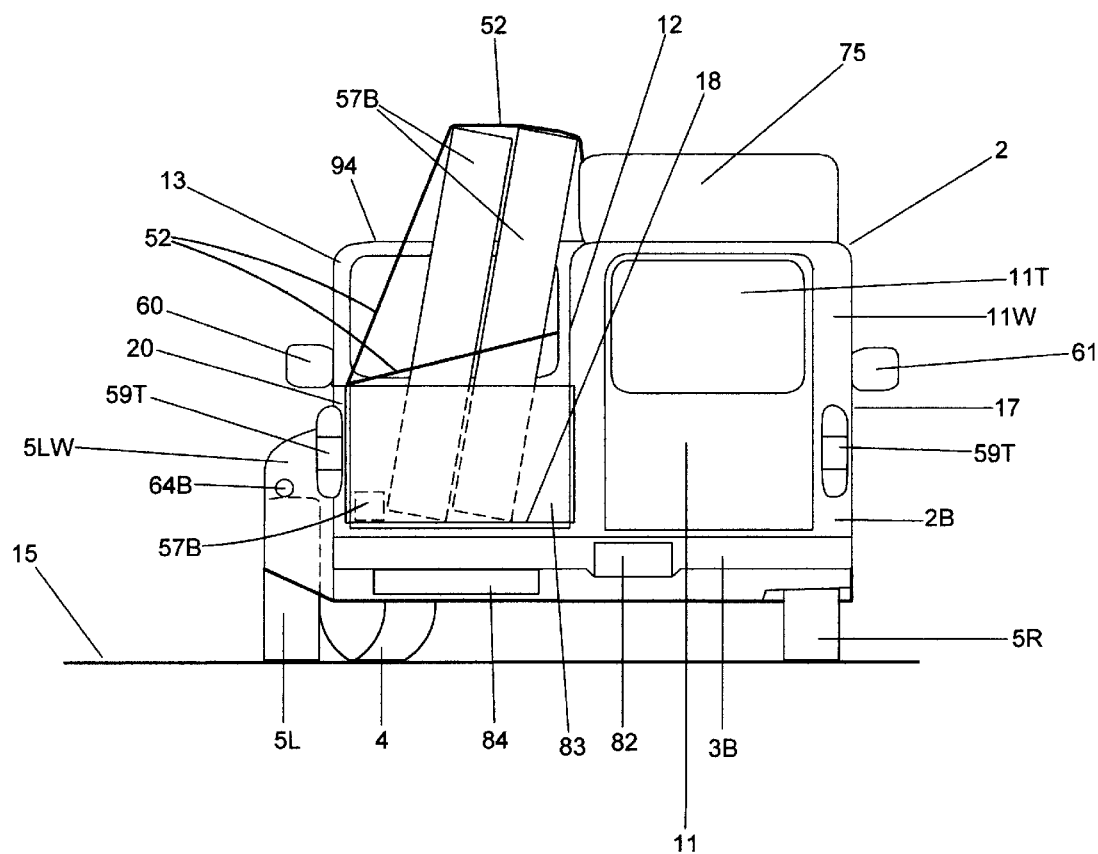

FIG. 2B shows a rear view of the same embodiment as FIG. 1A and FIG. 2A, now carrying a representative cargo load 57B in the cargo bed 18. The illustrated representative cargo load comprises a Queen size bed set, with a mattress and boxspring each measuring about 80"×60"×9" on their sides, and a disassembled bed frame in a box on the cargo bed 18 to the left of the mattress and boxspring. Tie-down means 52 such as cable/cord means are illustrated for securing the representative cargo load in the cargo bed 18, and serve as securing means for securing articles on said cargo bed means. Other elements which may be used in said securing means and said tie-down means could include tethers, straps, hooks, clamps, nets, locks, reel-out means such as reel-out cables, straps, tethers or sheets, tie-down means, and mechanical or magnetic means. These securing means elements may be connected to one or more of the following: to the pickup cargo bed 18, to the side wall 12, to the front wall means 13, to the cargo bed side wall means 20, to the cargo bed rear closure means 14 (see FIG. 2A) or the pickup bed extension 83, to the rooftop storage compartment 75, to the roof 94, and to the representative cargo load 57B. The tie-down means and securing means elements preferably serve as means for preventing the representative cargo load 57B from excessive movement in or falling off from the pickup cargo bed 18, even when the motor vehicle experiences longitudinal acceleration or braking, and/or traverses grades and/or bumpy roads, and/or negotiates turning maneuvers with significant lateral acceleration levels. For example, the tie-down means 52 may include tethers in tension running over the top of and running behind the rear end of the representative cargo load 57B, as illustrated.

The pickup bed extension 83 described with reference to FIG. 1A is shown in its deployed position in FIG. 2B, as opposed to FIG. 2A where ft is not deployed and hence not visible. While the illustrated representative cargo load comprises a Queen bed set, the illustrated cargo bed is of sufficient size (typical dimensions of 33" wide×101" long with the pickup bed extension 83 deployed ×unlimited height as there is no roof above the pickup cargo bed) to provide a versatile capability to transport typical cargoes that range from utility cargoes (lawn mower, lawn tractor, a stack of 4'×8' plywood sheets on edge, or a load of fertilizer or wood chips, or a ladder which may extend above the roof 94 if it is very long) to furniture (Queen or King-size bed on edge, sofa, sofabed, dresser, armoire, table, desk or an entertainment center) to appliances (Washer, dryer, combined washer-dryer, refrigerator, dishwasher, or a range-oven) to sport or camping equipment (snowmobile, waterscooter, scooter, motorcycle, many bicycles including tandems, toboggans, sleds, tents, or a canoe or a kayak which may extend above the roof 94 if it is very long). The absence of a wheel housing intruding into the pickup cargo bed makes it particularly useful and versatile. Please note also that while the representative 33" wide pickup cargo bed illustrated in FIG. 2B is less wide than in current large pickup trucks, it should still be sufficient to accommodate most furniture and appliances, which are generally designed to fit through typical 32" wide household doorways. To summarize, the illustrated cargo bed means for carrying cargo (cargo bed 18) comprises means for carrying utility cargoes such as a lawn mower, lawn tractor, a stack of 4'×8' plywood sheets on edge, or a load of fertilizer or wood chips; or furniture such as a Queen-size bed on edge, sofa, sofabed, dresser, armoire, table, desk, or entertainment center; or appliances such as a washer, dryer, combined washer-dryer, refrigerator, dishwasher, or range-oven; or sport or camping equipment such as a snowmobile, waterscooter, scooter, motorcycle, many bicycles including tandems, toboggans, sleds, or tents. The illustrated cargo bed means for carrying cargo (cargo bed 18) is also sufficient to carry cargo of a size measuring at least 2 ft.×3 ft.×4 ft.

FIG. 2B also shows how the illustrated motor vehicle has an at least partially enclosed compartment means 2B which comprises a tall compartment for housing seat means for seating at least two persons substantially longitudinally disposed one in front of the other (in seats 9C and 10C, or in seats 9R and 10R in FIG. 1A) which tall compartment is bounded on the rear by rear wall means 11W and rear door means 11, wherein a side wall of said tall compartment (side wall 12) can act to provide lateral physical restraint for tall cargo (such as the Queen bed representative cargo load 57B) carried on said cargo bed section in said cargo bed means (cargo bed 18), and further comprising securing means (e.g., tie-down means 52) for permitting said tall cargo to be secured in said cargo bed means against said side wall of said tall compartment. Thus this new type of vehicle with a tall (passenger seating) compartment located to one side of a pickup cargo bed can actually carry tall cargo better than a current pickup truck, as this tall cargo can be leaned against and secured against the side wall of the tall (passenger seating) compartment. A typical height of a tall (passenger seating) compartment is 3.5 ft to 4.5 ft high, to comfortably accommodate seated passengers within, though variations in height outside these typical limits are possible within the spirit and scope of the invention.

Figure 2C:
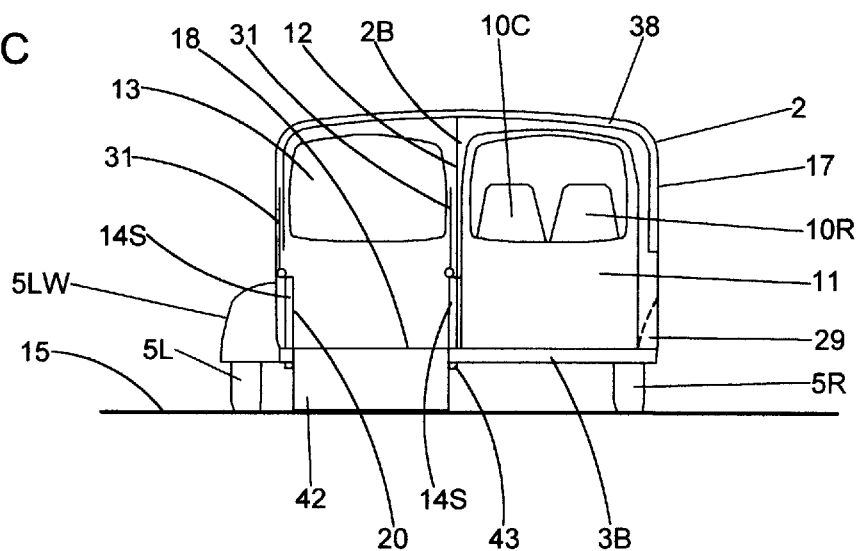

FIG. 2C shows a variant of the FIG. 2A embodiment, also fitted with cargo bed cover means 31 and a loading ramp 42. The illustrated cargo bed cover means 31 comprises cover panel means which can be in a folded and latched down configuration to cover the cargo bed 18, or folded up (as illustrated) to enable carriage of taller cargo loads on the cargo bed 18. In the folded up configuration the cover panel means can also serve as means for providing (additional side restraint/support for cargo loads on the cargo bed 18, and as means for protecting windows and paint on the sidewall 12 from impact and potential damage by such cargo loads. Alternative cargo bed cover means may use slidable panels, roll-away sheets which retract around one or more rollers, fastenable tarps, and/or other closure elements in lieu of the illustrated cover panel means. The loading ramp 42 is illustrated in its deployed (as opposed to retracted) configuration. A sideways opening cargo bed rear closure means 14S is shown in its open configuration, to enable cargo to be loaded into/unloaded from the cargo bed 18 from/to the road surface 15 via the loading ramp 42. The sideways opening cargo bed rear closure means 14S may comprise a single or dual sideways opening door or gate means. Thus the illustrated motor vehicle has wall means (12, 13,20) and gate means (14S) for enclosing the perimeter of said cargo bed means (18), and with gate movement means (the sideways opening feature here) for enabling said gate means to be moved to an alternate nonenclosing position so as to facilitate loading and unloading of cargo onto and from said cargo bed means When undeployed (i.e., retracted), the loading ramp 42 can be slidably retracted and housed in loading ramp housing means 43. Conventional manual, power assisted, or powered retraction & deployment means may be provided for retraction and deployment of the loading ramp 42. Conventional means may also be provided for lifting the upper lip of the ramp from below the level of the rear bumper 3B to a deployed position above the level of the rear bumper 3B and substantially level with the level of the cargo bed 18.

Figure 2D:
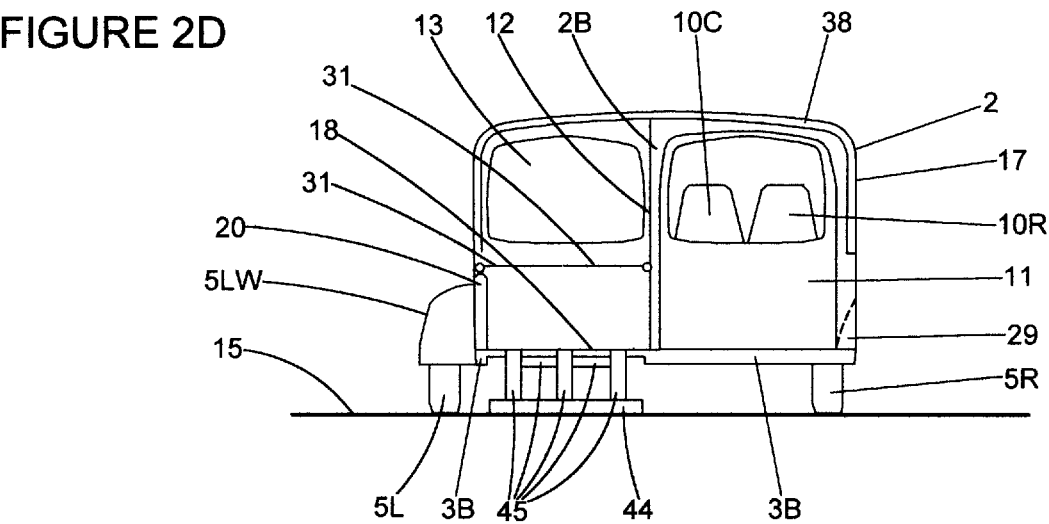

FIG. 2D shows another variant of the FIG. 2A embodiment, also fitted with cargo bed cover means 31 and cargo lift means 44. The illustrated cargo bed cover means 31 comprises cover panel means which can be in a folded and latched down configuration (as illustrated) to cover the cargo bed 18, or folded up to enable carriage of taller cargo loads on the cargo bed 18. The cargo It means 44 serves as means for enabling cargo to be lifted from substantially the level of the road surface 15 to substantially the level of the cargo bed 18, to facilitate loading of cargo onto the cargo bed. The cargo lift means 44 is supported and driven by cargo lift support and drive means 45 The cargo lift platform can optionally also be rotatable from a horizontal up to a vertical orientation so as to serve as a cargo bed rear closure means (e.g., tailgate), when the vehicle is in its drivable configuration. Thus here again the illustrated motor vehicle has wall means (12, 13, 20) and gate means (the cargo lift platform in a substantially vertical tailgate configuration) for enclosing the perimeter of said cargo bed means (18), and gate movement means (the substantially vertical to substantially horizontal rotating feature of the cargo lift platform here) for enabling said gate means to be moved to an alternate nonenclosing position so as to facilitate loading and unloading of cargo onto and from said cargo bed means.

FIG. 3A shows a side view of the FIG. 1A and FIG. 2A embodiment. Some preferred features of this embodiment are better seen in this side view, and will be described below. The rooftop storage compartment 75 is shown to have a converging nose section and a tapering rear section, for aerodynamic drag reduction and styling purposes. Optional side window elements of conventional types are shown incorporated into surfaces such as the illustrated transparency/window in the front door 7T, the transparency/window in the extended cab 54T, and the transparency/window in the side wall 12T. While the illustrated lower sill of the side wall window 12T is sufficiently low to permit outward visibility for passengers in seats 9C and 10C, a still lower and possibly contoured lower sill line may be used for the side wall window 12T, wherein the lower window sill is sufficiently low and suitably shaped to serve as an armrest for passengers seated in seats 9C and 10C. A sloping, minivan style of hood is shown above the engine compartment 16 in this illustration—however, a flatter, pickup truck or sport-utility vehicle type of hood line may alternatively be used. The spatial relationship between the illustrated (left) front door 7, the front left seat 8L, and the second row forward left seat 23L is visible here, and it is self evident that the use of a foldable-forward seatback on seat 8L will facilitate access to seat 23L through door 7. The forward-facing rear center seat 9C and the aft-facing rearmost center seat 10C are visible in side view, above a seating area floor 85 and in an at least partially enclosed compartment means 2B. Said compartment means 2B includes closure element means on the bottom (seating area floor 85), sides (side wall 12 visible, enclosing wall means 17 not visible), and back (rear door means 11) of said compartment means, for contributing toward enclosing said compartment means. Note that at least some of said closure element means include transparent closure element means such as windows (e.g., 12T) for permitting persons inside said compartment means to see outside said compartment means. Note that this embodiment also includes additional closure element means such as a roof (94) for contributing toward enclosing said compartment means (2B) on top and for protecting occupants of said seat means (9C, 10C) from precipitation such as rain, snow, or sleet. Some storage area is available under seats 9C and 10C and above the seating area floor 85. Note that in the illustrated embodiment the seating area floor 85 is shown at a lower level than the floor of the cargo bed 18. This enables a taller height in the seating compartment area, useful for taller passengers, while still not increasing the overall height of the vehicle too much (e.g., to a level where it won't fit into a typical 80" tall garage entrance opening). The illustrated slightly higher level of the floor of the cargo bed 18 leaves enough room for the spare tire 84 under the cargo bed while still maintaining adequate ground clearance and left rear shock absorber bottoming clearance for situations when heavy cargo loads are carried in the cargo bed 18. The level of the cargo bed 18 is also determined in part from the desirability of flat-surface cargo loading with the tailgate 14 or pickup bed extension 83 lying flat above the rear bumper 3B. In variant embodiments the seating area floor may be at the same level or even at a higher level than the floor of the cargo bed 18. The illustrated cargo bed side wall means 20 (and the pickup bed extension 83) have typical vertical heights of approximately 21", sufficient to contain cargo in the pickup bed but not so high as to hinder rear visibility for the driver of the vehicle. The vehicle undersurface 86 is also illustrated in this side view. Fuel tank(s) are not illustrated, but will typically be under the vehicle and ahead of the rear axle, with a filler pipe and cap on a side of the vehicle. A variety of fuel tank and filler designs which provide sufficient fuel capacity along with good safety, are known in the prior art and can be applied to this motor vehicle. Similarly, a variety of prior art exhaust system (e.g., tailpipe, muffler) designs and configurations can be applied to this motor vehicle.

Figure 3B:
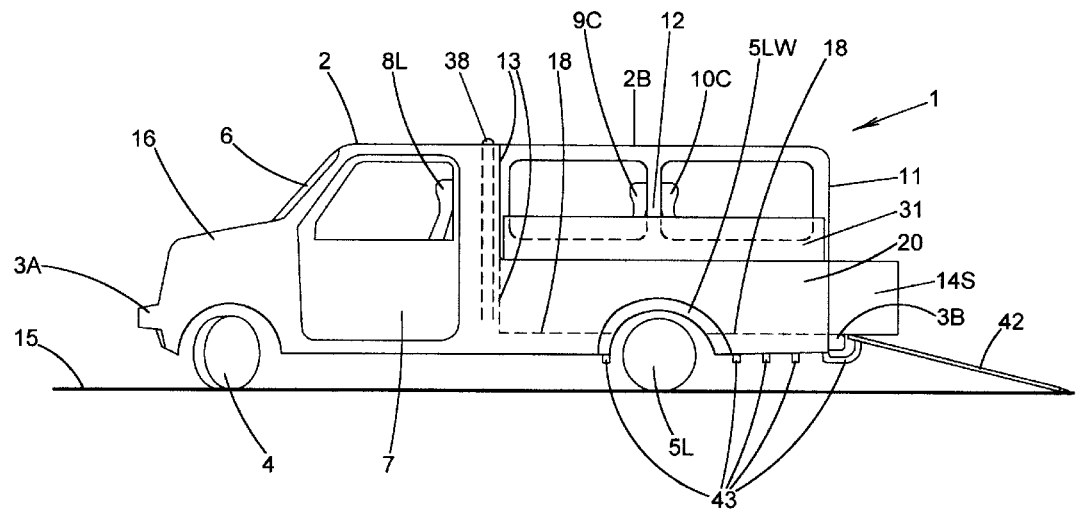
Figure 3C:
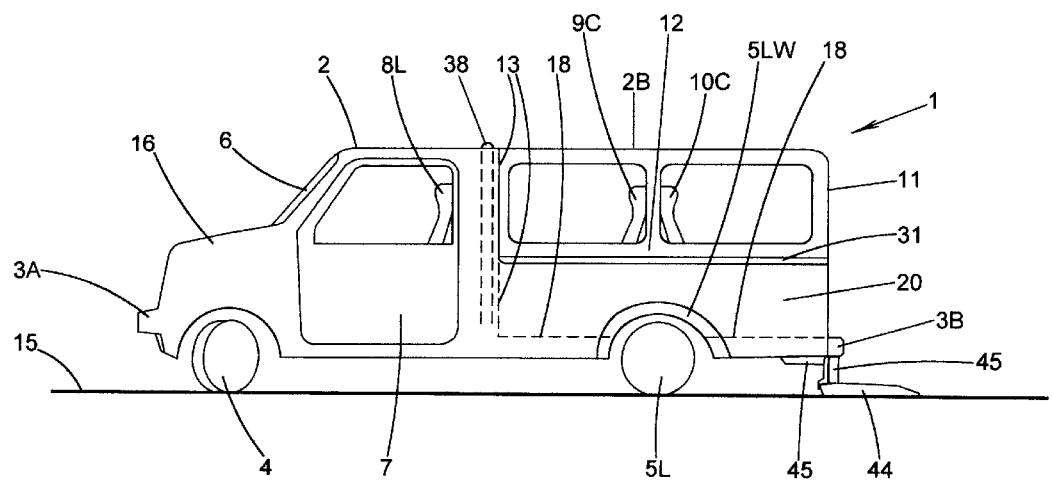

FIG. 3B shows a side view of the FIG. 2C variant embodiment. The length and slope of the loading ramp 42 can be varied within the spirit and scope of the invention. FIG. 3C shows a side view of the FIG. 2D variant embodiment. The length and configuration (e.g., single element vs. multiple foldable or slidable lengthening elements) of the cargo lift means 44 can be varied within the spirit and scope of the invention.

Figure 4:
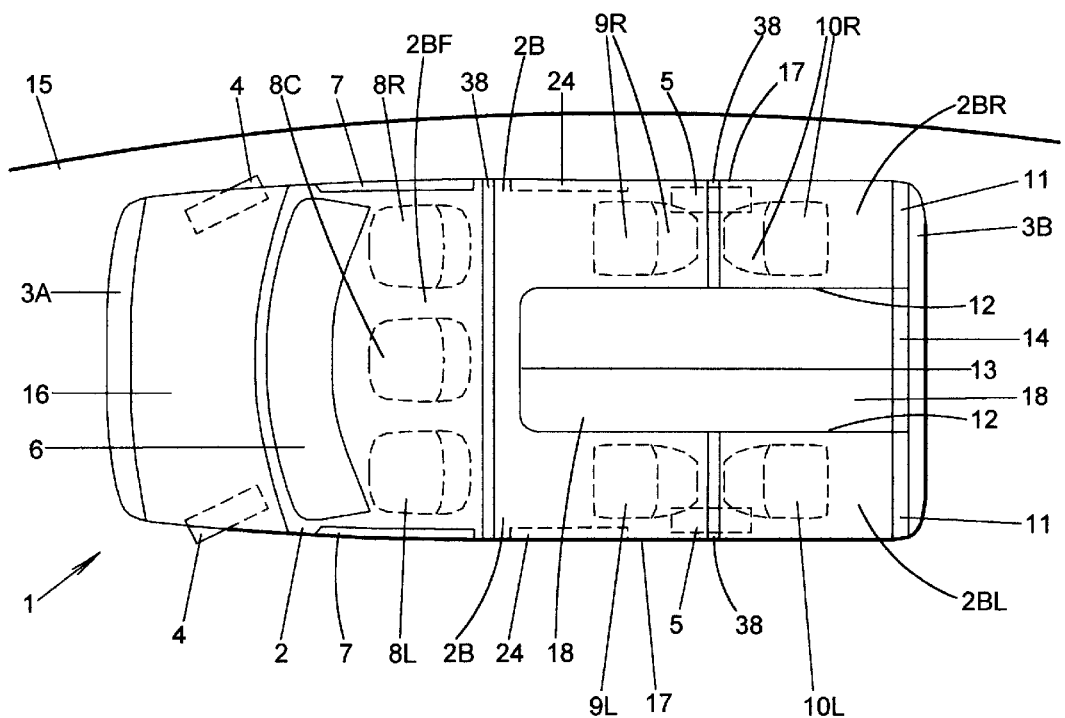
FIG. 4 shows a top view of a typical embodiment of a second class of embodiments of the invention.

FIG. 4 illustrates another typical preferred embodiment representing another class of embodiments of the invention. A motor vehicle 1 is shown from a top view. The general layout of the vehicle can be seen with a vehicle body 2 including an engine compartment 16 in front, front bumper 3A and rear bumper 3B, front tires 4 and rear tires 5, front windshield 6, front doors 7, and front seats 8L, 8C and 8R. The particular elements recited immediately above in this paragraph are typical, and should not be construed as limiting the present invention. The front tires 4 and rear tires 5 comprise part of the running gear means for permitting the motor vehicle to move and maneuver upon a road surface 15. While a single rear tire 5 is shown on each side of the vehicle, in a variant embodiment dual rear tires could be furnished on each side of the vehicle, under the seats 9L and 10L on the left side and under the seats 9R and 10R on the right side of the vehicle. The front tires 4 are preferably steerable, and are illustrated in a steered configuration. The vehicle body 2 serves as body means for carrying a load, which body means is supported by the running gear means described above. The front seats 8 comprise a forward left seat 8L (typically driver's seat in countries with left hand drive), optional forward center seat 8C, and forward right seat 8R (typically driver's seat in countries with right hand drive). A forward-facing rear left seat 9L and aft-facing rearmost left seat 10L are located substantially behind the forward left seat 8L. Similarly a forward-facing rear right seat 8R and aft-facing rearmost right seat 10R are located substantially behind the forward right seat 8R. The forward-facing rear left seat 9L and aft-facing rearmost left seat 10L together provide seat means for seating at least two persons substantially longitudinally disposed one in front of the other. The forward-facing rear right seat 9R and aft-facing rearmost right seat 10R similarly together provide seat means for seating at least two persons substantially longitudinally disposed one in front of the other. Because this configuration features several seats without adjacent seats, an optional intercom system may be provided for enabling voice communications between occupants of different seats in the vehicle. Means for providing audio and/or video entertainment to the occupants of various seats may also optionally be provided—for example personal video screens and audio headsets may be provided as is known in the art for passenger airliners.

In the illustrated embodiment of the invention, the vehicle body 2 serves as body means for carrying a load, wherein said body means comprises at least partially enclosed compartment means 2B for accommodating the aforementioned seat means for seating at least two persons. Please note that in this embodiment there are two at least partially enclosed compartment means 2B, one on the left side of the vehicle (2BL) and one on the right side of the vehicle (2BR), and that these could alternatively be described as the rear left section (2BL) and rear right section (2BR) of a single at least partially enclosed compartment means 2B. Enclosing wall means 17 serve as means for contributing to enclosing the at least partially enclosed compartment means 2B. Rear door means 11 behind the aft-facing rearmost left seat 10L and rearmost right seat 10R provide access to those seats and also serve as means for contributing to enclosing the at least partially enclosed compartment means 2B on either side of the vehicle. Side door means 24 provide access to forward-facing rear left and right seats 9L and 9R and also serve as means for contributing to enclosing the at least partially enclosed compartment means 2B on either side of the vehicle. A pickup truck type of cargo bed 18 is located between the seats 9L, 10L one one side and the seats 9R, 10R on the other side, and separated from the seating compartments by side walls 12. The cargo bed 18 serves as cargo bed means for carrying cargo thereon, which cargo bed means includes a cargo bed section (essentially the entire cargo bed in this illustrated embodiment) which is substantially located laterally disposed on at least one side of a person's seat in said seat means for seating at least two persons (i.e., this could be any of the seats 9L, 10L, 9R, or 10R in the illustrated embodiment). The location of the cargo bed between two tall passenger compartments provides advantages for this embodiment of a central cargo load location for better balance and cornering stability, and good containment for taller cargo loads which could lean against one or both compartment means 2B on either side of the cargo bed 18. Optional retractable sheets or deployable panels or various conventional types (not illustrated) may be used to protect the side walls 12 and any windows therein from damage by tall cargo loads when such cargo loads are carried. Cargo bed rear closure means 14 provides means for enclosing the cargo bed on its rear side, and could comprise a tailgate or liftgate. The forward end of the cargo bed is enclosed with front wall means 13. Roll-bar means 38 serve as means for contributing to the protection of occupants of the vehicle in the event of a roll-over type accident. Roll-bar means are provided at two longitudinal locations in the illustrated embodiment, but could alternatively be provided at one or more longitudinal locations (not necessarily two).

Thus FIG. 4 shows a motor vehicle 1 comprising running gear means (including front tires 4 and rear tires 5) for permitting said motor vehicle to move and maneuver upon a road surface and body means for carrying a load (vehicle body 2) which body means is supported by said running gear means, wherein said body means comprises (i) left at least partially enclosed compartment means 2L for housing left seat means (seats 9L, 10L) for seating at least two persons substantially longitudinally disposed one in front of the other, (ii) right at least partially enclosed compartment means 2BR for housing right seat means (seats 9R, 10R) for seating at least two persons substantially longitudinally disposed one in front of the other, and (iii) cargo bed means (cargo bed 18) for carrying cargo thereon which cargo bed means includes a cargo bed section which is substantially located between said left at least partially enclosed compartment means 2BL and said right at least partially enclosed compartment means 2BR. FIG. 4 further shows (iv) front at least partially enclosed compartment means 2BF for housing front seat means (e.g., 8L, 8R) for seating at least two persons substantially laterally disposed one aside the other, which front at least partially enclosed compartment means 2BF is located substantially contiguously and in front of said left at least partially enclosed compartment means 2BL, said right at least partially enclosed compartment means 2BR, and said cargo bed section (in the cargo bed 18).

Figure 5:
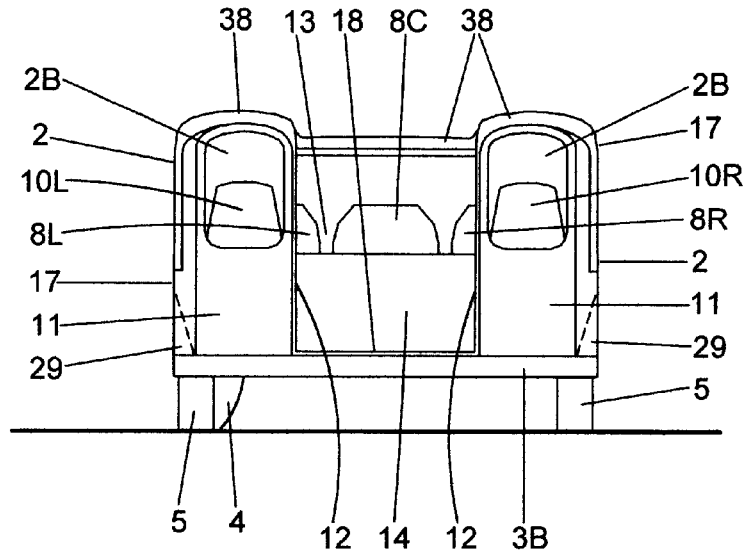
FIG. 5 shows a rear view of the FIG. 4 embodiment.

FIG. 5 shows a rear view of the FIG. 4 embodiment. The vehicle body 2 includes at least partially enclosed compartment means 2B, on either side of the cargo bed 18. Aft-facing rearmost left seat 10L and aft-facing rearmost right seat 10R can be seen (through typical windows) within the compartment means 2B, and the rear door means 11 can be seen aft of the rearmost left and right seats 10L and 10R. The cargo bed rear closure means 14 is seen at the aft end of the cargo bed 18, and the front wall means 13 at the forward end of the cargo bed. The rear door means 11 and front wall means 13 are illustrated with optional, typical window elements incorporated in them. Side impact energy absorbing panel means 29 are also illustrated on both the left and right sides of the vehicle, which provide means for enhancing side impact protection for passengers seated in compartment means 2B. (Such side impact energy absorbing panel means may also of course be used in other embodiments within the spirit and scope of the invention). Again, roll-bar means 38 serve as means for contributing to the protection of occupants of the vehicle in the event of a roll-over type of accident.

Figure 6A:
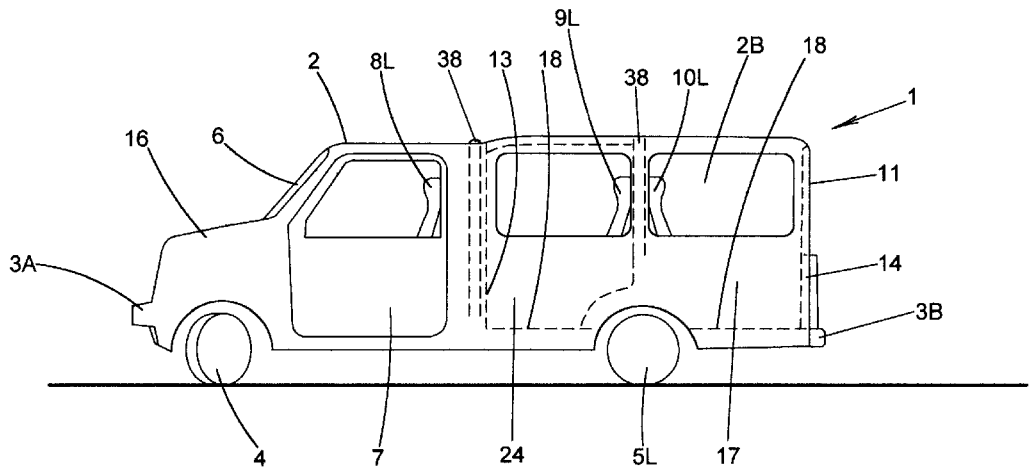
FIGS. 6A and 6B show side views of the FIG. 4 embodiment and of a variation thereof.
Figure 6B:
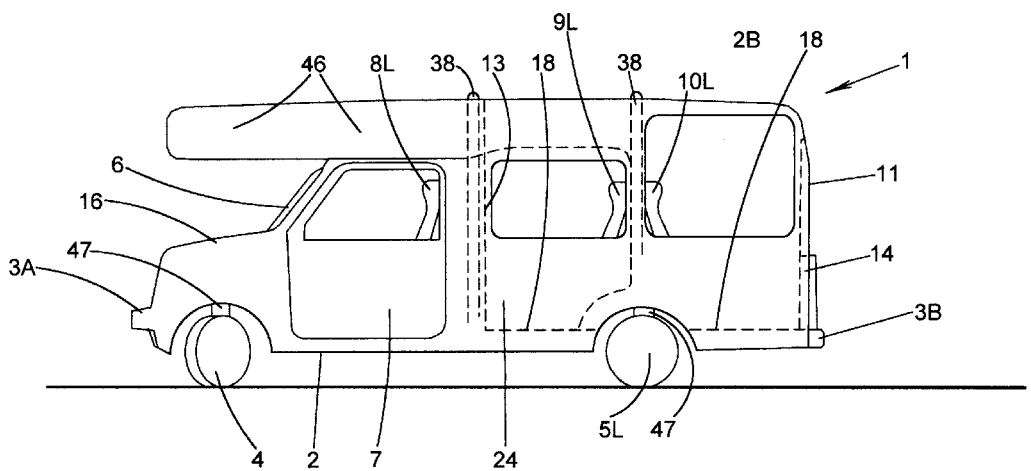

FIG. 6A shows a side view of the FIG. 4 embodiment. FIG. 6B shows a variant of the embodiment shown in FIG. 6A, with a storage compartment 46 in front of and above each of the two at least partially enclosed compartment means 2B, on either side of the vehicle. Thus two storage compartments 46 are provided, one each on the left and right sides of the vehicle, in the FIG. 6B embodiment. These storage compartments 46 serve as enclosable storage compartment means for carrying and storing articles at a location above said at least partially enclosed compartment means 2B. Access to the storage compartments may be from the outer sides of the vehicle, and/or from inside the vehicle through the rear side of the storage compartment. The storage compartments may also be of an optionally vertically expandable (i.e., "pop-top") type. The illustrated embodiment shows an increased size side window in the rear part of the enclosing wall means 17, adjacent to the aft-facing rearmost left seat 10L. The FIG. 6B embodiment also shows a potential active suspension means 47, which can reduce undesirable lean of a relatively high center-o-gravity vehicle in turns, and can also potentially raise or lower ground clearance, provide automatic load adjustment or compensation, and enhance ride quality and handling qualities.

Figure 7A:
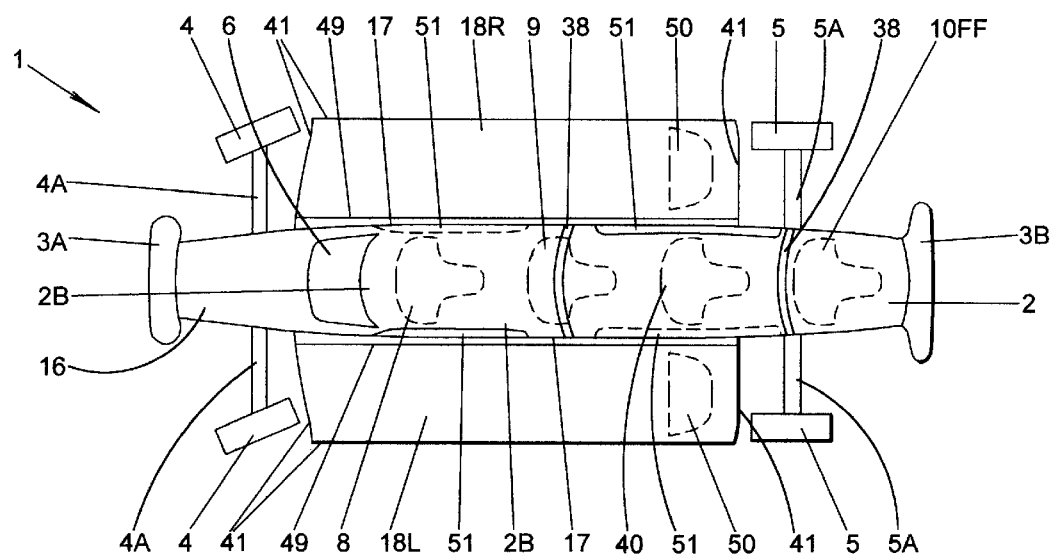
FIGS. 7A, 7B, and 7C show top views of typical embodiments of a third class of embodiments of the invention, with a central passenger accommodating area and cargo accommodating areas preferably on either side thereof.
Figure 7B:
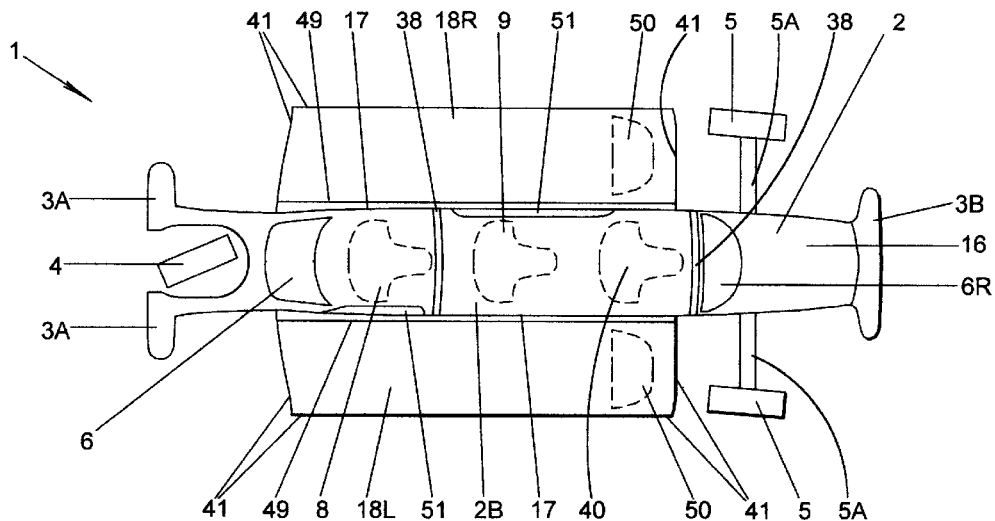
Figure 7C:
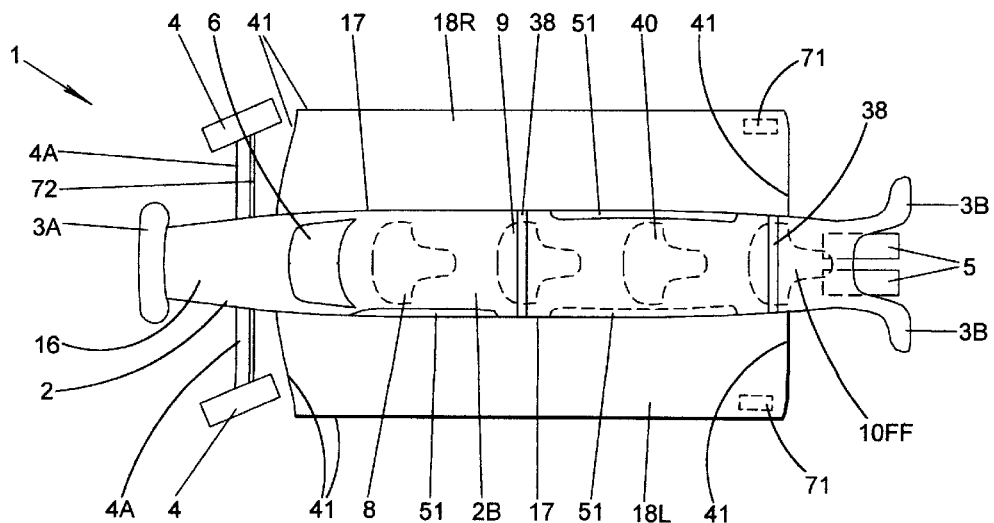

FIGS. 7a, 7b, and 7c show embodiments of a vehicle with a vehicle body 2 which serves as body means for carrying a load, wherein said body means comprises at least partially enclosed compartment means 2B for accommodating seat means for seating at least two persons substantially longitudinally disposed one in front of the other, for example in front seat 8 and rear seat 9. In the illustrated embodiment of FIG. 7A the enclosed compartment means 2B is of an elongated configuration—i.e., long and "skinny", and compartment means 28 further comprises means for seating additional persons in 3rd row seat 40 and optional forward-facing rearmost seat 10ff. Alternate embodiments may accommodate not just two, three or four, but five, six, or even more persons in longer bodies. Enclosing wall means 17 serve as means for contributing to enclosing the at least partially enclosed compartment means 2B. Cargo bed means for carrying cargo thereon are provided, which cargo bed means includes a cargo bed section, such as optional left (or right) side cargo bed 18L (or 18R), which is substantially located laterally disposed on at least one side of a person's seat in said seat means for seating at least two persons substantially longitudinally disposed one in front of the other (for example, this could be any of the seats 8, 9, 40, or 10ff in the illustrated embodiment). The illustrated cargo bed means further includes a second cargo bed section, in optional right (or left) side cargo bed 18R (or 18L), which is substantially located laterally disposed on the opposite side of said side of a person's seat in said seat means in said at least partially enclosed compartment means 2B. The left and right side cargo beds 18L and 18R could optionally have walls or railings 41 on their outer sides, front sides, and/or back sides. The left and right side cargo beds 18L and 18R could optionally be foldable against the sides of compartment means 2B using fold hinge lines 49, when not in use for carrying cargo. The left and right side cargo beds 18L and 18R could optionally be fitted with additional seat means 50 (possibly foldable, and fitted with seatbelts), for seating additional person(s) sidecar-style. A variety of known types of access door means 51 may be provided for access into compartment means 2B, including forward hingeline doors, aft hingeline doors, sliding doors, upward opening doors (Lamborghini Countach style), gull-wing doors, opening canopies, or other known types of access means, on the left and/or right hand sides or top of said compartment means 2B. Vertically sliding or rotating doors have the advantage of providing access without sweeping into the cargo holding volumes above the cargo beds 18L and 18R. If direct door access is not provided to some particular seat (e.g., seat 10FF), the seatback of the seat in front of it (e.g., seat 40) may be of a folding seatback configuration to enable access to the seat behind. External lights such as headlights, taillights, turn signal lights, parking lights, reflectors, and backup lights may be installed on the vehicle body 2 and/or at more outboard locations on or near the walls or railings 41 or tires 4 or 5 or bumpers 3A or 3B. In similar manner external lights can be installed in a variety of locations on the various embodiments of this invention.

In the embodiment of FIG. 7A, the motor vehicle 1 is supported by two front tires 4 and two rear tires 5. The word "tire" (also spelled as "tyre" in some places) is to be construed to include any combination of a wheel and/or a tire for the embodiments of this and other Figures. The tire may be pneumatic, semi-pneumatic, rigid, or of other type. The front tires are steerable and the rear tires are optionally steerable. Each front tire 4 is connected to the vehicle body 2 via the front axle 4A, which may contain single or dual axle elements, Each rear tire 5 is similarly connected to the vehicle body 2 via the rear axle 5A. The embodiment of FIG. 7A has an engine compartment 16 in a forward location, but alternate embodiments with rear or mid engine locations are also possible. The embodiment of FIG. 7A also features front and rear bumpers 3A and 3B, front windshield 6, and roll bar means 38 comprising 2 illustrated roll bars, though multiple roll bars or a roll cage may also be used.

FIG. 7B shows an embodiment similar to FIG. 7A, but with the two front tires 4 replaced with a single front tire 4, which is steerable and shown in a steered configuration. Two closely spaced side-by-side tires may be used in place of the single front tire 4, to serve a similar function. The front bumper 3A is shown in a two-part configuration, with one pan on either side of the front tire 4. A rear location engine compartment 16 is shown in FIG. 7B, and a rear window 6R is located behind 3rd row seat 40 and ahead of and above the engine compartment 16.

FIG. 7C shows an embodiment similar to FIG. 7A, but with the two outboard located rear tires 5 replaced with centrally located closely-spaced dual tires 5 (which may also be replaced by a single rear tire 5). The rear tire(s) may optionally be steerable, and if they are the front tires 4 may be optionally steerable or non-steerable. FIG. 7C also illustrates a steering control rod 72 used to control the steering angle of the steerable front tires 4. FIG. 7C also shows the optional use of a possibly retractable auxiliary support wheel and tire 71 under the outer undersides of the left and right side cargo beds 18L and 18R. The rear bumper 3B is illustrated as a two part unit, straddling on either side of the centrally located rear tire(s) 5.

Front-, rear-, or all-wheel drive versions of the embodiments of FIGS. 7A, 7B, 7C and other embodiments are possible within the spirit and scope of the invention.

Figure 8A:
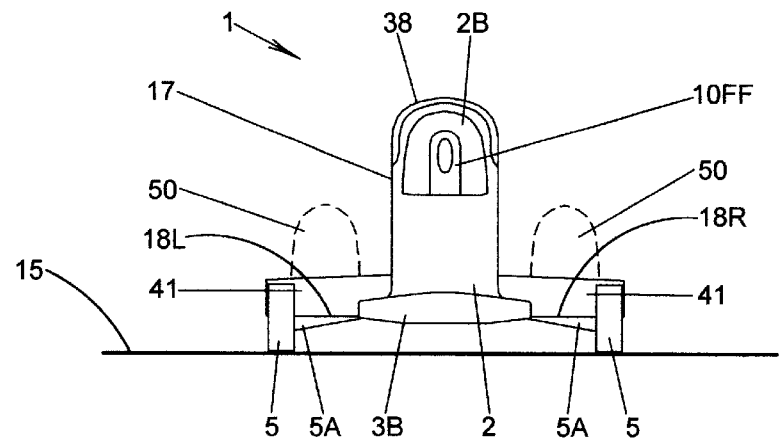
FIGS. 8A, 8B, and 8C show rear views of the FIG. 7A, 7B, and 7C embodiments.
Figure 8B:
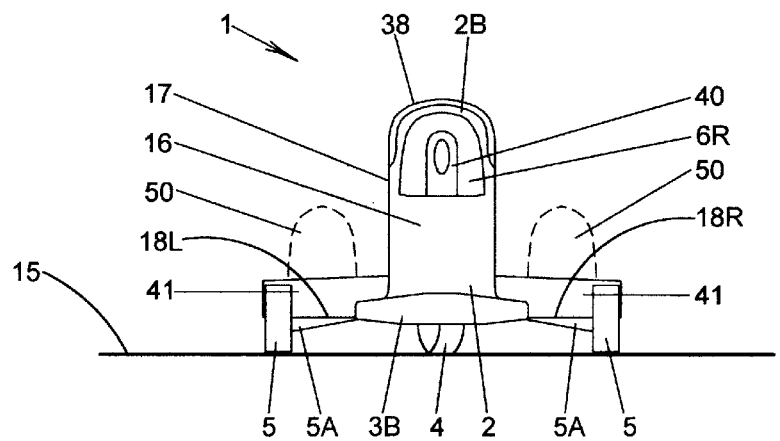
Figure 8C:
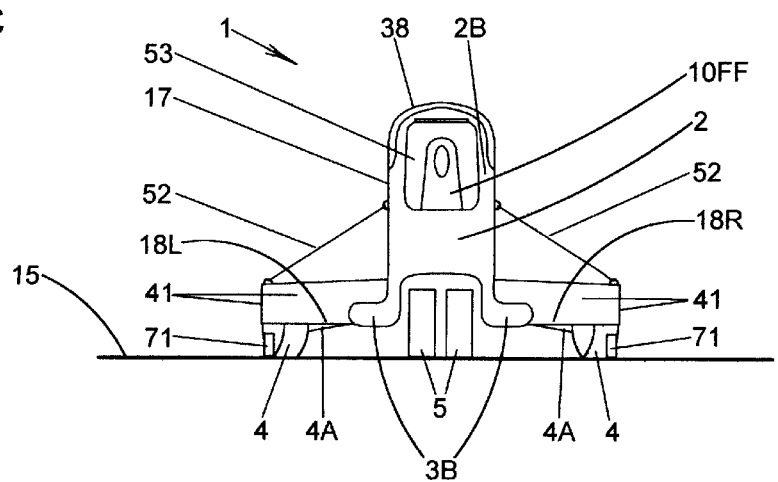

FIGS. 8A, 8B, and 8C show rear views of the embodiments of the motor vehicle 1 shown in FIGS. 7A, 7B, and 7C respectively, driving on road surface 15. The seatback top and headrest of seat 10FF is visible in FIGS. 8A and 8C, and the seatback top and headrest of seat 40 is visible in FIG. 8B. Note that alternate seatback and headrest configurations may be used within the spirit and scope of the invention. Minimalist type seatbacks with a single or dual narrow, upward-oriented backrest spine(s) and cross-members at selected vertical locations including headrest locations, could alternatively be used. The headrest configuration will preferably be designed to provide adequate whiplash protection in the event of a rear-end type of collision. Each seat may be fitted with conventional automobile style seat and shoulder belts, or possibly with race car type four or five-point safety harnesses. FIGS. 8A, 8B, and 8C show use of roll-bar means 38 or other roll-cage means to protect occupants of the at least partially enclosed compartment means 2B. The above described safety features serve as safety-enhancing means for contributing to the safety and protection of persons seated in said body means FIG. 8C also illustrates optional tie-down means 52 such as cable/cord means, which may be elastic to some extent, which may be of-a reel-out kind, and which have means for being fastened/connected to said vehicle 1 on either end of each cable/cord. Cargo tie-down nets or tarps may also be used in lieu of the illustrated tie-down cables/cords 52. FIG. 8C also illustrates an openable rear window hatch 53, which could be used to load small articles into the at least partially enclosed compartment means 2B in the small space behind the optional forward-facing rearmost seat 10FF, or in the space of the optional seat 10FF when it is not there.

Figure 9A:
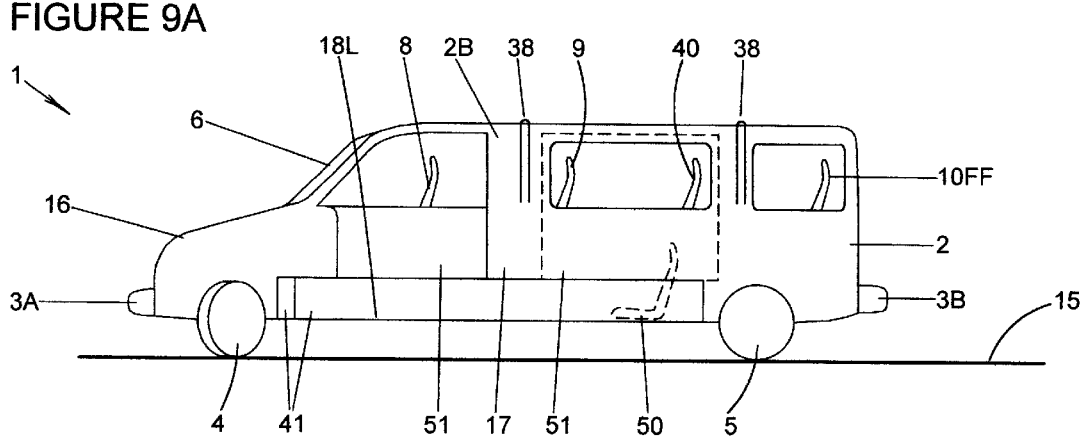
FIGS. 9A, 9B, and 9C show side views of the FIG. 7A, 7B, and 7C embodiments.
Figure 9B:
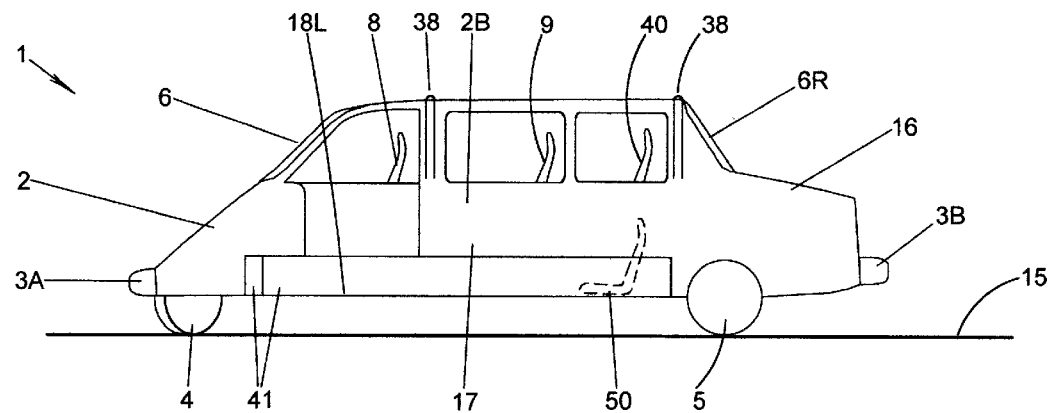
Figure 9C:
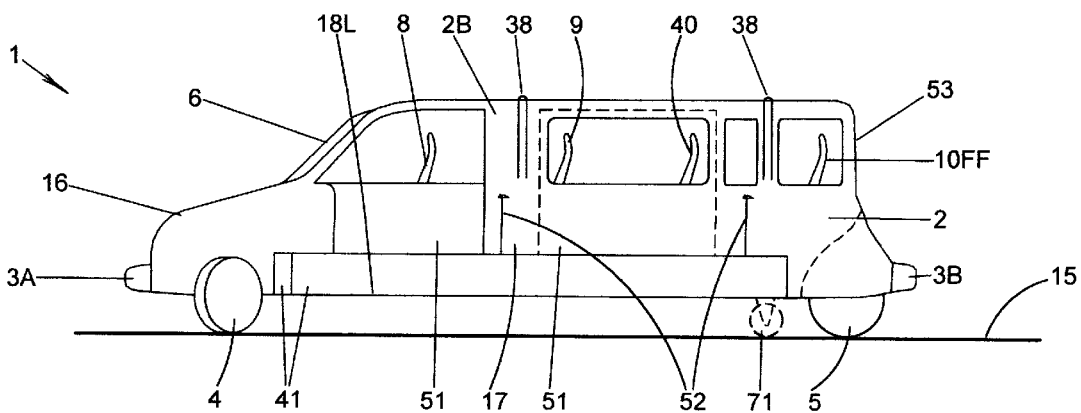

FIGS. 9A, 9B and 9C show side views of the embodiments of the motor vehicle 1 shown in FIGS. 7A, 7B and 7C and in FIGS. 8A, 8B and 8C respectively.

Figure 10A:
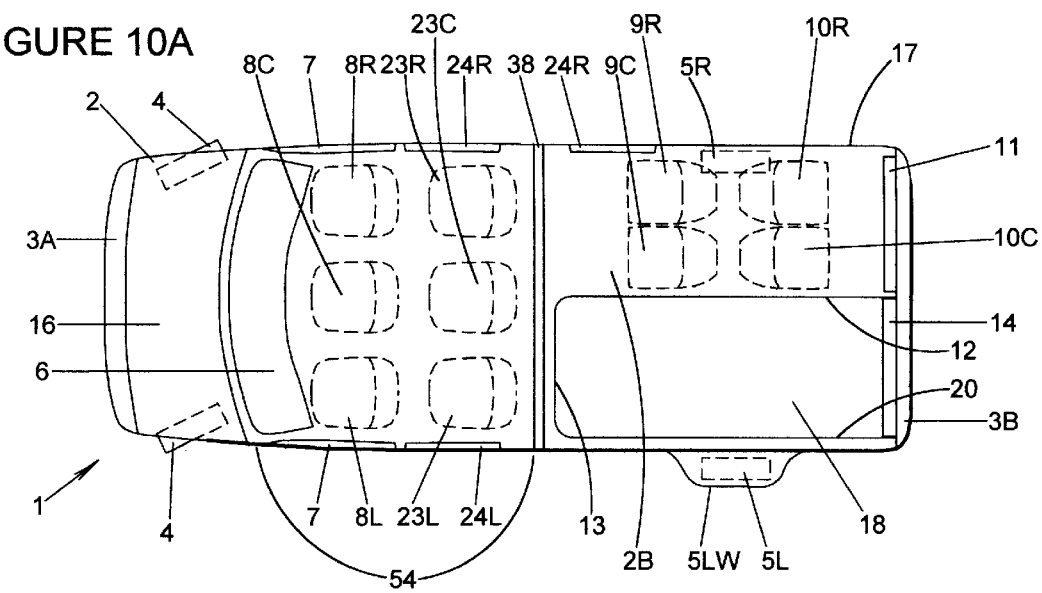
FIGS. 10A, 10B, 10C, 10D, 10E, 10F, 10G, 10H and 10I show top views of embodiments in the same class as the FIG. 1 embodiment, but with additional features illustrated, such as a lengthened forward passenger accommodating area (extended cab).

FIGS. 10A, 10B, 10C, 10D, 10E, 10F, 10G, 10H, and 10I show top views of embodiments in the same general class as the FIG. 1A and FIG. 1B embodiments. Some also feature a lengthened forward passenger accommodating area (extended cab) 54, which features additional longitudinal space behind the forward seats 8L, 8C and 8R and ahead of the front wall means 13, in which a second row of forward seats optionally can be fitted. For example, a second row of forward seats could comprise a second row forward left seat 23L, a second row forward center seat 23C, and a second row forward right seat 23R, as illustrated in FIG. 10A. With the three forward seats, three second row forward seats, the two forward-facing rear seats 9C and 9R, and the two aft-facing rearmost seats 10C and 10R, the illustrated embodiment in FIG. 10a has a nominal seating capacity of 10 persons. Access to the second row seats 23L, 23C and 23R and to the forward-facing rear seats 9C, 9R is by means of left side door means 24L and right side door means 24R (of which two are shown in the illustrated embodiment). The right side door means 24R providing access to one or both the second row seats and the forward-facing rear seats, may be a minivan style out-and-back opening sliding door or a conventional hinged door.

As in FIG. 1, the motor vehicle 1 shown in FIG. 10a can be seen to have a vehicle body 2 including an engine compartment 16 in front, front bumper 3A and rear bumper 33, front tires 4 and rear left tire 5L and rear right tire 5R, front windshield 6, and front doors 7. The particular elements recited immediately above in this paragraph are typical, and should not be construed as limiting the present invention. The front tires 4 and rear tires 5L and 5R comprise part of the running gear means for permitting the motor vehicle to move and maneuver upon a road surface. The front tires 4 are preferably steerable, and are illustrated in a steered configuration. The vehicle body 2 serves as body means for carrying a load, which body means is supported by the running gear means described above. As in FIG. 1A, the forward-facing rear center seat 9C and the aft-facing rearmost center seat 10C together provide seat means for seating at least two persons substantially longitudinally disposed one in front of the other. In the illustrated embodiment of the invention, the vehicle body 2 serves as body means for carrying a load, wherein said body means comprises at least partially enclosed compartment means 2B for accommodating the aforementioned seat means for seating at least two persons. Enclosing wall means 17 serve as means for contributing to enclosing the at least partially enclosed compartment means 2B. Rear door means 11 behind the aft-facing rearmost center seat 10C and rearmost right seat 10R also serve as means for contributing to enclosing the at least partially enclosed compartment means 2B. A pickup truck type of cargo bed 18 is located between the seats 9C, 10C and side wall 12 on one side, and cargo bed side wall means 20 on the other side. The rear left tire 5L is located in a housing area for the left wheel and tire 5LW, outboard of sidewall means 20 in the illustrated embodiment. This facilitates a wider minimum width and substantially constant width configuration of the cargo bed 18. While the rear left tire and wheel are moved outboard, the rear right tire 5R is not moved outboard so as to facilitate parallel parking on the right side of a road in a left-hand drive vehicle configuration. The cargo bed 18 serves as cargo bed means for carrying cargo thereon, which cargo bed means includes a cargo bed section (essentially the entire cargo bed in this illustrated embodiment) which is substantially located laterally disposed on at least one side of a person's seat in said seat means (i.e., this could be any of the seats 9C, 10C, 9R, 10R in the illustrated embodiment). Cargo bed rear closure means 14 provides means for enclosing the cargo bed on its rear side, and could comprise a tailgate or liftgate. The forward end of the cargo bed is enclosed with front wall means 13. Roll-bar means 38 serve as means for contributing to the protection of occupants of the vehicle in the event of a roll-over type accident. Multiple roll-bars and/or a roll cage could be used alternatively.

Figure 10B:
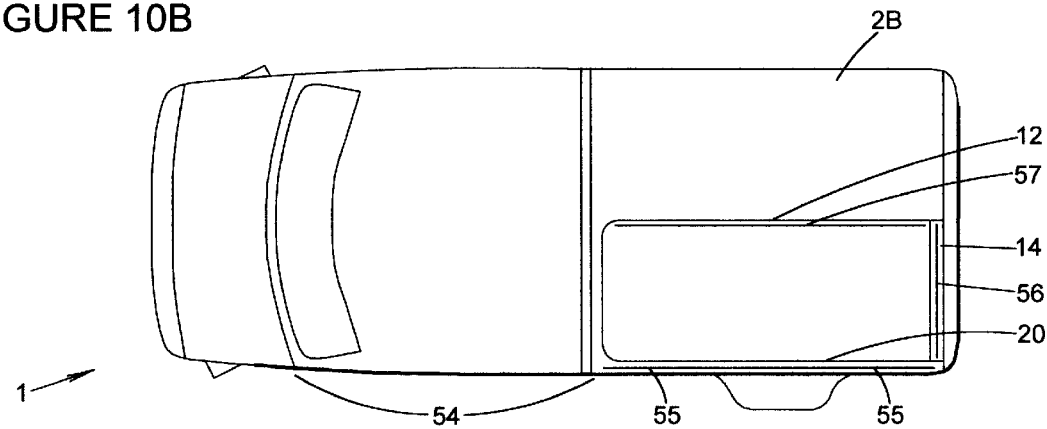

FIG. 10B shows an embodiment of a motor vehicle 1 similar to FIG. 10A, also fitted with an attachable upward wall extension 55 above the cargo bed sidewall means 20 and with attachable railing/fence means 56 above the cargo bed rear closure means 14. The attachable upward wall extension 55 and attachable railing/fence means 56 can serve as means for better containing cargo loads within the area above the cargo bed 18. This is especially so for large or tall cargo loads. Either wall extension or railing/fence means may optionally be used above both the side wall means 20 and the cargo bed rear closure means 14. FIG. 10B also shows window protection means 57 for protecting the side wall 12 (and optional side windows in it) on the at least partially enclosed compartment means 2B from contact, abrasion, or damage by cargo loads above the cargo bed 18. The window protection means may comprise bar-like, grid-like, fence-like, or sheet-like structures, which may be attachable, reelably deployable, foldably deployable, and/or slidably deployable to their protective configuration. The wall extension, railing/fence means, and side window protection means may also be used in other embodiments, within the spirit and scope of the invention.

Figure 10C:
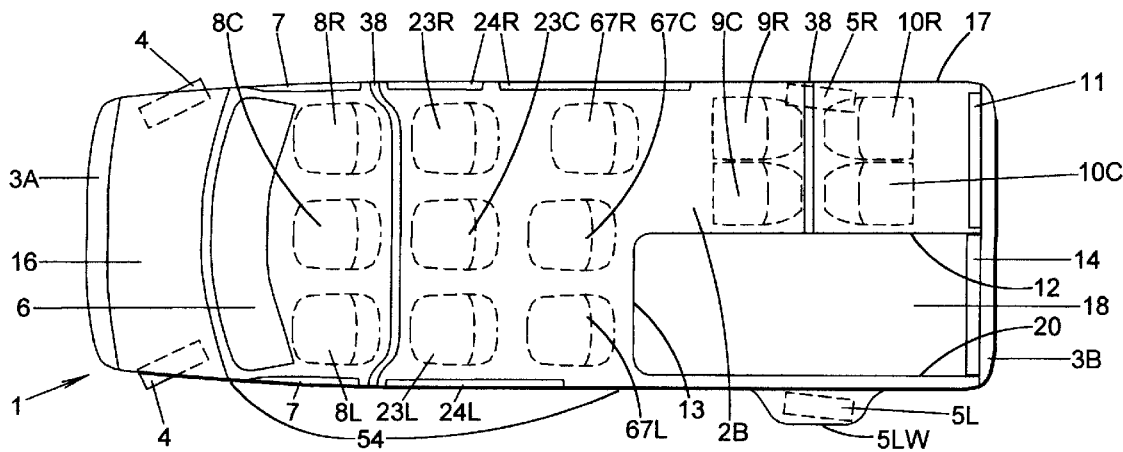

FIG. 10C shows a further lengthened configuration relative to the FIG. 10*a* embodiment, with added third row left, center, and right seats 67L, 67C and 67R. Left and right side door means 24L and 24R here include one conventional hinged door 24R and two conventional sliding doors 24L and 24R, which serve as door means for 4 permitting entry into and egress from said compartment means 2B. Said door means includes at east two doors on one side of said compartment means, at least one door on the other side of said compartment means, and at least one door (rear door means 11) at the back of said compartment means, all in conjunction to provide easy entry into and egress from various seats housed in said compartment means. Roll-bar means 38 are provided at two longitudinal positions for this very long body configuration, and serve as contributory safety-enhancing means for contributing to the safety and protection of persons seated in said body means. While bucket seats are illustrated for all seat locations, some could be combined into bench seats for this and other embodiments.

The motor vehicle 1 of FIG. 10C has tires including a tire (5L) which is located substantially to a side of the cargo bed means (cargo bed 18) with the outer face of said tire located outboard of the corresponding side of said body means (the cargo bed side wall means 20). The motor vehicle 1 of FIG. 10C also includes drive means for driving at least one tire (of 4 and 5L and 5R) using power from a motor in (engine compartment 16 o) said motor vehicle, braking means for braking at least one tire (of 4 and 5L and 5R) of said motor vehicle, and further comprising tire steering means acting on at least one tire (of 4 and 5L and 5R) for permitting said motor vehicle to be steered so as to maneuver laterally upon said road surface. In this embodiment all four tires 4 and 5L and 5R are acted on by said steering means, with rear wheel steering means (to enable the illustrated steered configuration of the rear wheels and tires 5L and 5R) being shown provided for improving the maneuverability d this very long motor vehicle configuration.

Figure 10D:
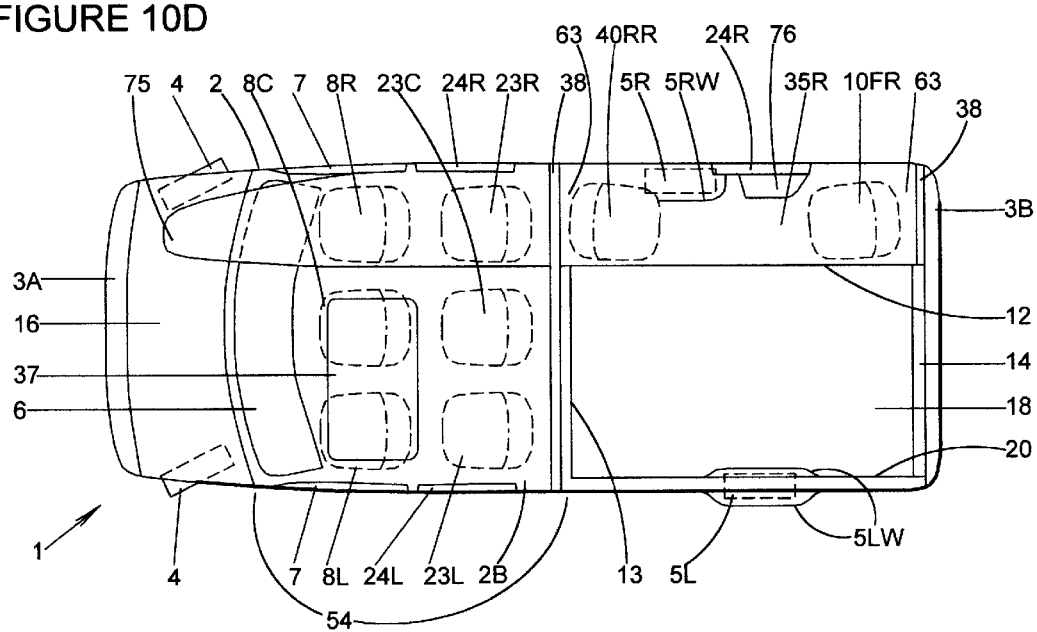

FIG. 10D shows a top view of an embodiment of the invention similar to the FIG. 10*a* embodiment, with a wider cargo bed 18 and a right passenger accommodating area 35R at the rear of the vehicle which only accommodates one person abreast rather than two abreast. The illustrated right passenger accommodating area 35R accommodates one rearward-facing passenger in rearward-facing right seat 40RR, and one forward-facing passenger in forward-facing rearmost right seat 10FR, in seat means for seating at least two persons substantially longitudinally disposed one in front of the other. Thus the illustrated embodiment of FIG. 10D shows a motor vehicle 1 with a one-abreast seat on the side of said partition means (side wall 12) wherein said seat means are located, and further shows in combination both forward-facing and aft-facing seats on the side of said partition means (side wall 12) wherein said seat means are located. Access to the area 35R for these passengers is provided via right side door means 24R and a step 76. The right tire 5R and wheelwell or housing area for the right wheel and tire 5RW are offset forward relative to the left tire 5L, so as to minimize interference with the door 24R and step 76 behind the wheelwell and with the seat 40RR forward of the wheelwell. The illustrated left tire 5L has a lateral location which is neither fully inboard nor fully outboard relative to the left cargo bed sidewall means 20, and a housing area 5LW for the left wheel and tire (i.e., left wheelwell which is also neither fully inboard nor fully outboard relative to the sidewall means 20. Thus the motor vehicle 1 of FIG. 10D also has tires including a tire (5L) which is located substantially to a side of the cargo bed means (cargo bed 18) with the outer face of said tire located outboard of the corresponding side of said body means (the cargo bed side wall means 20). This type of lateral wheel and tire location can also be used in other embodiments within the spirit and scope of the invention. The illustrated embodiment features a raised ceiling 63 above the right passenger accommodating area 35R, which then extends forward into a rooftop storage compartment 75, located above the seats 23R and 8R and high above the engine compartment 16. This rooftop storage unit is similar to the storage compartment 46 illustrated in FIG. 6B, and serves as enclosable storage compartment means for carrying and storing articles at a location above said at least partially enclosed compartment means 2B. Access means to the storage compartment 75 can be from the side, above doors 7 and 24R, and/or from inside the vehicle at the forward end of the raised ceiling 63 above the right passenger accommodating area 35R. Two roll-bar means 38 at two different longitudinal positions are illustrated in this embodiment, and a sunroof 37 (preferably of the slide-back type) is also illustrated above seats 8L and 8C.

Figure 10E:
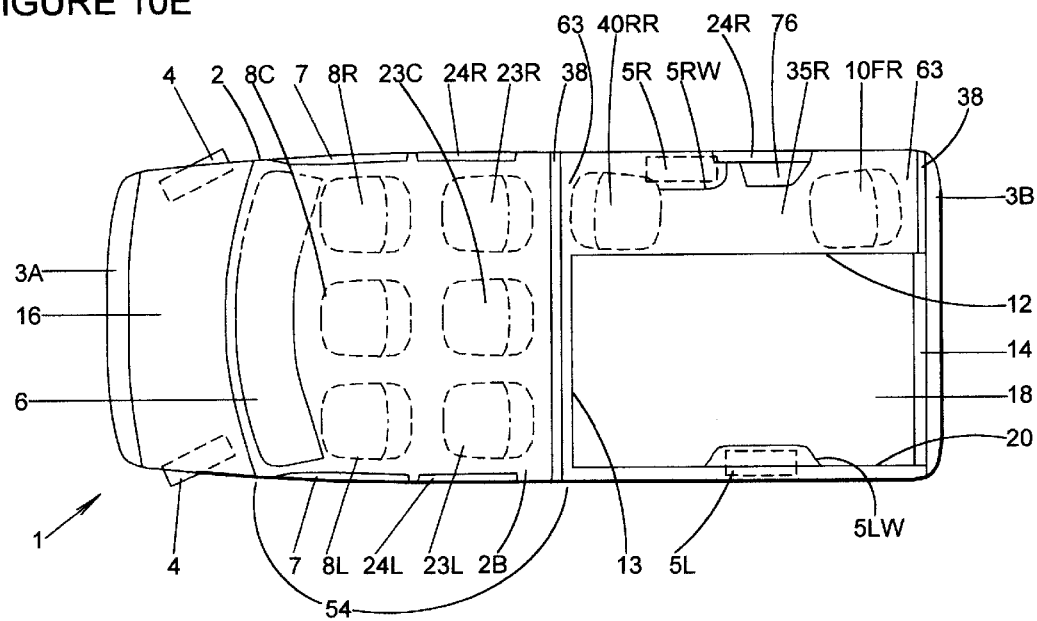

FIG. 10E shows an embodiment similar to FIG. 10D, but without the storage compartment 75 or sunroof 37. In this embodiment, the rearward-facing right seat 40RR is angled slightly toward the center of the vehicle to reduce interference of the right wheel housing 5RW with the left thigh of a seated passenger, and forward-facing rearmost right seat 10FR is also angled slightly toward the center of the vehicle to provide better leg room and space for the feet of a passenger, without their right foot tending to fall into the step 76. In this embodiment, the left tire 5L and left wheel and tire housing 5LW are now further inboard, and do not extend outward beyond the cargo bed side wall means 20. A vehicle of this type of embodiment could typically have dimensions of approximately 80 inches width by approximately 210 inches length, comparable to current full-size pickup trucks such as the Ford F-150, Chevy C-1500, or Dodge RAM models. These dimensions are representative and should not be taken to constrain the invention. The active suspension means of FIG. 6B may also be beneficially included in this FIG. 10E and other embodiments of the invention.

Figure 10F:
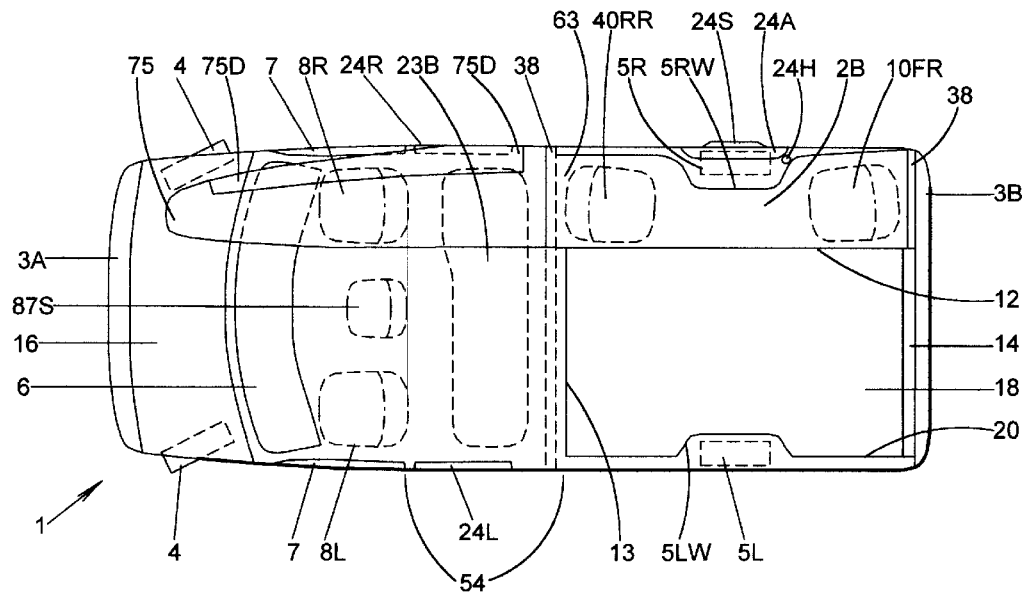

FIG. 10F illustrates an embodiment of the invention with features similar to those shown in FIGS. 10D and 10E, and the following differences. The front center seat 8C is replaced by a child seat module 87S. The child seat module 87S provides means for accommodating and securing a child in said child seat module and in said motor vehicle 1 while providing adequate safety and protection to said child in the event of an accident involving said motor vehicle. The word "child" is construed to include an infant, toddler, or child of sufficiently small age, size and weight as would typically be accommodated in a child safety seat in a motor vehicle. The child seat module will preferably be firmly securable to the (floor) structure of the motor vehicle cabin, and could feature a built-in child safety seat or just be a firm foundation on which a child safety seat can be secured by securing means such as rigid securing means or a seatbelt. The child safety seat could be a rearward-facing infant seat, forward-facing child seat, forward-facing booster seat, convertible seat, or other type of child safety seat Preferably, no airbag will be installed or deploy into the area immediately in front of the location of the child seat module 87S, to avoid the possibility of airbag-deploying-into-childseat types of problems which have occurred in the past when child seats were installed on front passenger seats with airbags in front of them. An optional feature would allow another type of module such as a storage container (e.g., similar to floor mounted storage compartment 46F described with respect to FIG. 1A) to be secured in the same location and to the same attachment fittings as the child seat module 87S.

FIG. 10F also illustrates the use of a rear bench seat 23B in lieu of rear bucket seats, behind the front seats 8L and 8R. A rooftop storage compartment 75 is shown, along with representative doors 75D for the rooftop storage compartment, which together provide enclosable storage compartment means for carrying and storing articles at a location above at least partially enclosed compartment means 2B. A high door over a wheelwell 24A (over the housing area 5RW for the right wheel and tire) is shown, along with step/rung/ladder means 24S and handhold means 24H for facilitating entry into and egress from the seating compartment (at least partially enclosed compartment means 2B) wherein seat means (seats 40RR and 10FR) are located. Side wall 12 serves as a partition means with a substantially longitudinal orientation for separating a cargo bed section (the cargo bed 18) from the area of said body means wherein said seat means are located (compartment means 2B). The compartment means 2B comprises in combination both forward-facing (10FR) and aft-facing (40RR) seats on the side of said partition means (side wall 12) wherein said seat means are located. The step/rung/ladder means 24S may be removable or retractable to facilitate changing the right rear tire 5R when required. The handhold means 24H may be of rigid or belt-like construction, and may be located either within or outside the seating compartment. Seats 40RR and 10FR may optionally be foldable or have foldable seat-bottoms, to facilitate use of the area they normally occupy for enclosed storage purposes.

Figure 10G:
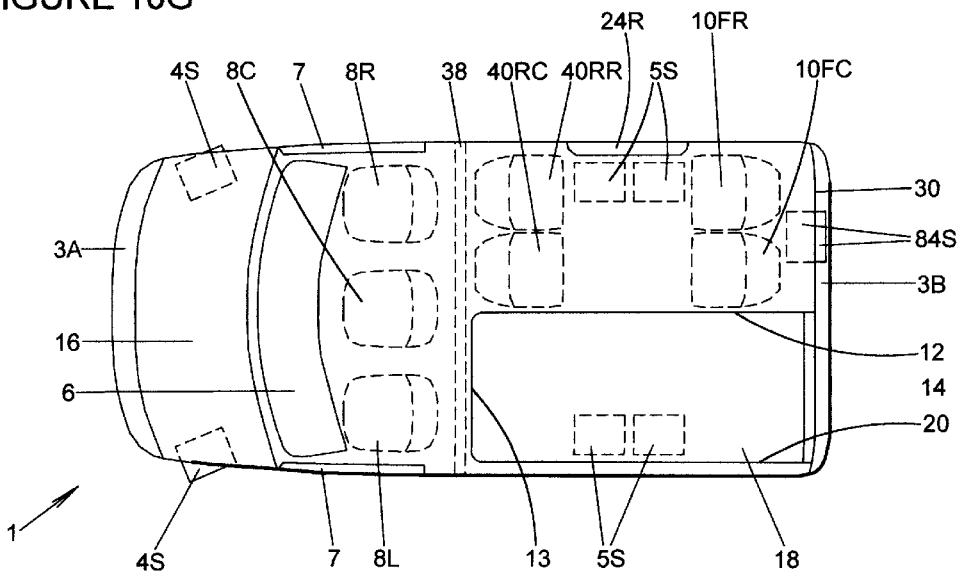

FIG. 10G illustrates an embodiment of the invention somewhat similar to that of FIG. 10E, with the following significant differences. Small front tires 4S and small rear tires 5S are used, which fit substantially under the vehicle and require no or minimal wheelwells intruding into the body of the vehicle. The small tires will be of smaller diameter than standard tires, and may be of greater, substantially equal, or smaller width relative to standard tires. Far example, small tires may have typical or representative dimensions of 16" diameter and 11" width, as compared to standard tires with typical or representative dimensions of 25" diameter and 85" width. Two small rear tires 5S are shown in tandem on each side of the vehicle in the illustrated embodiment, but alternately a single tire on each side or two side-by-side "dually" type small tires may be used on each side of the vehicle, Thus the illustrated embodiment provides running gear means which includes at least three tires (six illustrated) which normally contact said road surface. A small-diameter spare tire 84S is illustrated fitted in a housing or holder in rear wall means 30. The use of small rear tires 5S provides means for having a full-width cargo bed 18 without an intruding wheelwell or wheel housing and without requiring additional vehicle width associated with moving a rear wheel outboard relative to the vehicle body (e.g., as was the case in FIGS. 10C and 10D). In addition to rearward-facing rear seat 40RR, a rearward-facing center seat 40RC is added; and in addition to forward-facing rearmost right seat 10FR, forward-facing rearmost center seat 10FC is added in this embodiment. The use of small rear tires 5S provides means for persons to enter the partially enclosed compartment means wherein their seats (e.g., 40RR, 40RC, 10FR, 10FC) are located without having to step over a relatively tall housing for a rear tire (as was the case in the embodiment of FIG. 10F). The second row seats 23L, 23C, and 23R of FIG. 10E are also not included in this embodiment of FIG. 10G.

In addition to seat and shoulder belts, preferably airbag supplementary restraint systems will be provided for the occupants of each of the forward or front seats 8L, 8C, and 8R. Preferably means for disabling the airbag SRS for the front center seat 8C or the front passenger seat (e.g., 8R, in jurisdictions with left-hand drive where the driver's seat is 8L) will be provided, for cases when a child or infant seat is installed in the front center seat or front passenger seat. Means for controlling and annunciating this airbag enable/disable preferably will also be provided for this and other embodiments of the invention. Means may be provided for sliding the front center seat 8C or the front passenger seat aft on track mechanisms known in the prior art, for cases when a child or infant seat is installed thereon. This aft translation may be provided in addition to (preferable) or in lieu of the airbag disabling feature.

Figure 10H:
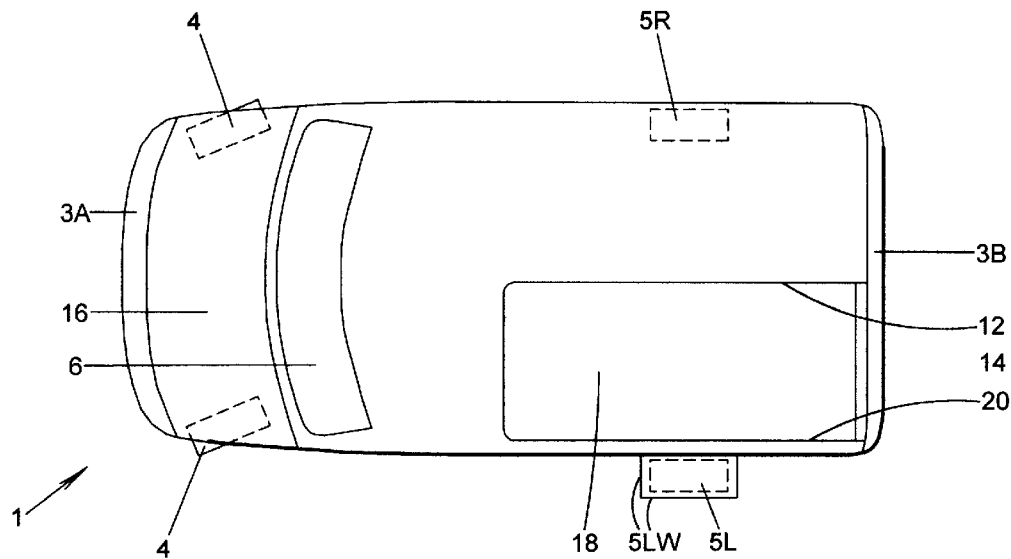
Figure 10I:
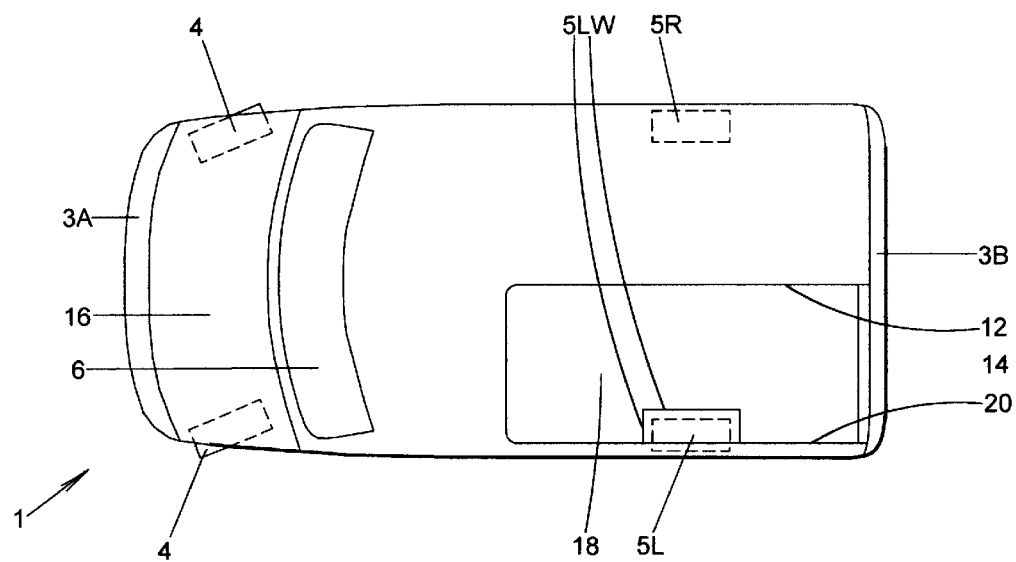

FIGS. 10H and 10I illustrate two configurations of an embodiment of the invention similar to the embodiment of FIG. 1A. The inventive feature illustrated here is the use of a laterally translatable rear wheel and wheel housing or wheelwell, to provide means for concurrently varying the minimum width of the cargo bed 18 and the maximum width of the vehicle 1. In FIG. 10H, the rear left tire 5L and the housing area 5LW for the left wheel and tire are shown in their outboard positions, corresponding to increased minimum width of the cargo bed 18 and increased maximum width of the vehicle 1. This configuration could be used when large cargo loads are being carried, such as the Queen Bed of FIG. 2B, for example. In FIG. 10I, the rear left tire 5L and the housing area 5LW for the left wheel and tire, are shown in their inboard positions or configurations, corresponding to decreased minimum width of the cargo bed 18 and decreased maximum width of the vehicle 1. This configuration could be used when large cargo is not being carried and when it is desired to park the vehicle in a relatively narrow or "Compact" space, or maneuver the vehicle in tight spaces. The means for translating the tire (e.g., 5L) and the means for translating the wheel and tire housing area (e.g., 5LW) could include wheel, tire & housing translating drive means; wheel, tire & housing translating bearing means; axle translating or axle extension means; sliding seal means where the housing (5LW) has a sliding interface with the cargo bed side wall means 20; electrical connection means (e.g., if lights are provided on the housing 5LW, as shown in FIG. 1A), and possibly brake mechanism translation means.

Figure 11A:
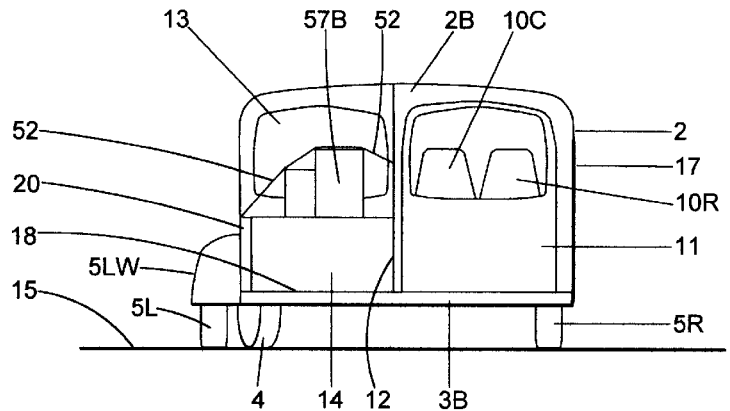
FIGS. 11A, 11B and 11C show rear views of the FIG. 10A, 10B and 10C embodiments; with FIG. 11A also showing carriage of a representative cargo load.
Figure 11B:
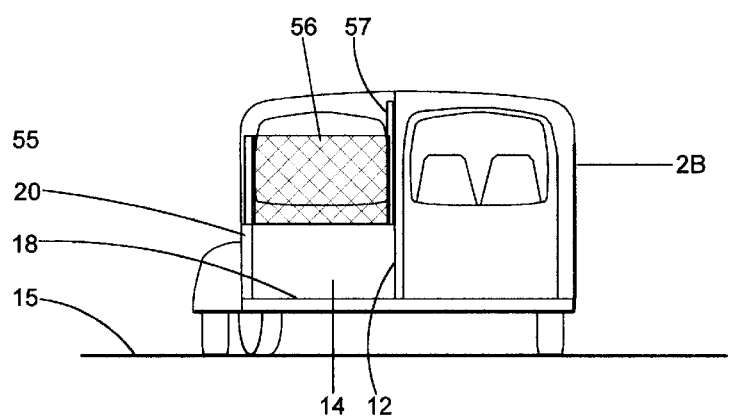
Figure 11C:
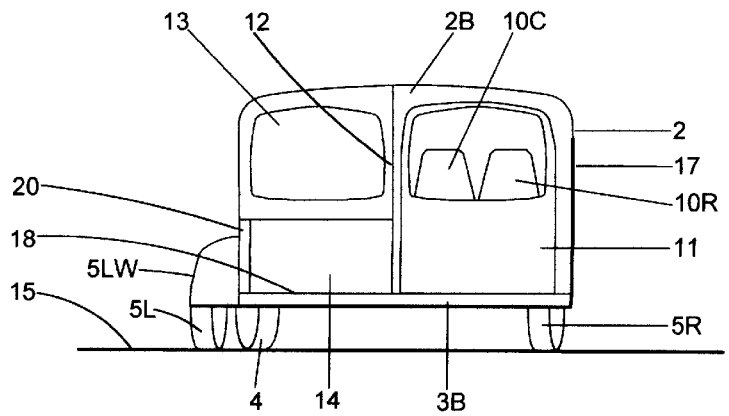

Thus the embodiment of FIG. 10H comprises tires which include a tire (5L) which is located substantially to a side of said cargo bed means (cargo bed 18) with the outer face of said tire located outboard of the corresponding side of said body means; and in going to the configuration of FIG. 10I further comprises means for laterally repositioning said tire (5L) (and its housing 5LW) so as to decrease the overall width of the vehicle 1 along with the minimum width of the cargo bed 18. FIGS. 11A, 11B and 11C show rear views of the FIG. 10A, 10B and 10C embodiments of the invention, driving on a road surface 15. FIG. 11A also illustrates the potential use of tie-down means 52 (such as fittings for attaching cables or cords and optionally the cables or cords themselves, such as cable/cord means described earlier with reference to FIG. 8C) for helping to secure a representative cargo load 57B. The tie-down means 52 serve as securing means for securing articles on the cargo bed means.

Figure 12A:
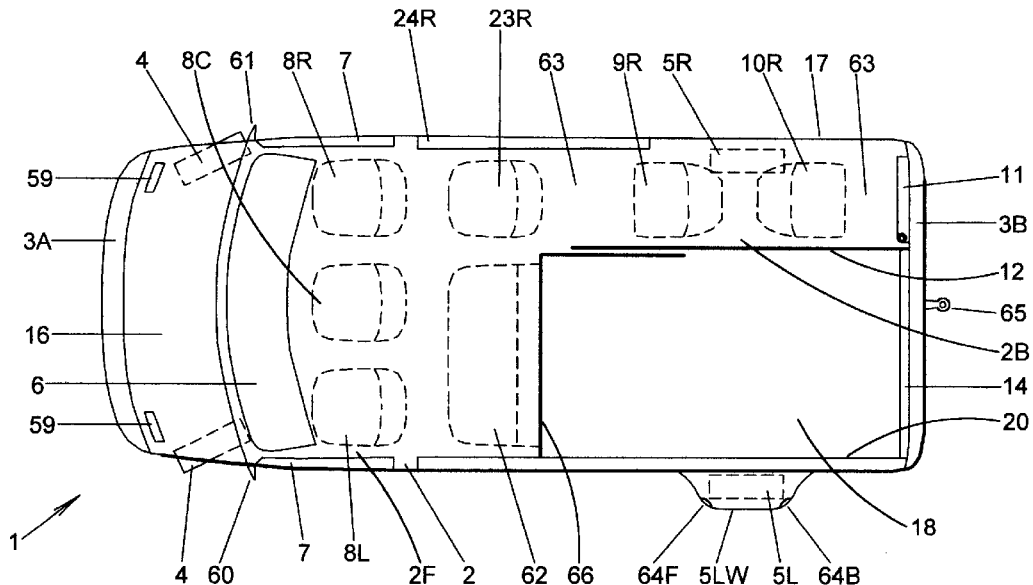
FIGS. 12A and 12B show top views of two configurations of a variable configuration embodiment in the same class as the embodiment of FIG. 1.
Figure 12B:
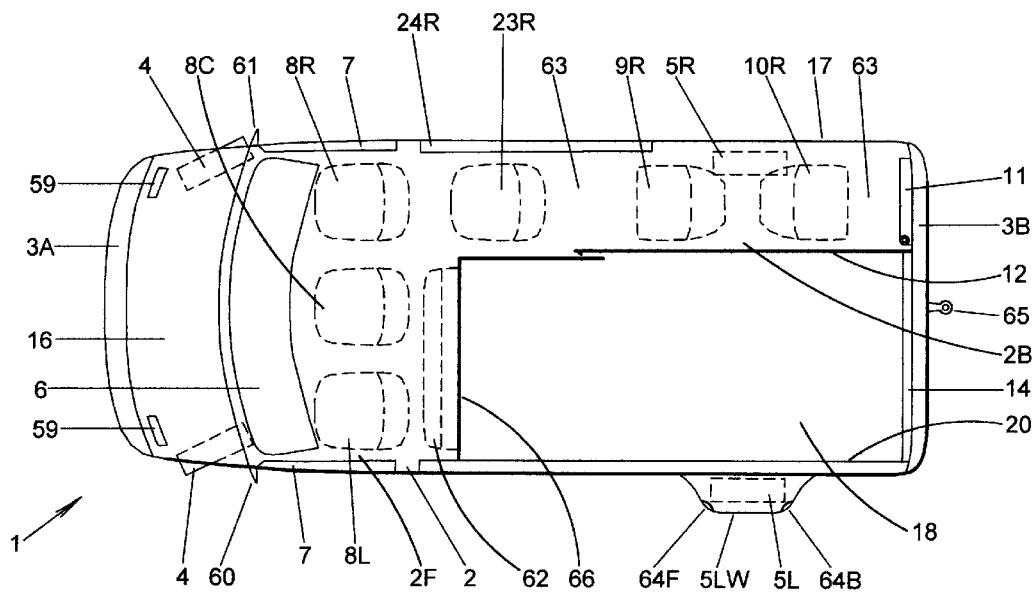

FIGS. 12A and 12B show top views of another embodiment of the invention in the class of the FIG. 1A embodiment, which is also somewhat similar to and incorporates some features from the embodiments of FIGS. 10A, 10D and 10E. Headlights 59 are illustrated. Conventional other lights such as taillights, turning signal lights, backup lights, parking lights, and reflectors are not illustrated, but could be provided in this and other embodiments. On the housing area for the left wheel and tire 5LW, a wheel housing front light 64F and wheel housing back (or rear) light 64B are illustrated. A left mirror housing 60 and right mirror housing 61 are illustrated. Preferably in this embodiment the right mirror housing 61 will be retractable with power retraction means, to reduce vehicle effective width when necessary—e.g., when entering a limited width garage for parking the vehicle. In various embodiments either or both the left and right mirror housings may be retractable. The illustrated embodiment also features a raised ceiling 63 above the forward-facing rear right seat 9R and the aft-facing rearmost right seat 10R, and a towing hitch 65 for towing trailer devices behind the motor vehicle 1. The illustrated embodiment also has movable partition means 66 in place of the front wall means 13 of the FIG. 1A embodiment. This movable partition means 66 is illustrated in its aft position in FIG. 12A and in its forward position in FIG. 12B. When in its aft position (FIG. 12A), retractable bench seat 62 (substantially adjacent to second row forward right seat 23R) can be deployed to increase vehicle seating capacity while reducing cargo capacity. When the movable partition means 66 is in its forward position (FIG. 12B), cargo capacity can be increased but the retractable bench seat should be in its retracted position. This feature allows the vehicle to carry relatively more passengers or cargo as warranted by the circumstances. This feature can also be applied to other embodiments of the invention. Variant embodiments may feature retractable bench (or bucket) seats being structurally attached to the movable partition means 66 and/or to the floor of the vehicle body itself. The illustrated right side door means 24R is a long sliding door for providing access to seats 9R, 23R as well as the bench seat 62 when deployed.

Thus the embodiment of FIGS. 12A and 12B provides a motor vehicle 1 comprising running gear means (front tires 4 and rear left and right tires 5L and M) for permitting said motor vehicle to move and maneuver upon a road surface and body means for carrying a load (vehicle body 2) which body means is supported by said running gear means, wherein said body means comprises (i) at least partially enclosed compartment means 2B for housing seat means for seating at least two persons substantially longitudinally disposed one in front of the other (e.g., in seats 9R and 10R), (ii) front at least partially enclosed compartment means 2F for housing front seat means for seating at least two persons substantially laterally disposed one aside the other (e.g., in seats 8L and 8R), which front at least partially enclosed compartment means is located substantially contiguously and in front of said at least partially enclosed compartment means, and (iii) cargo bed means for carrying cargo thereon (cargo bed 18) which cargo bed means includes a cargo bed section which is substantially located laterally disposed on a side of a person's seat in said seat means (e.g., seats 9R or 10R) in said at least partially enclosed compartment means (2B). The embodiment of FIGS. 12A and 12B further illustrates partition means comprising side wall 12 for separating said cargo bed means (cargo bed 18) from (i) said at least partially enclosed compartment means 2B; and partition means comprising movable partition means 66 for separating said cargo bed means (cargo bed 18) from (ii) said front at least partially enclosed compartment means 2F. The embodiment of FIGS. 12A and 12B further illustrates means for repositioning said (movable) partition means 66 and for thereby changing the sizes of said cargo bed means (cargo bed 18) and at least one of (i) said at least partially enclosed compartment means 2B, and (io said front at least partially enclosed compartment means 2F (this is the one that changes size between the configurations illustrated in FIGS. 12A and 12B).

It should be understood that selected features of the FIGS. 12A and 122B embodiments can be applied to other embodiments as well, within the spirit and scope of the invention as defined in the claims. Similarly selected features of each illustrated embodiment could be applied to other illustrated embodiments within the spirit and scope of the invention as defined by the claims.

Figure 13A:
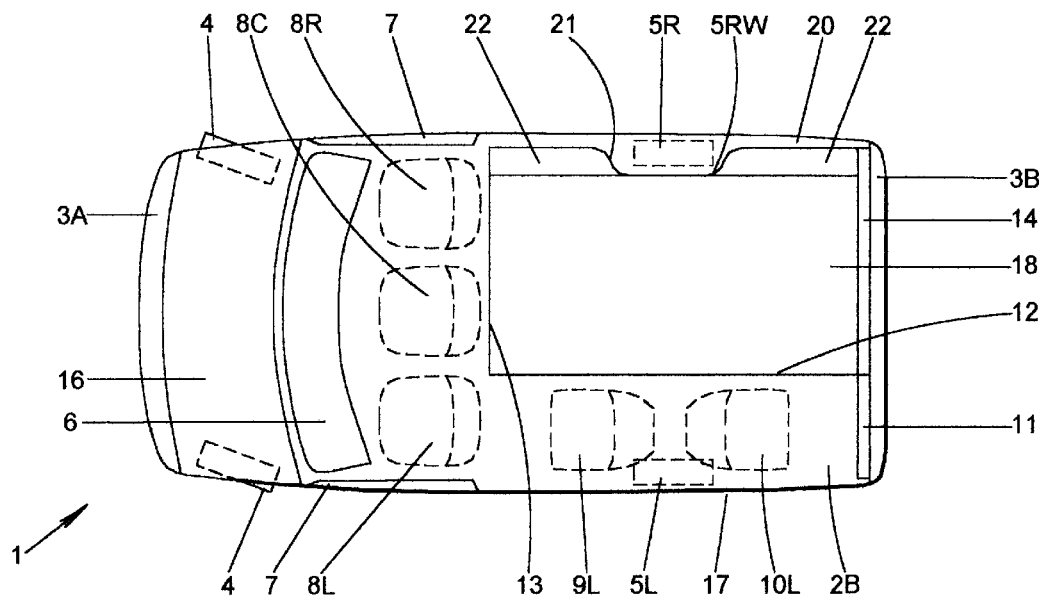
FIGS. 13A, 13B, 13C, 13D and 13E show top views of other embodiments of the invention in the same class as the embodiment of FIG. 1.

FIG. 13A shows a top view of an embodiment of the invention which can be considered as a variant of the FIG. 4 embodiment or the FIG. 1A embodiment. Relative to the FIG. 4 embodiment, a key difference is that the FIG. 13A embodiment has seat means for seating at least two persons substantially longitudinally disposed one in front of the other, only on one side rather than on both sides of the cargo bed 18. In FIG. 13A said seat means for seating at least two persons can be construed to comprise: (i) said forward left seat (8L) and a rear left seat (9L or 10L, which can be a forward- or aft-facing seat) located substantially behind said forward left seat; or (ii) forward-facing rear left seat 9L and aft-facing rearmost left seat 10L in conjunction. Access to seat 9L is via the left side front door 7, assuming a foldable-forward seatback for front left seat 8L. Alternatively, a lengthened (possibly sliding) door 7 could be furnished on the left hand side of the vehicle, and the front left seatback need not be foldable-forward. In the FIG. 13A embodiment the cargo bed 18 is bounded on its left side by side wall 12, on its aft/rear side by cargo bed rear closure means 14, on its front side by front wall means 13, and on its right side by cargo bed side wall means 20 optionally including contoured wall means 21 above the housing area for the right wheel and tire 5RW (i.e., right wheel weld. The cargo bed side wall means 20 may be of low (e.g., 6 inches), medium (e.g., 2 feet), high (e.g., 5 feet) or other height. Side wall compartment means 22 may optionally be incorporated into the cargo bed side wall means 20, and may be accessible from either or both the pickup bed side and/or the right outside side of the vehicle. A variant of the FIG. 13A embodiment could feature a seating area on the right side and a cargo bed on the left side (as in FIG. 1A) instead of the illustrated embodiment's seating area on the left side and cargo bed on the right side of the vehicle. The two alternatives have their own relative advantages, for example in terms of typical lateral load distributions, driver's inside rear view mirror fields of view, and curb-side access to rear seats, depending on whether the vehicle is in a left-hand-drive or right-hand-drive jurisdiction.

Figure 13B:
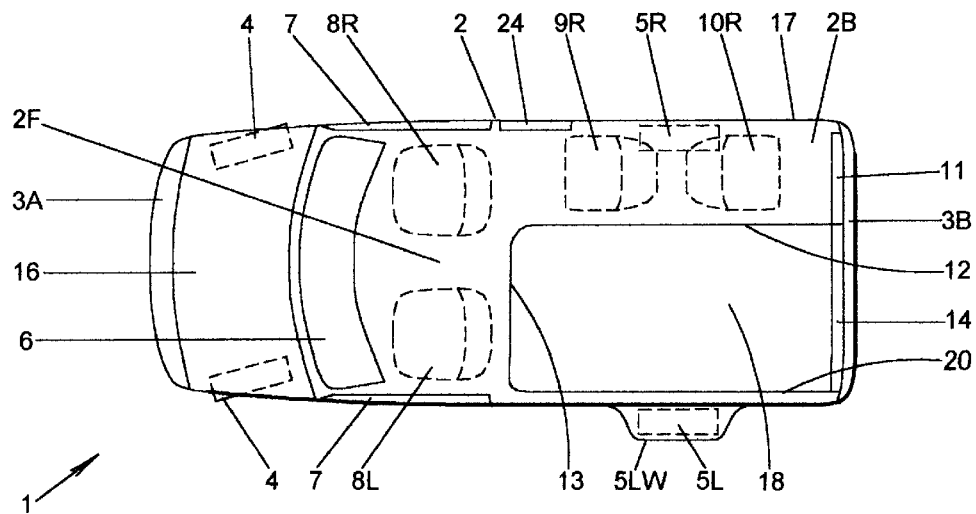

FIG. 13B illustrates a variant embodiment of a smaller, four-seat embodiment of the invention of a similar general configuration as the larger, eight-seat embodiment of FIG. 1A. This embodiment would provide a vehicle competitive with a compact pickup truck, with two more seats than a typical compact pickup truck (a front bench seat instead of the illustrated two front bucket seats 8L and 8R could enable one additional passenger for either the illustrated vehicle or a typical compact pickup truck). The pickup cargo bed 18 is probably similar in minimum width with that of a compact pickup truck, as the width used up by the compartment for seats 9R and 10R is compensated for substantially by the absence of wheelwells or wheel housings intruding into the pickup bed, as is usually the case for prior art pickup trucks. The embodiment of FIG. 13B is intended to provide a lightweight, low-cost vehicle with all the advantages of a compact pickup truck and the ability to carry two more passengers in comfortable bucket seats (9R and 10R).

Thus the embodiment of FIG. 13B provides a motor vehicle 1 comprising running gear means (front tires 4 and rear left and right tires 5L and 5R) for permitting said motor vehicle to move and maneuver upon a road surface and body means for carrying a load (vehicle body 2) which body means is supported by said running gear means, wherein said body means comprises (i) at least partially enclosed compartment means 2B for housing seat means for seating at least two persons substantially longitudinally disposed one in front of the other (e.g., in seats 9R and 10R), (ii) front at least partially enclosed compartment means 2F for housing front seat means for seating at least two persons substantially laterally disposed one aside the other (e.g., in seats 8L and 8R), which front at least partially enclosed compartment means is located substantially contiguously and in front of said at least partially enclosed compartment means, and (iii cargo bed means for carrying cargo thereon (cargo bed 18) which cargo bed means includes a cargo bed section which is substantially located laterally disposed on a side of a person's seat in said seat means (e.g., seats 9R or 10R) in said at least partially enclosed compartment means (2B).

Figure 13C:
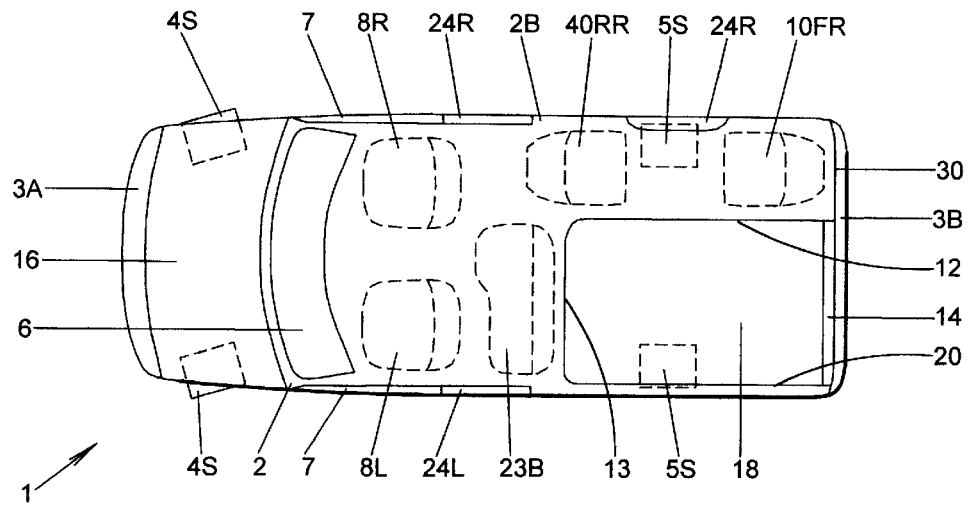

FIG. 13C illustrates another variant embodiment of a "compact" embodiment of the invention similar but a bit larger than the four seat embodiment of FIG. 13B. This embodiment includes a bench seat 23B behind the front left seat 8L and behind the space between the front seats 8L and 8R. This bench seat is shown with a longer seat bottom for the portion of the bench seat for the person behind the space between the front seats 8L and 8R, who will have more legroom than the person in the portion of the bench seat behind the front left seat 8L. An additional right side door means 24R is shown immediately behind the right side front door 7, for facilitating access to the bench seat 23B. This would typically be a rear-hinged door, as provided in some existing extended cab pickup trucks, or could alternatively be a forward hinged or sliding door. The embodiment of FIG. 13C is shown with a rearward-facing right seat 40RR and a forward-facing rearmost right seat 10FR in the portion of the at least partially enclosed compartment means 2B which is to the side of the pickup bed 18, instead of the forward-facing rear right seat 9R and the aft-facing rearmost right seat 10R shown in the embodiment of FIG. 13B. The embodiment of FIG. 13C could alternatively use the seats 9R and 10R as shown in FIG. 13B. Thus the embodiment of FIG. 13C provides seats for six persons, which could also be increased to seven if a front bench seat for three were provided instead of the illustrated two front bucket seats 8L and 8R.

The embodiment of FIG. 13C also shows the use of small front tires 4S and small rear tires 5S, in a manner similar to and for reasons similar to the use of such small tires described with reference to FIG. 10G (though in this embodiment 4 small tires contacting the ground rather than 6, are illustrated). The pickup cargo bed 18 is probably similar in minimum width with that of a compact or mid-size pickup truck, as the width used up by the compartment 2B for seats 40RR and 10FR is compensated for substantially by the absence of wheelwells or wheel housings intruding into the pickup bed, as is usually the case for prior art pickup trucks. The embodiment of FIG. 13C is intended to provide a lightweight, low-cost vehicle with all the advantages of a compact or midsize pickup truck and the ability to carry six or seven persons (including the driver of the vehicle 1).

Figure 13D:
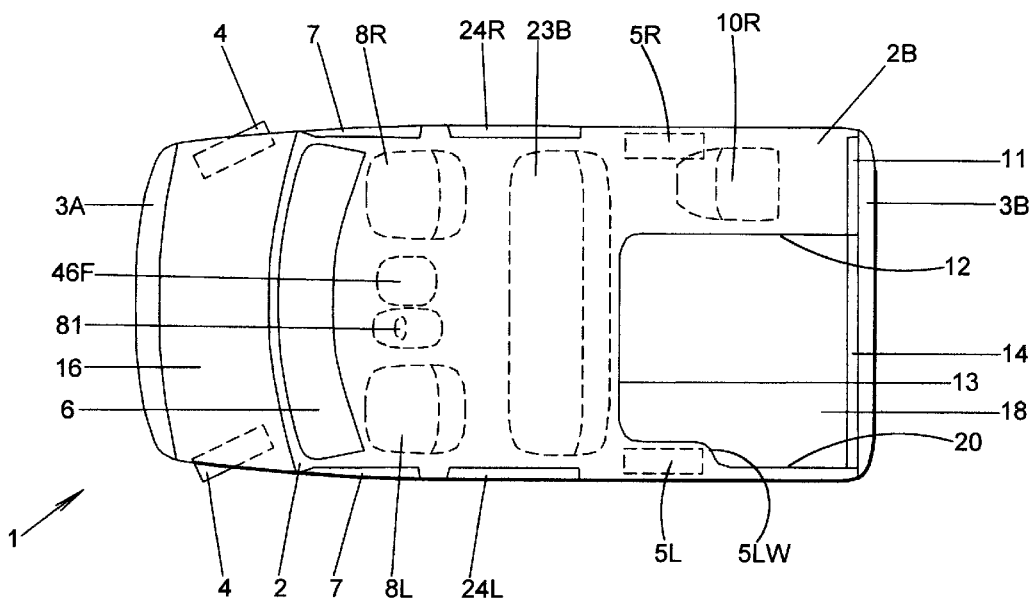
Figure 13E:
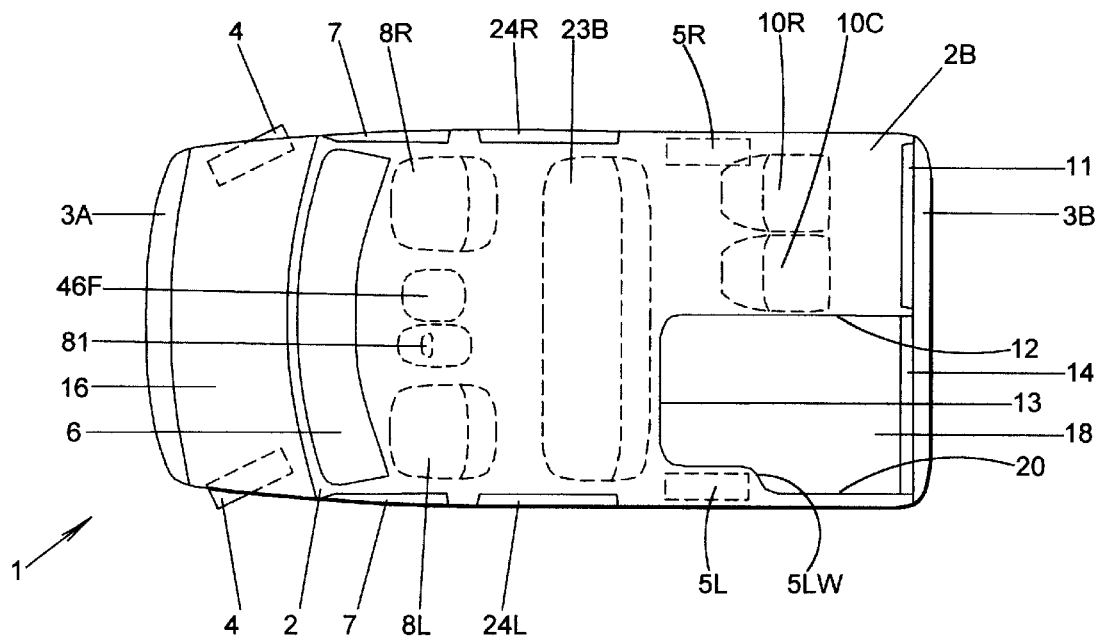

FIGS. 13D and 13E illustrate two additional embodiments of mid-size variants of the invention. From the front seats 8L and 8R and forward of them, these embodiments are generally similar to the embodiment of FIG. 1A. This portion of the vehicle includes enclosable storage compartment means (floor mounted storage compartment 46F) for carrying and storing articles at a location in the at least partially enclosed compartment means 2B. A second row bench seat 23B for up to three persons is provided behind the front seats, in a manner similar to the embodiment of FIG. 10F. The embodiment of FIG. 13D includes an aft-facing rearmost right seat 10R, and the embodiment of FIG. 13E includes in addition an aft-facing rearmost center seat 10C. Therefore the embodiment of FIG. 13D provides seats for accommodating up to six persons, and the embodiment of FIG. 13E provides seats for accommodating up to seven persons, all in addition to cargo on the pickup cargo bed 18.

In summary, the preferred embodiment of the invention illustrated in FIG. 13D provides a motor vehicle 1 comprising running gear means (including tires 4, 5L and 5R) for permitting said motor vehicle to move and maneuver upon a road surface and body means for carrying a load (vehicle body 2) which body means is supported by said running gear means, wherein said body means comprises seat means for seating at least two persons substantially longitudinally disposed one in front of the other ((i) in front right seat 8R and in aft-facing rearmost right seat 10R; or (ii) in the rightmost seating space in bench seat 23B and in aft-facing rearmost right seat 10R), and cargo bed means (cargo bed 18) for carrying cargo on a cargo bed section at a location which is substantially laterally disposed on a side of a person's seat (aft-facing rearmost right seat 10R) in said seat means. The body means (vehicle body 2) further comprises at least partially enclosed compartment means 2B for housing said seat means for seating at least two persons. Said compartment means 2B also includes contiguously a forward center section and two forward side sections which are the forward left section and forward right section, wherein said forward left section, forward center section, and forward right section together provide means for accommodating a forward left seat 8L and a forward right seat 8R which is substantially located laterally disposed relative to said forward left seat 8L.

When said seat means for seating at least two persons substantially longitudinally disposed one in front of the other comprises seat means for seating at least two persons in front right seat 8R and in aft-facing rearmost right seat 10R, (said forward left seat or) said forward right seat 8R also serve as part of said seat means for seating at least two persons substantially longitudinally disposed one in front of the other, and said seat means for seating at least two persons comprises said forward right seat and a rear right seat located substantially behind said forward right seat.

Figure 14A:
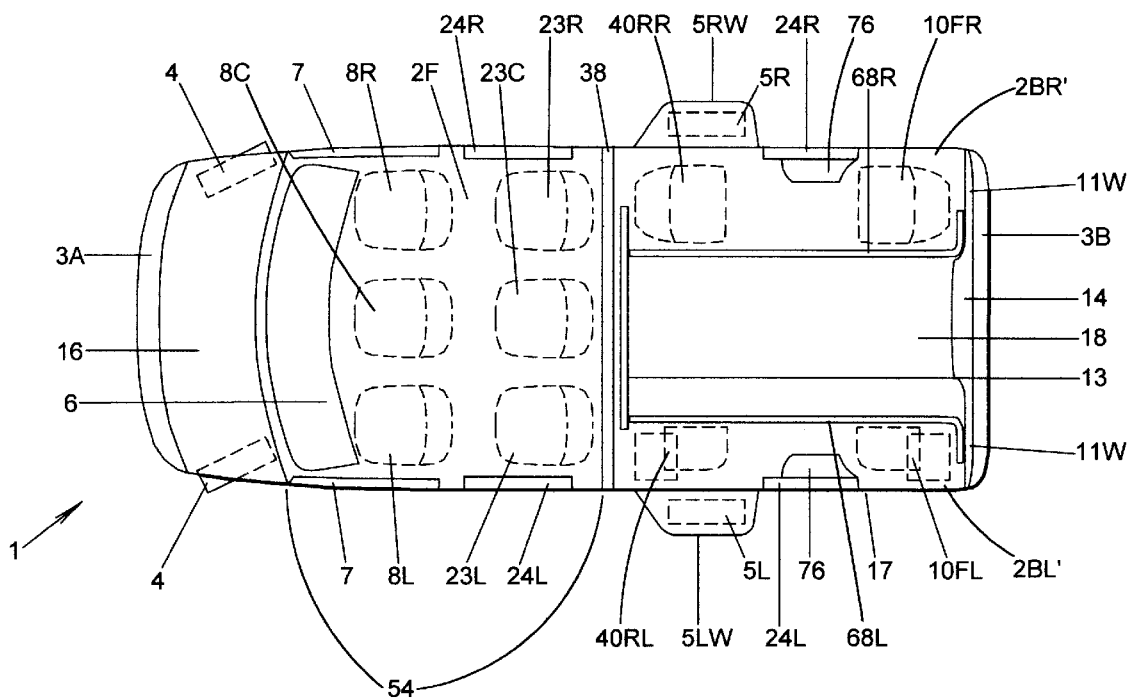
FIGS. 14A, 14B and 14C show top views of embodiments in the same class as the embodiment of FIG. 4.
Figure 14B:
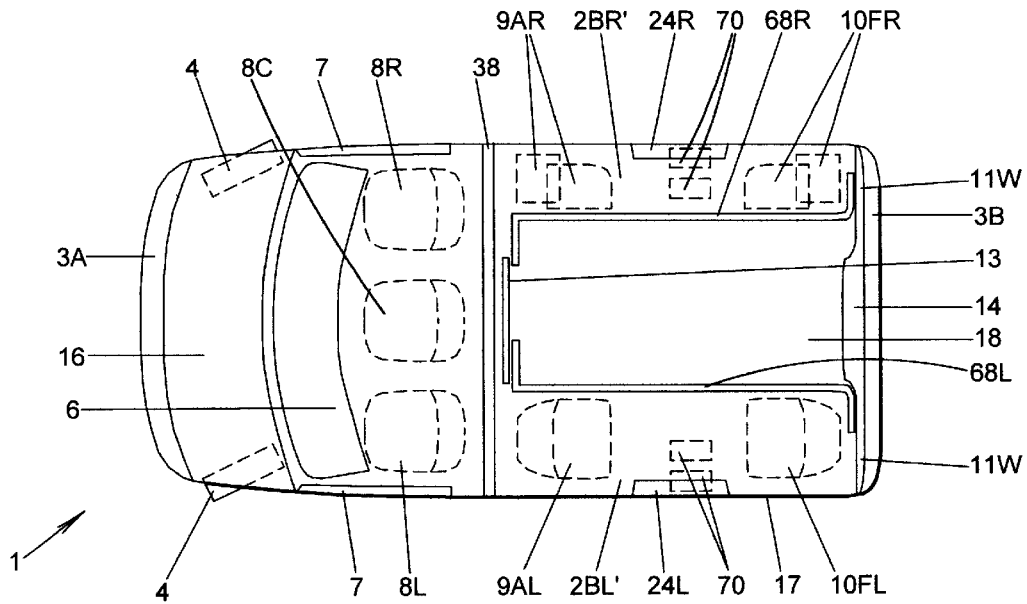
Figure 14C:
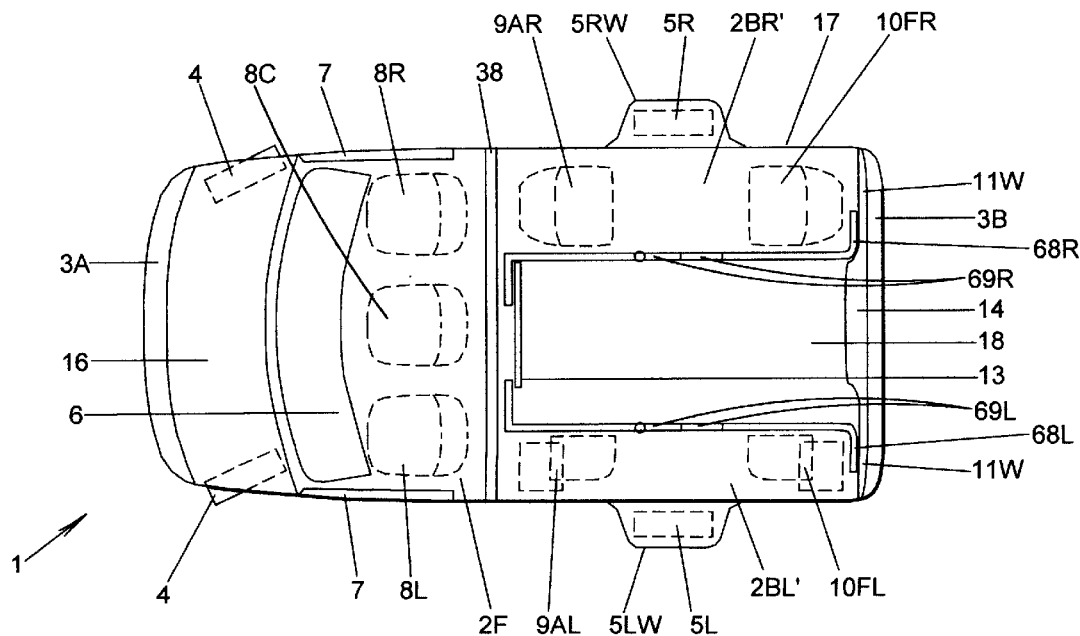

FIGS. 14A, 14B and 14C show embodiments of the invention in the class of the FIG. 4 embodiment. The FIG. 14A embodiment has outboard located housing areas (wheelwells) 5LW and 5RW for the left and right wheels and tires 5L and 5R, respectively, which enable use of rearward-facing right seat 40RR and rearward-facing left seat 40RL (in place of FIG. 4's forward-facing rear right and left seats 9R and 9L) and the use of forward facing rearmost left and right seats 10FL and 10FR (in place of FIG. 4's aft-facing rearmost left and right seats 10L and 10R). Seat pairs 40RR and 10FR (and 40RL and 10FL) now provide an opportunity for two occupants to face each other, converse, and possibly use a common access door (such as rearmost doors 24R on the right and 24L on the left, with access to the seats via a step 76, on each side); while still also providing means for seating at least two persons substantially longitudinally disposed one in front of the other (on each side). In FIG. 14A, the sidewalls 12 are replaced by right and left laterally movable partition means 68R and 68L, which slidably connect with front wall means 13 at their forward ends and which slidably connect with rear wall means 11W at their rear ends. In FIG. 14A, the right and left laterally movable partition means are illustrated in their inboard and outboard positions, respectively, and the motor vehicle 1 can seat 8 persons. Right side seats 40RR and 10FR are shown in deployed and usable configurations, while left side seats 40RL and 10FL are shown in retracted or folded away configurations which take up less vehicle width, but cannot be used for seating when retracted or folded away. Eight persons could also be seated if the left and right laterally movable partition means were placed in their inboard and outboard positions, respectively. If both movable partition means were in their inboard positions, the remaining cargo bed 18 would be narrow, but 10 people could be seated. If both movable partition means were in their outboard positions, the exposed and usable cargo bed 18 would be wide and could carry a lot of cargo, but only 6 persons could be seated in the vehicle. The use of laterally moving partitions to enable tradeoffs between usable passenger seat count and cargo bed size can also be applied to other embodiments of the invention, including the FIG. 1A embodiment and others. The embodiment of FIG. 14A also has a lengthened forward passenger accommodating area 54 which accommodates second row forward left, center, and right seats 23L, 23C, and 23 (which seats are accessible via a middle pair of side door means 24L and 24R and which seats are located substantially behind front seats 8L, 8C, and 8R, respectively). The illustrated embodiment is fitted with roll-bar means 38 comprising a single roll-bar, but alternatively multiple roll bars or a roll cage could be used.

FIG. 14B shows an embodiment similar to FIG. 14A, but without the lengthened forward passenger accommodating area 54 and without the outboard located wheelwells 5LW and 5RW. The rear of the vehicle is now supported by under-the-body small dual-unit wheels and tires 70. Non-common spare tires (e.g., a small dual-unit wheel and tire behind a rearmost seat and a front tire under the cargo bed 18), ride quality and handling qualities may be areas in which the embodiment of FIG. 14B differs from the embodiment of FIG. 14A. A single wider small radius tire similar to small tire 5S in FIG. 13C could be used in lieu of the dual-unit wheels and tires 70. Means for seating at least two persons substantially longitudinally disposed one in front of the other are still provided on each side of the aft end of the vehicle, with aft-facing rear right seat 9AR and aft-facing rear left seat 9AL; which face towards forward-facing rearmost right and left seats 10FR and 10FL, respectively. As in FIG. 14A, right and left laterally movable partition means 68R and 68L are provided, which slidably connect with front wall means 13 at their forward ends and which slidably connect with rear wall means 11W at their rear ends. Similar laterally movable partitions could also be used in other embodiments of the invention, within the spirit and scope of the invention. In FIG. 14B the partition means 68R and 68L are fitted with transverse flange sections at their forward ends and slidably engage a narrower width front wall means 13 than in FIG. 14A. In FIG. 14B, the left and right laterally movable partition means are illustrated in their inboard and outboard positions, respectively, and the motor vehicle 1 can seat 5 persons. Left side seats 9AL and 10FL are shown in deployed and usable configurations, while right side seats 9AR and 10FR are shown in retracted or folded away configurations which take up less vehicle width, but cannot be used for seating when retracted or folded away. Access to the aft side seating compartments (means for seating at least two persons substantially longitudinally disposed one in front of the other) is provided by means of side doors 24R on the right and 24L on the left, as in FIG. 14A. Thus the embodiment of FIG. 14B can seat three, five, or seven persons with correspondingly decreasing amounts of cargo in the pickup cargo bed 18.

FIG. 14C shows another embodiment similar to FIG. 14A, without the lengthened forward passenger accommodating area 54 but with the outboard located wheelwells 5LW and 5RW. Means for seating at least two persons substantially longitudinally disposed one in front of the other are still provided on each side of the aft end of the vehicle, with aft-facing rear right seat 9AR and aft-facing rear left seat 9AL facing forward-facing rearmost right and left seats 10FR and 10FL, respectively. As in FIG. 14B, right and left laterally movable partition means 68R and 68L are provided, which slidably connect with narrow front wall means 13 at their forward ends and which slidably connect with rear wall means 11W at their rear ends. In this embodiment the forward flanges of the lateral partition means 68R and 68L are slidably connected to the front face rather than the rear face of the front wall means 13. In FIG. 14C, the right and left laterally movable partition means are illustrated in their inboard and outboard positions, respectively, and the motor vehicle 1 can seat 5 persons. Right side seats 9AR and 10FR are shown in deployed and usable configurations, while left side seats 9AL and 10FL are shown in retracted or folded away configurations which take up less vehicle width, but cannot be used for seating when retracted or folded away. Access to the aft side seating compartments (means for seating at least two persons substantially longitudinally disposed one in front of the other) is now provided by left and right partition door means 69L and 69R, which are located in the lateral partition means 68L and 68R, respectively. The partition door means 69L and 69R may be sliding doors, inward or outward opening hinged doors, bifold doors (illustrated), or other type of doors.

The embodiments of FIGS. 14A, 14B, and 14C therefore provide a motor vehicle 1 with partition means (68L, 68R) for separating the cargo bed means (cargo bed 18) from the left and right at least partially enclosed compartment means 2BL' and 2BR', and further comprising means for repositioning said partition means (68L, 68R) and for thereby changing the sizes of said cargo bed means (cargo bed 18) and said at least partially enclosed compartment means 2BL' and 2BR'. The means for repositioning said partition means provides means for laterally repositioning said partition means so as to increase or decrease the width of the cargo bed section (cargo bed 18). Door means (doors 24L and 24R in FIGS. 14A and 14B and doors 69L and 69R in FIG. 14C) are provided for permitting entry into and egress from said compartment means 2BL' and 2BR'. The illustrated motor vehicle 1 further comprises front at least partially enclosed compartment means 2F for housing front seat means for seating at least two persons substantially laterally disposed one aside the other (e.g., in seats 8L and 8R), which front at least partially enclosed compartment means is located substantially contiguously and in front of said left at least partially enclosed compartment means 2BL', said right at least partially enclosed compartment means 2BR', and the cargo bed 18.

Figure 15A:
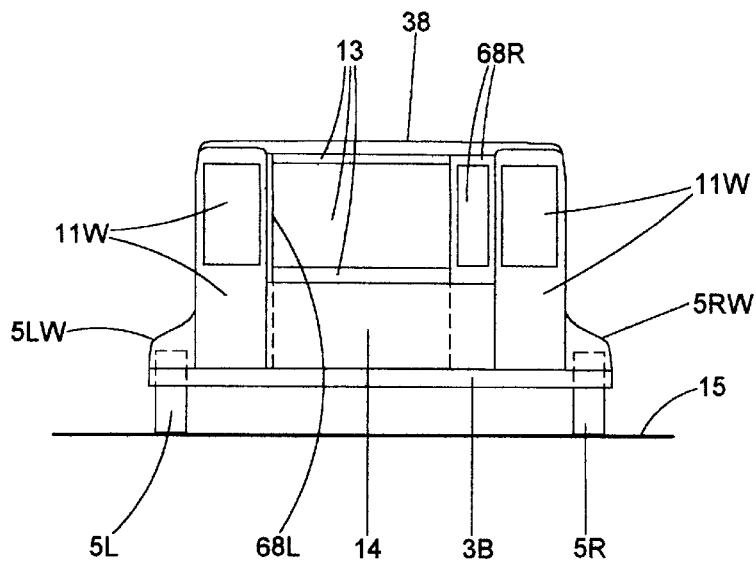
FIGS. 15A, 15B and 15C show rear views of the FIG. 14A, 14B and 14C embodiments.
Figure 15B:
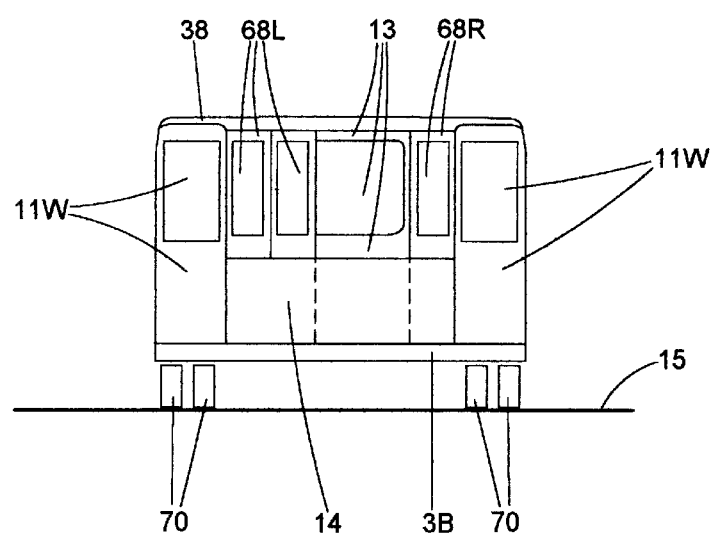
Figure 15C:
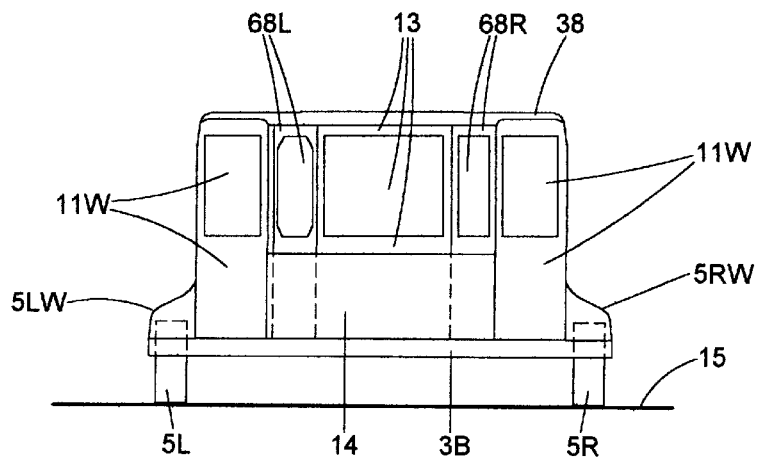

FIGS. 15A, 15B and 15C show rear views of the FIG. 14A, 14B and 14C embodiments, driving on a road surface 15.

Figure 16:
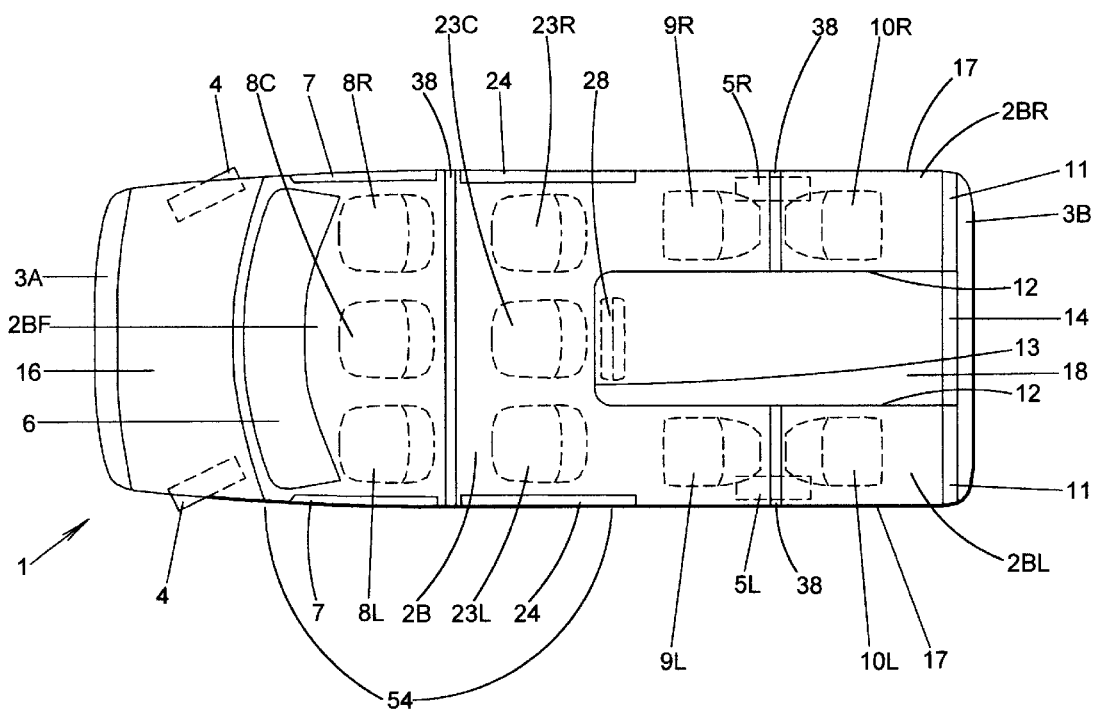
FIG. 16 shows a top view of an embodiment in the same class as the embodiment of FIG. 4, but with a lengthened forward passenger accommodating area (extended cab).

FIG. 16 shows a top view of an embodiment similar to the FIG. 4 embodiment, with a lengthened forward passenger accommodating area (extended cab) 54. The extended cab features additional longitudinal space behind the forward seats 8L, 8C, 8R and ahead of the front wall means 13, in which space a second row of forward seats optionally can be fitted. For example, a second row of forward seats could comprise a second row forward left seat 23L, a second row forward center seat 23C, and a second row forward right seat 23a, as illustrated. With the three forward seats, three second row forward seats, the two forward-facing rear seats 9L and 9R, and the two aft-facing rearmost seats 10L and 10R, the illustrated embodiment has a nominal seating capacity of 10 persons. An optional fold-down at-facing pickup bed seat 28 (or dual-occupancy bench seat) can be installed behind the front wall means 13, to raise the seat count to 11 (or 12) persons. The pickup bed seat 28 provides deployable additional seat means occupying some space in said cargo bed means (cargo bed 18). Similar optional fold-down or non-folding aft-facing pickup bed seats can be incorporated into other embodiments of the invention as well. The location where the optional pickup bed seat 28 is illustrated, if not used for such a seat, could alternatively be used as a location to house one or more spare tire(s). Access to the second row seats 23L, 23C, 23R and to the forward-facing rear seats 9L, 9R is by means of side door means 24, typically minivan style out-and-back opening sliding doors on one or both sides of the vehicle (or single or dual hinged doors could be used in lieu of a long chord sliding door). As in FIG. 4, the forward-facing rear left seat 9L and aft-facing rearmost left seat 10L together provide seat means for seating at least two persons substantially longitudinally disposed one in front of the other. The forward-facing rear right seat 9R and aft-facing rearmost right seat 10R similarly together provide seat means for seating at least two persons substantially longitudinally disposed one in front of the other.

Thus FIG. 16 shows a motor vehicle 1 with at least partially enclosed compartment means 2B for housing seat means for seating at least two persons substantially longitudinally disposed one in front of the other (in seats 9R and 10R in a rear right section 2BR, or in seats 9L and 10L in a rear left section 2BL), wherein said compartment means also includes contiguously a forward section 2BF with a forward center section and two forward side sections which are the forward left section and forward right section, and wherein said forward left section, forward center section, and forward right section together provide means for accommodating a forward left seat 8L and a forward right seat 8R which is substantially located laterally disposed relative to said forward left seat 8L. The seat means for seating at least two persons (in seats 9L and 10L or in seats 9R and 10R), is contained in at least one of two rear side sections 2BL and 2BR of said compartment means which are substantially located behind said forward left section and said forward right section. A cargo bed section (cargo bed 18) is substantially located between said two rear side sections 2BL and 2BR and behind said forward center section in said forward section 2BF.

Figure 17:
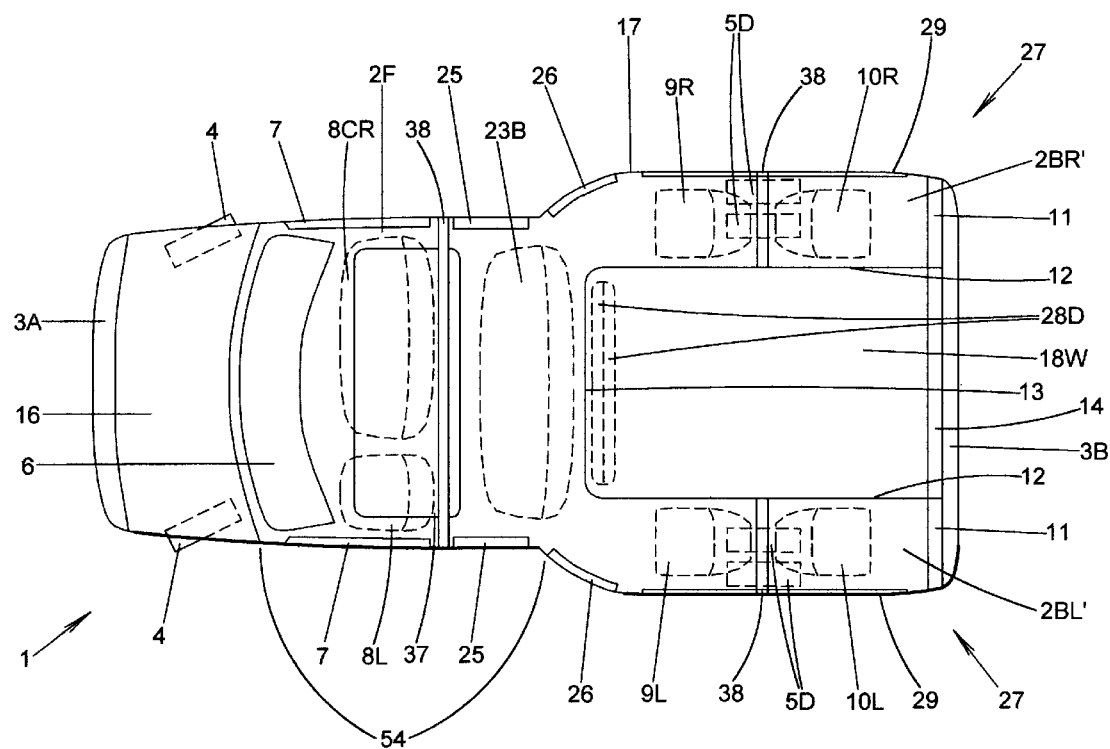
FIG. 17 shows a top view of another embodiment in the same class as the embodiment of FIG. 4, which could also potentially be built upon an existing pickup truck chassis.

FIG. 17 shows a top view of another embodiment somewhat similar to the FIG. 16 embodiment. Differences from the FIG. 16 embodiment include potential use of a more pickup truck type (chassis, engine compartment and forward body) configuration rather than a more minivan type configuration; use of an optional bench seat 23B in lieu of the second row forward seats 23L, 23C, 23R; use of optional bench front seat 8CR instead of bucket-type front seats 8C and 8R; addition of a sunroof 37; use of a widened aft body 27 with a widened pickup bed 18W; use of an (optional side-by-side two seat) fold-down aft-facing pickup bed seat 28D; use of separate second row door means 25 for access to the optional bench seat 23B; and use of separate forward-facing rear seat door means 26 for access to the forward-facing rear seats 9L and 9R. A raised ceiling will preferably be provided over seats 9L, 9R, 10L, and 10R. FIG. 17 illustrates front at least partially enclosed compartment means 2F for housing front seat means for seating at least two persons substantially laterally disposed one aside the other (e.g., in seats 8L and 8R), which front at least partially enclosed compartment means is located substantially contiguously and in front of a left at least partially enclosed compartment means 2BL', a right at least partially enclosed compartment means 2BR', and a cargo bed section (cargo bed 185).

Roll-bar means 38 are illustrated for the aforementioned raised ceiling area, and for the forward passenger seating area as well. Roll-bar means comprising roll bar and/or roll cage type protective structures can also be incorporated into embodiments illustrated without the roll-bar means, within the spirit and scope of the invention. Optional dual-tire (or "dually") units 5D for the rear wheels of the vehicle are also illustrated in this embodiment. Side impact energy absorbing panel means 29 are also illustrated in this embodiment to provide means for enhancing side impact protection for passengers seated in seats 9L, 10L, 9R, and 10R. (Such dual-tire rear wheels and/or side impact energy absorbing panel means may also of course be used in other embodiments within the spirit and scope of the invention). This embodiment may optionally be built upon an existing pickup truck chassis Front-wheel-drive, rear-wheel-drive, and 2, 4 or 6 wheel drive variants are possible. This large size vehicle embodiment can carry ten to twelve persons and a lot of cargo in the cargo bed 18W.

Figure 18:
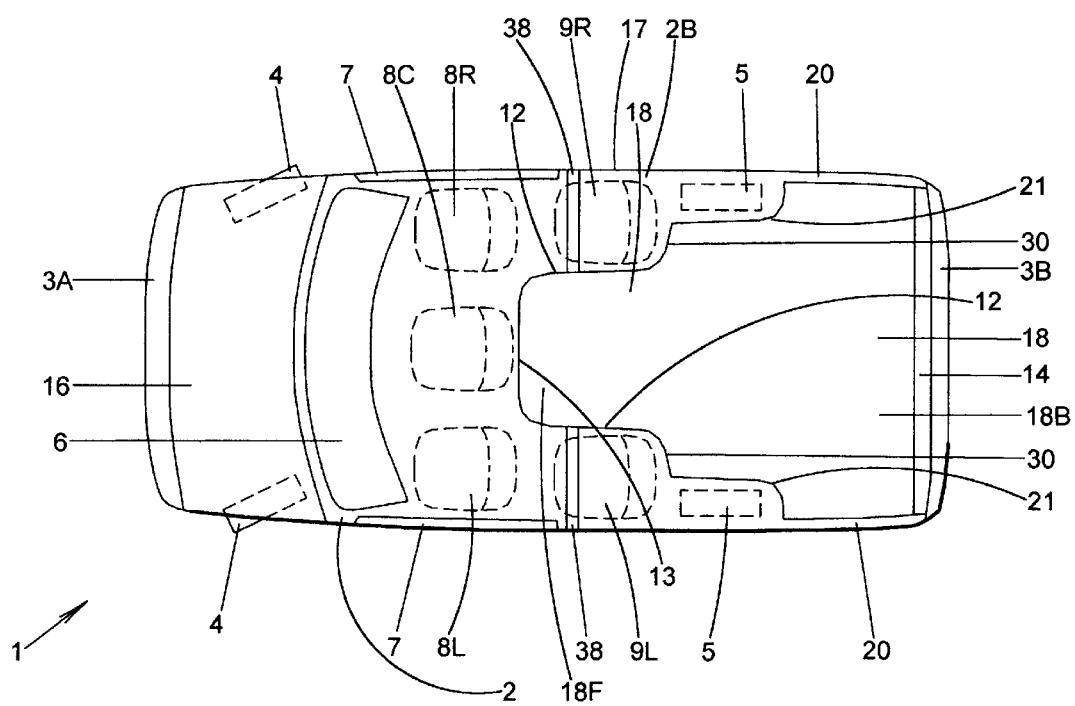
FIGS. 18 and 19 illustrate top views of still other embodiments in the class of the FIG. 4 embodiment.

FIG. 18 shows a top view of another embodiment of the invention. Forward of the front wall means 13 (to the left on the drawing) this embodiment is similar to the FIG. 4 embodiment. Seat 8C is shown offset slightly forward of its flanking seats 8L and 8R in this embodiment, and the roll bar means 38 is of a different configuration than in FIG. 4. As in the FIG. 4 embodiment, a forward-facing rear left seat 8L is located substantially behind the forward left seat 8L, and a forward-facing rear right seat 9R is located substantially behind the forward right seat 8R. Seats 9L and 9R may optionally be of narrower width than seats 8L and 8R, and in a variant embodiment may be rear- or aft-facing rather than forward-facing. Front doors 7 may be of hinged or sliding construction in different preferred embodiments of the invention. Doors which are not as long as the illustrated doors 7 may be used, if the seatbacks of seats 8L and 8R are tiltable forward to facilitate access to seats 9L and 9R respectively. In this embodiment, the forward-facing rear left seat 9L and the forward left seat 8L together provide seat means for seating at least two persons substantially longitudinally disposed one in front of the other. In this embodiment, the forward-facing rear right seat 9R and the forward right seat 8R similarly together provide seat means for seating at least two persons substantially longitudinally disposed one in front of the other. In the illustrated embodiment of the invention, the vehicle body 2 serves as body means for carrying a load, wherein said body means comprises a least partially enclosed compartment means 2B for accommodating the aforementioned seat means for seating at least two persons Enclosing wall means 17 serve as means for contributing to enclosing the at least partially enclosed compartment means 2B. Rear wall means 30 behind the rear left and right seats 9L and 9R also serve as means for contributing to enclosing the at least partially enclosed compartment means 28. The cargo bed 18 can now be considered to be split into a front portion cargo bed 18F and a back or rear portion cargo bed 1B. The front portion cargo bed 18F is bounded on its front by front wall means 13, on its sides by side walls 12, and on its rear by the rear portion cargo bed 181B. The back or rear portion cargo bed 18B is bounded on its rear by cargo bed rear closure means 14, on its rear sides by cargo bed side wall means 20, on its front sides by contoured wall means 21 above the housing areas for the rear tires 5, and on its front by rear wall means 30 and the front portion cargo bed 18F. The cargo bed 18 serves as cargo bed means for carrying cargo thereon, and this cargo bed means includes the front portion cargo bed 18F, which serves as a cargo bed section which is substantially laterally disposed on at least one side of a person's seat (e.g., rear left seat 9L or rear right seat 9R) in seat means for seating at least two persons substantially longitudinally disposed one in front of the other (either seats 8L and 9L in conjunction or seats 8R and 9R in conjunction, as described above).

The embodiment of FIG. 18 can be considered to provide in combination a motor vehicle 1 comprising running gear means (including tires 4 and 5) for permitting said motor vehicle to move and maneuver upon a road surface and body means (vehicle body 2 for carrying a load which body means is supported by said running gear means, wherein said body means comprises at least partially enclosed compartment means 2B including (i) left at least partially enclosed compartment means for housing left seat means for seating at least two persons substantially longitudinally disposed one in front of the other (in seats 8L and 9L) and (ii) right at least partially enclosed compartment means for housing right seat means for seating at least two persons substantially longitudinally disposed one in front of the other (in seats 8R and 9R); and (iii) cargo bed means for carrying cargo thereon which cargo bed means includes a cargo bed section (18F) which is substantially located between said left at least partially enclosed compartment means wherein seat 8L is located) and said right at least partially enclosed compartment means (wherein seat 9R is located). Forward left seat 18L or forward right seat 18R also serve as part of said seat means for seating at least two persons substantially longitudinally disposed one in front of the other, in this embodiment, wherein said seat means for seating at least two persons comprises either said forward left seat (8L) and a rear left seat (9L) located substantially behind said forward left seat (8L), or said forward right seat (8R) and a rear right seat (9R) located substantially behind said forward right seat (8R).

The at least partially enclosed compartment means 2B includes a rear left section with a rear left seat (9L) and a rear right section with a rear right seat (9R), and the seat means for seating at least two persons comprises both the forward left seat (8L) combined with the rear left seat (9L) and the forward right seat (8R) combined with the rear right seat (9R). The forward section of the at least partially enclosed compartment means 2B includes contiguously a forward center section (wherein seat 8C is located) and two forward side sections which are the forward left section (wherein seat 8L is located) and forward right section (wherein seat 8R is located); and said forward left section, forward center section, and forward right section together provide means for accommodating a forward left seat (8L) and a forward right seat (8R) which is substantially located laterally disposed relative to said forward left seat. The cargo bed section 18F is substantially located behind said forward center section and between said rear left section (wherein seat 9L is located) and said rear right section (wherein seat 9R is located), and the cargo bed means further comprises an additional cargo bed section (18B) contiguously connected with said cargo bed section (18F) and located substantially behind said cargo bed section.

Figure 19:
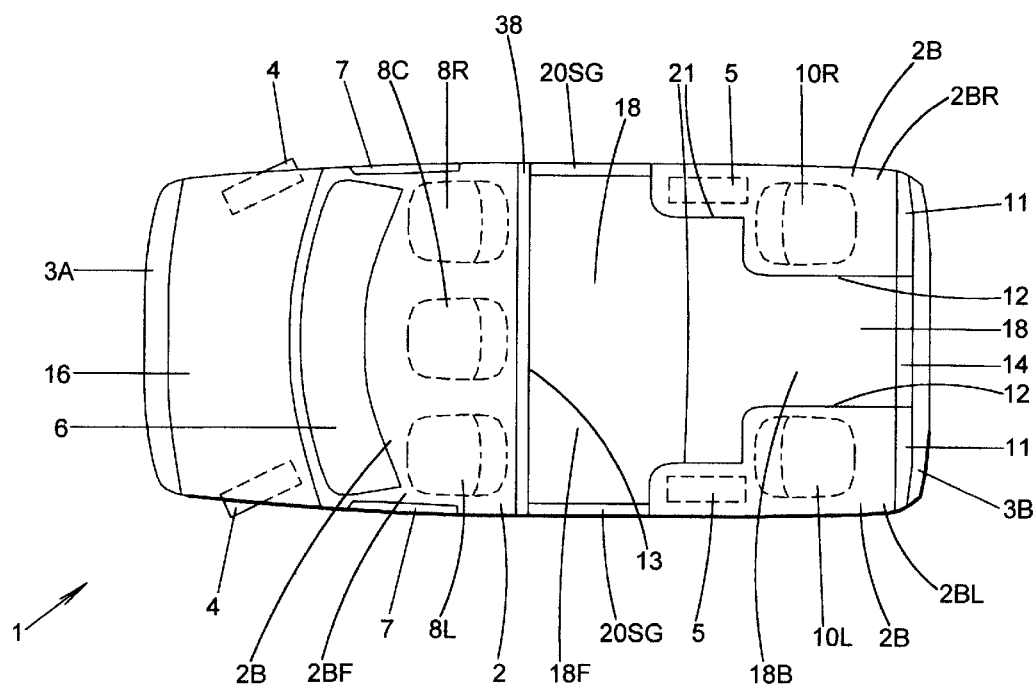

FIG. 19 shows a top view of yet another embodiment of the invention. This embodiment is somewhat similar to the FIG. 18 embodiment, but with aft-facing rearmost left and right seats 10L and 10R in lieu of forward-facing rear left and right seats 9L and 9R. In this embodiment body means 2 comprises at least partially enclosed compartment means 2B which compartment means includes a forward section 2BF comprising contiguously a forward center section and two forward side sections which are the forward left section and forward right section; and which compartment means also includes noncontiguously a rear left section 2BL with a rear left seat (here aft-facing rearmost left seat 10L) and a rear right section 2BR with a rear right seat (here aft-facing rearmost right seat 10R). Access to aft-facing rearmost seats 10L and 10R is via rear door means 11 (illustrated), or could be via inner or outer side doors (not illustrated) to both the rear left section 2BL and rear right section 2BR. The compartment means 2B provides means for accommodating seat means for seating at least two persons substantially longitudinally disposed one in front of the other, such as persons seated in seats 8L and 10L (and, alternately, seats 8R and 10R). Thus in this embodiment the seat means for seating at least two persons comprises the forward left seat (8L) combined with the rear left seat (10L), or the forward right seat (8R) combined with the rear right seat (10R). As in FIG. 18, the cargo bed 18 in FIG. 19 can be split into a front portion cargo bed 18F and a back or rear portion cargo bed 18B. The front portion cargo bed 18F is bounded on its front by front wall means 13, on its sides by cargo bed side wall means, on its rear sides by contoured wall means 21 above the housing areas for the rear tires 5, and on its rear by rear portion cargo bed 18B. The illustrated cargo bed side wall means comprise optional side gates or doors 20SG, which are foldable/retractable to function as means for providing side access to the cargo bed 18. One or more side gates or doors could also be used in other embodiments, within the spirit and scope of the invention. The back or rear portion cargo bed 18B is bounded in front by the front portion cargo bed 18F, on its sides by side walls 12, and on its rear by cargo bed rear closure means 14 (optionally comprising a tailgate or liftgate or a fixed rear closure means). The cargo bed 18 serves as cargo bed means for carrying cargo thereon, and this cargo bed means includes the rear portion cargo bed 18B, which serves as a cargo bed section which is substantially laterally disposed on at least one side of a person's seat (e.g., rear left seat 10L or rear right seat 10R) in seat means for seating at least two persons substantially longitudinally disposed one in front of the other (either seats 8L and 10L in conjunction or seats 8R and 10R in conjunction, as described above).

The embodiment of FIG. 19 can be considered to provide in combination a motor vehicle 1 comprising running gear means (including tires 4 and 5) for permitting said motor vehicle to move and maneuver upon a road surface and body means (vehicle body 2) for carrying a load which body means is supported by said running gear means, wherein said body means comprises at least partially enclosed compartment means 2B including (i) left at least partially enclosed compartment means (including rear left section 2BL and the portion of the forward section 2BF which houses seat 8L) for housing left seat means for seating at least two persons substantially longitudinally disposed one in front of the other (in seats 8L and 10L) and (ii) right at least partially enclosed compartment means (including rear right section 2BR and the portion of the forward section 2BF which houses seat 8R) for housing right seat means for seating at least two persons substantially longitudinally disposed one in front of the other (in seats 8R and 10R); and (iii) cargo bed means for carrying cargo thereon which cargo bed means includes a cargo bed section (18B) which is substantially located between said left at least partially enclosed compartment means (rear left section 2BL wherein seat 10L is located) and said right at least partially enclosed compartment means (rear right section 2BR wherein seat 10R is located). In this embodiment the motor vehicle 1 includes two separate and longitudinally separated, at least partially enclosed compartment means (e.g., forward section 2BF in conjunction with either the rear right section 2BR or the rear left section 2BL), for accommodating said seat means for seating at least two persons substantially longitudinally disposed one in front of the other. The at least partially enclosed compartment means 2B includes a rear left section 2BL with a rear left seat (10L) and a rear right section 2BR with a rear right seat (10R), and said seat means for seating at least two persons comprises both the forward left seat (8L) combined with the rear left seat (10L) and the forward right seat (8R) combined with the rear right seat (10R). The forward section 2BF includes contiguously a forward center section (wherein seat 8C is located) and two forward side sections which are the forward left section (wherein seat 8L is located) and forward right section (wherein seat 8R is located); and said forward left section, forward center section, and forward right section together provide means for accommodating a forward left seat (8L) and a forward right seat (8R) which is substantially located laterally disposed relative to said forward left seat. The cargo bed section 18B is substantially located behind said forward center section and between said rear left section (2BL) and said rear right section (2BR), and the cargo bed means further comprises an additional cargo bed section (18F) contiguously connected with said cargo bed section (18B) and located substantially forward of said cargo bed section.

Figure 20:
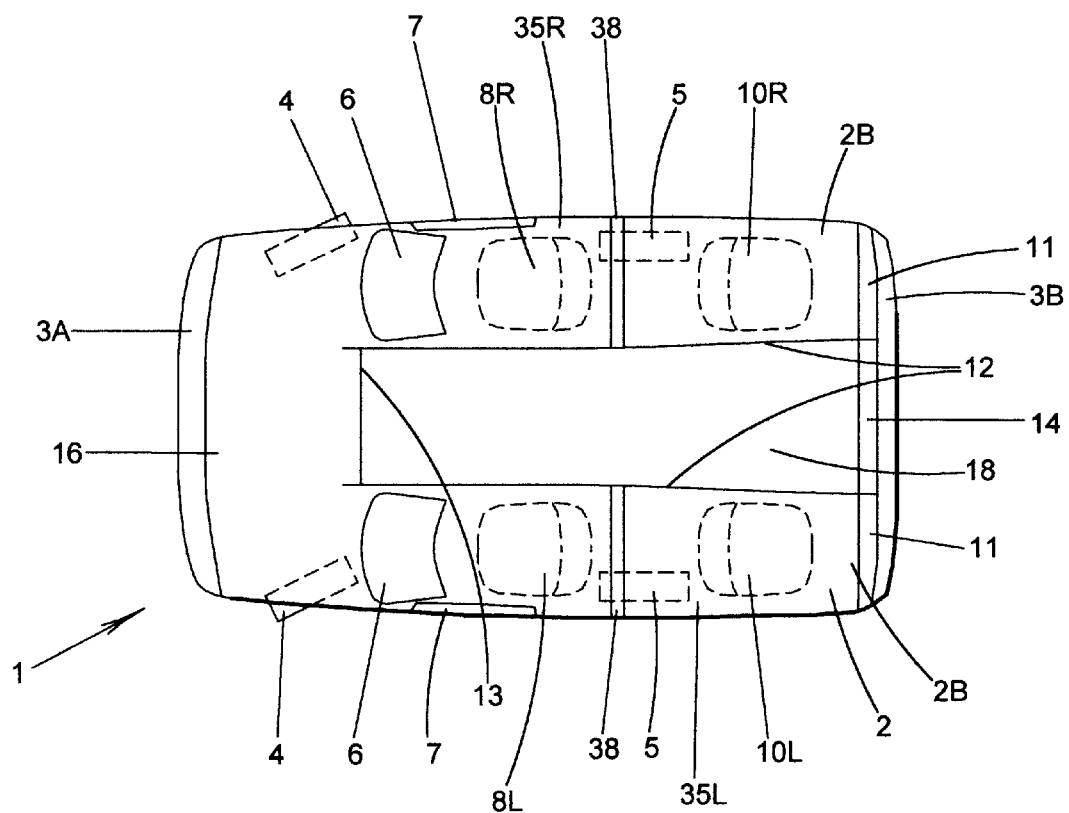
FIG. 20 shows a top view of another embodiment of the invention with two passenger accommodating areas on either side of a central cargo accommodating area.

FIG. 20 shows an embodiment of a motor vehicle 1 with two passenger accommodating areas on either side of A central cargo accommodating area. Body means (vehicle body 2) for carrying a load includes the two passenger accommodating areas, which each serve as seat means for seating at least two persons longitudinally disposed one in front of the other (i.e., persons in forward left seat 8L and aft-facing rearmost left seat 10L in left passenger accommodating area 35L, and persons in forward right seat 8R and aft-facing rearmost right seat 10R in right passenger accommodating area 35R). Body means 2 includes at least partially enclosed compartment means 2B (i.e., the two passenger accommodating areas 35L and 35R) and also includes cargo bed means 18 for carrying cargo thereon, which cargo bed means includes a cargo bed section located laterally disposed on at least one side of a person's seat in the seat means. (In fact, in this embodiment most of the cargo bed is located laterally disposed relative to either of the two passenger accommodating areas 35L and 35R). The cargo bed means 18 is bordered in front by front wall means 13 separating it from engine compartment 16; on its sides by side walls 12 separating it from passenger accommodating areas 35L and 35R; and on its back by cargo bed rear closure means 14 (e.g., tailgate or liftgate). The left and right passenger accommodating areas 35L and 35R are located behind front tires 4 and front windshields 6. Access to forward left seat 8L and forward right seat 8R is by means of front doors 7. As illustrated, access to aft-facing rearmost left seat 10L and aft-facing rearmost right seat 10R is by means of rear door means 11. Side door means could alternatively be used for access to the rearmost left and right seats 10L and 10R, similar to the illustrated front doors 7 which are also side-of-vehicle door installations. Rear tires 5 are shown between and below the forward and rearmost seats in this embodiment Rear tires could be located behind the rearmost right and left seats (which may be aft or forward-facing) in alternate embodiments. Roll-bar means 38, front bumper 3A, and rear bumper 3B are also shown in this embodiment The embodiment of FIG. 20 can be considered to provide in combination a motor vehicle 1 comprising running gear means (including tires 4 and 5) for permitting said motor vehicle to move and maneuver upon a road surface and body means (vehicle body 2) for carrying a load which body means is supported by said running gear means, wherein said body means comprises at least partially enclosed compartment means 2B including (i) left at least partially enclosed compartment means for housing left seat means for seating at least two persons substantially longitudinally disposed one in front of the other (i.e., left passenger accommodating area 35L with seats 8L and 10L) and (ii) right at least partially enclosed compartment means for housing right seat means for seating at least two persons substantially longitudinally disposed one in front of the other (i.e., right passenger accommodating area 35R with seats 8R and 10R); and (iii) cargo bed means (cargo bed 18) for carrying cargo thereon which cargo bed means includes a cargo bed section which is substantially located between said left at least partially enclosed compartment means and said right at least partially enclosed compartment means.

Figure 21:
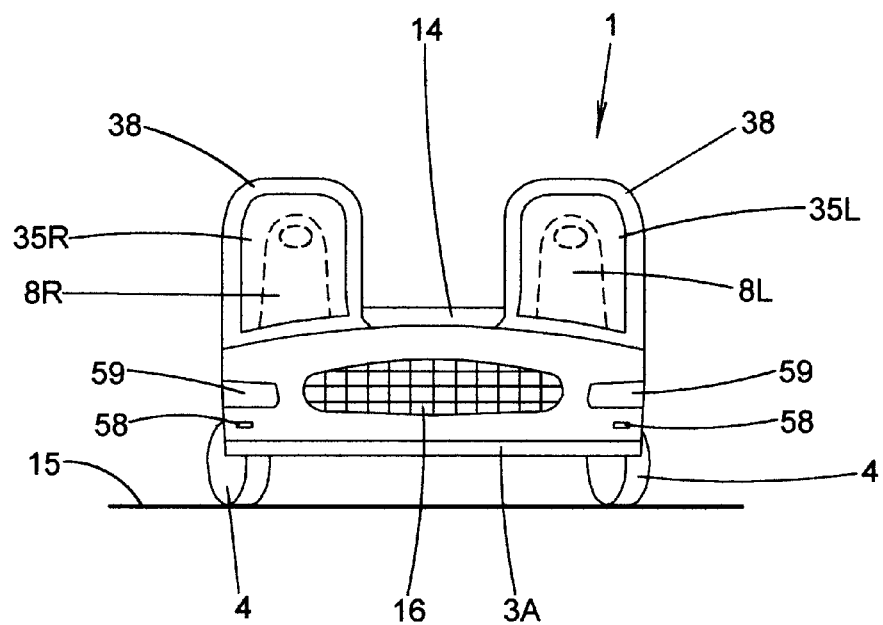
FIG. 21 shows a front view of the FIG. 20 embodiment.

FIG. 21 shows a front view of the motor vehicle 1 of the FIG. 20 embodiment situated upon a road surface 15, to more clearly illustrate the frontal geometry of this embodiment. This front view also shows typical headlights 59 and parking/turn signal lights 58.

Figure 22:
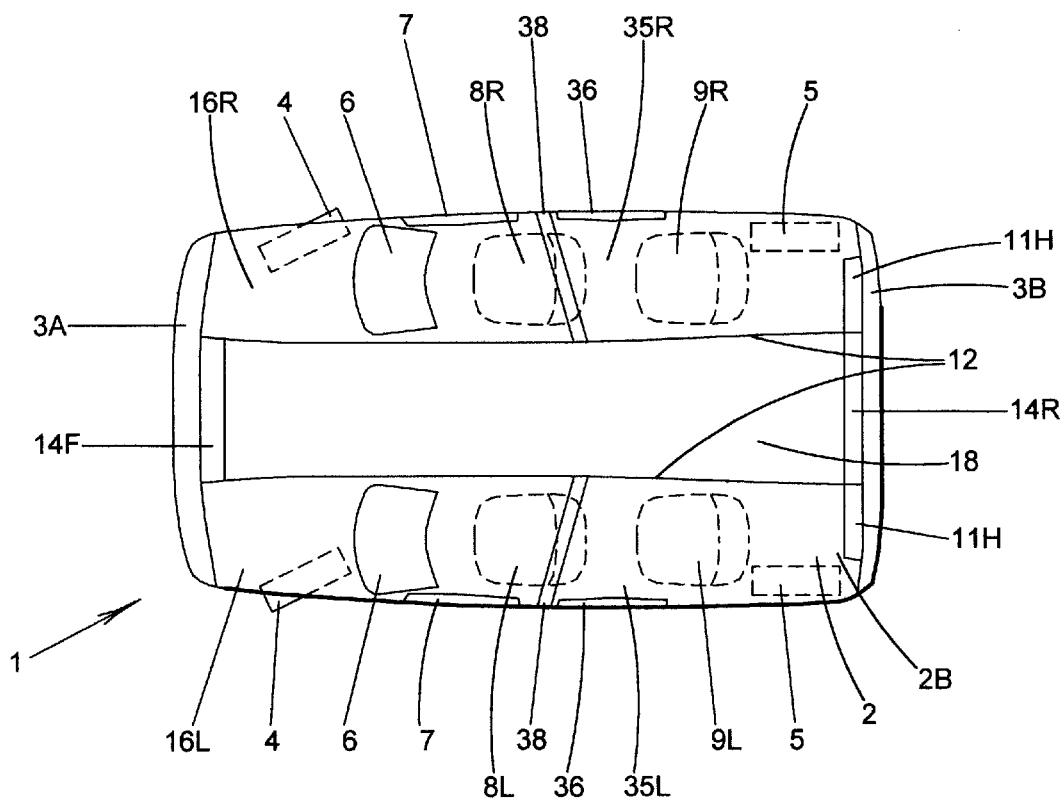
FIG. 22 shows a top view of another embodiment with two passenger accommodating areas on either side of a central cargo accommodating area, which features a non-central engine location.

FIG. 22 shows a top view of an embodiment similar to the FIG. 20 embodiment, but with an engine no longer substantially centrally located and with the rear seats no longer aft-facing. These incremental changes could also be made singly rather than in conjunction, to define still further embodiments within the spirit and scope of the invention. In the embodiment of FIG. 22, left and right engine compartment means 16L and 16R are provided for optionally accommodating left and right engines. One or two engines could be used, and if two are used they may be optionally electronically or mechanically linked. The engine(s) may drive the front wheels, or rear wheels, or all four wheels. For the two engine case without mechanical linkage, preferably the left engine drives the left wheel(s) and the right engine drives the right wheel(s). An engine control system will preferably electronically link or coordinate the operations of the two engines to best meet performance objectives. For example, both engines could be used for rapid acceleration or hill climbing, while a single engine could be used for more economical cruising operation. In the FIG. 22 embodiment, forward-facing rear left seat 9L and forward-facing rear right seat 9R are situated substantially behind the forward left seat 8L and the forward right seat 8R in the left and right passenger accommodating areas 35L and 35R, respectively. Access to the forward seats 8L, 8R is via front doors 7, and access to the rear seats 9L, 9R is via rear doors 36. As in the FIG. 20 embodiment, body means 2 includes at least partially enclosed compartment means 2B (i.e., the two passenger accommodating areas 35L and 35R) and also includes cargo bed means 18 for carrying cargo thereon, which cargo bed means includes a cargo bed section located laterally disposed on at least one side of a person's seat in the seat means. (On fact, in this embodiment substantially the whole cargo bed is located laterally disposed relative to either of the two passenger accommodating areas 35 and 35R). In this embodiment the cargo bed means 18 is bordered in front by cargo bed front closure means 14F such as a foldable-down front cargo gate or fixed front closure means, on its rear by cargo bed rear closure means 14R such as a foldable-down rear cargo gate or fixed rear closure means, and on its sides by side walls 12 separating it from passenger accommodating areas 35L and 35R and the engine compartment means 16L and 16R. The ability to load/unload cargo via either the front or rear closure means can add versatility and convenience to loading and unloading the cargo bed 18. Other features shown in FIG. 22 include angled roll-bar means 38, far-aft locations for the rear tires 5, and rear hatch means 11H (similar to those provided on current hatchback and some station wagon vehicles) to access the storage areas behind seats 9L and 9R.

The embodiment of FIG. 22 can be considered to provide in combination a motor vehicle 1 comprising running gear means (including tires 4 and 5) for permitting said motor vehicle to move and maneuver upon a road surface and body means (vehicle body 2 for carrying a load which body means is supported by said running gear means, wherein said body means comprises at least partially enclosed compartment means 2B including (i) left at least partially enclosed compartment means for housing left seat means for seating at least two persons substantially longitudinally disposed one in front of the other (i.e., left passenger accommodating area 35L with seats 8L and 9L) and (ii) right at least partially enclosed compartment means for housing right seat means for seating at east two persons substantially longitudinally disposed one in front of the other (i.e., right passenger accommodating area 35R with seats 8R and 9R); and (iii cargo bed means for carrying cargo thereon which cargo bed means includes a cargo bed section (here a large portion of the cargo bed 18) which is substantially located between said left at least partially enclosed compartment means and said right at least partially enclosed compartment means.

Figure 23:
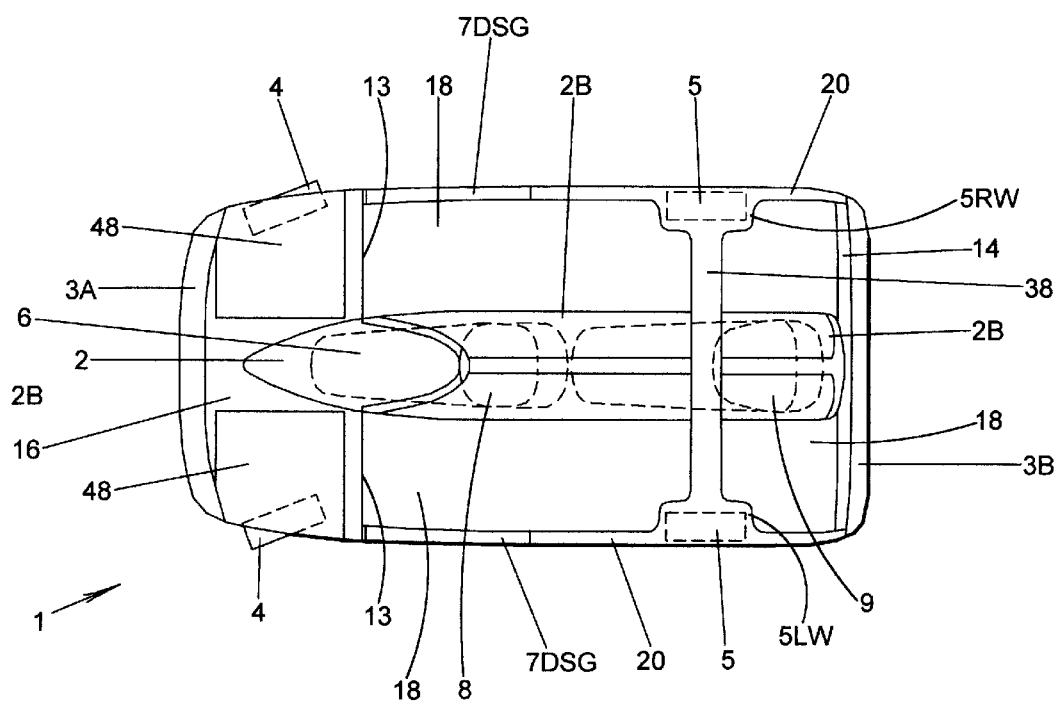
FIG. 23 shows a top view of an embodiment in the class of the embodiments of FIG. 7 with a central passenger accommodating area, wherein the passenger accommodating area is now elevated.
Figure 24:
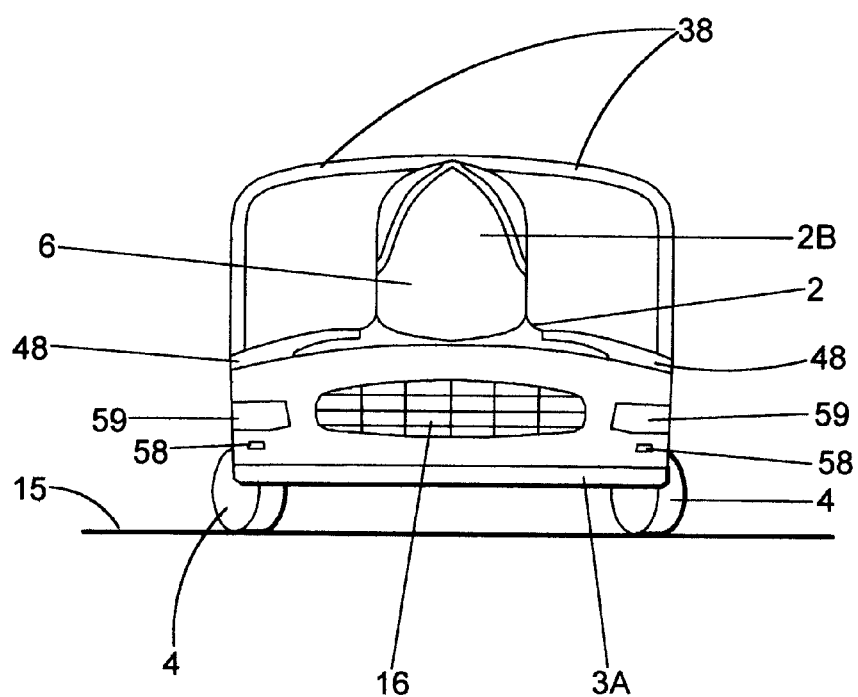
FIG. 24 shows a front view of the FIG. 23 embodiment.
Figure 25:
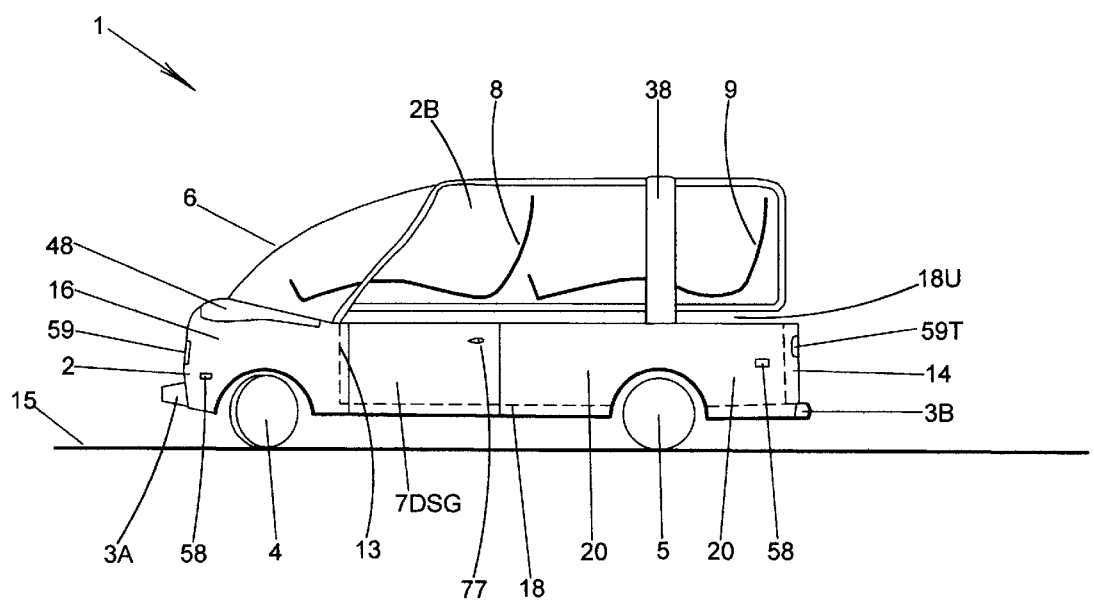
FIG. 25 shows a side view of the FIG. 23 embodiment.

FIGS. 23, 24 and 25 show top, front and side views, respectively, of yet another preferred embodiment of the invention. FIG. 23 shows a motor vehicle, 1 from a top view. The general layout of the vehicle can be seen with a vehicle body 2 which serves as body means for carrying a load, wherein said body means comprises at least partially enclosed compartment means 2B for accommodating seat means for seating at least two persons. The at least partially enclosed compartment means 2B is an elongated tandem seating compartment located at or near the vehicle centerline in this embodiment, and at an elevated height relative to the cargo bed 18. The at least partially enclosed compartment means 2B can be considered to have the general shape and configuration of a fighter airplane's tandem two seat cockpit, in this embodiment. Cockpit entry may be accomplished through a variety of entry means including various types of door and opening canopy section means, not illustrated. A front seat 8 and a rear seat 9 are located in the at least partially enclosed compartment means 2B for accommodating seat means for seating at least two persons, and serve as said seat means. The cargo bed 18 serves as cargo bed means for carrying cargo thereon, which cargo bed means includes a cargo bed section which is substantially located laterally disposed on at least one side of a person's seat in said seat means (e.g., a cargo bed section to the left of front seat 8 and/or rear seat 9 in the illustrated embodiment), and which cargo bed means further includes a second cargo bed section which is substantially located laterally disposed on the opposite side of said side of a person's seat in said seat means in said at least partially enclosed compartment means (e.g., a cargo bed section to the right of front seat 8 and/or rear seat 9 in the illustrated embodiment. Roll-bar means 38 help provide roll-over accident protection for the occupants of the vehicle, and in this embodiment also serve as structural means for supporting the at least partially enclosed compartment means 2B. The roll bear means will preferably include roll-cage type structure for protecting the occupants of the compartment means 2B. The forward end of the at least partially enclosed compartment means 2B is connected to the engine compartment 16, which is fitted with sideways opening hood means 48. The rear or aft end of the at least partially enclosed compartment means 2B may be located with a space above the cargo bed rear closure means 14, as illustrated, or alternatively connecting to a fixed or movable portion of the cargo bed rear closure means. Cargo bed side wall means 20 are provided on the left and right sides of the cargo bed, and optional door or sidegate means 7DSG are illustrated in the right and left side wall means. Clearly, such optional door or sidegate means could be provided on the left and/or the right cargo bed side wall means in this and other embodiments of the invention. Front wall means 13 are provided in front of the cargo bed 18. The front windshield 6, front and rear tires 4 and 5, housing areas for the left and right wheels and tires 5LW and 5RW, and front and rear bumpers 3A and 3B, are also visible in FIG. 23. A variety of alternate door, window, canopy, and roll bar configurations are also possible within the spirit and scope of the invention.

FIG. 24 shows a front view of the motor vehicle 1 of FIG. 23, driving on a road surface 15. This front view also shows typical headlights 59 and parking/turn signal lights 58.

FIG. 25 shows a side view of the embodiment of FIGS. 23 and 24. With reference to FIG. 23, the cargo bed means (cargo bed 18) was described as including a cargo bed section which is substantially located laterally disposed on at least one side of a person's seat in said seat means (e.g., a cargo bed section to the left of front seat 8 and/or rear seat 9 in the illustrated embodiment), and also including a second cargo bed section which is substantially located laterally disposed on the opposite side of said side of a person's seat in said seat means in said at least partially enclosed compartment means (e.g., a cargo bed section to the right of front seat 8 and/or-rear seat 9 in the illustrated embodiment). In the view of FIG. 25, the illustrated cargo bed means is also seen to include an additional cargo bed section comprising a cargo bed under-seat section 18U which is substantially located below a person's seat (seats 8 or 9) in said seat means in said at least partially enclosed compartment means 2B. This view also illustrates front and rear side parking/turn signal lights 58, tail-lights 59T, and a typical doorhandle 77 on the optional door or sidegate means 7DSG.

Figure 26A:
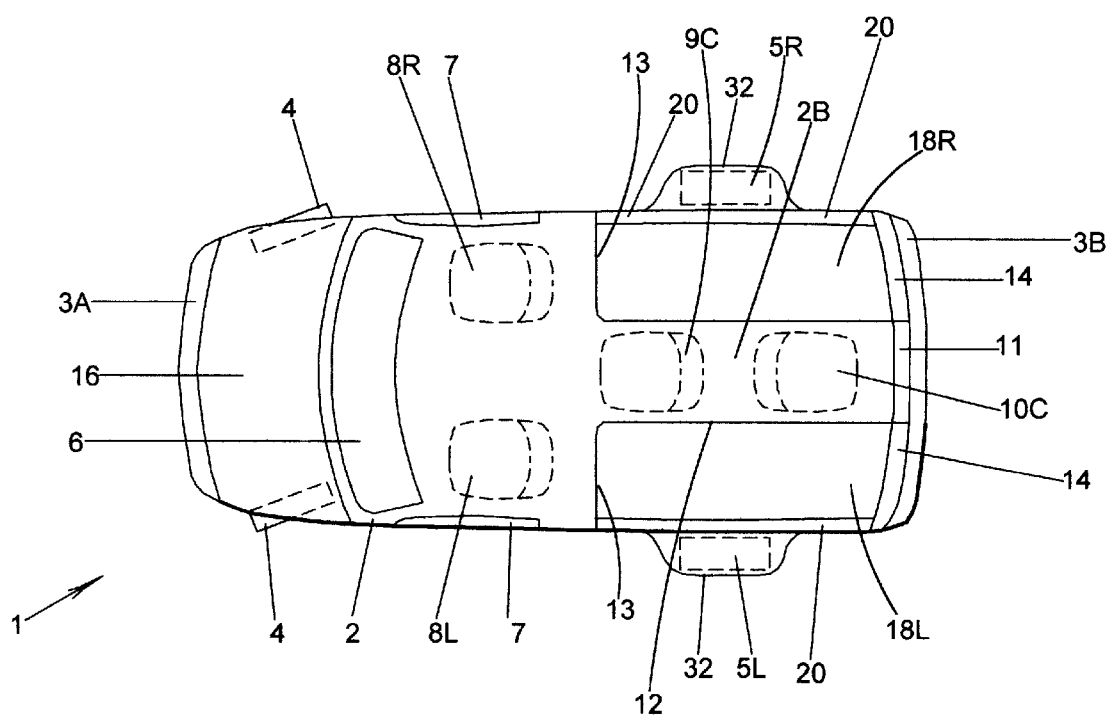
FIGS. 26A and 26B show top views of two embodiments of the invention with a passenger accommodating area in the rear center of the motor vehicle, with cargo accommodating areas on either side thereof.
Figure 26B:
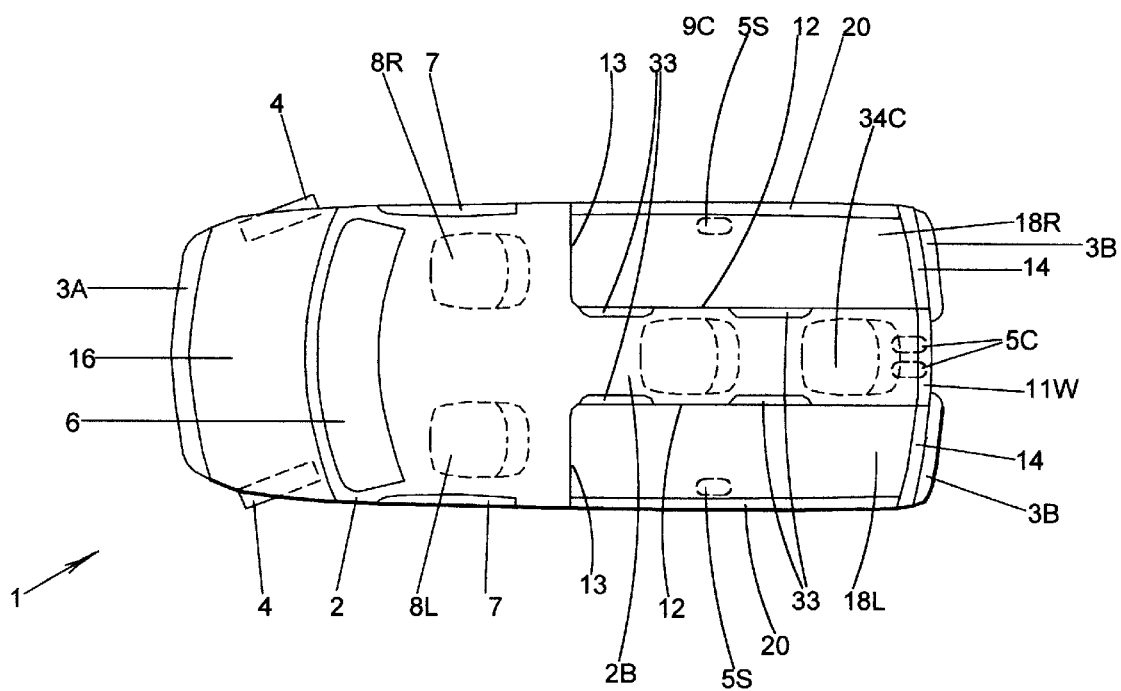

FIGS. 26A and 26B show top views of two embodiments of the invention, showing a motor vehicle 1 with a passenger accommodating area in the rear center of the vehicle. In the embodiment of FIG. 26A body means 2 includes at least partially enclosed compartment means 2B for accommodating seat means for seating at least two persons substantially longitudinally disposed one in front of the other. Body means 2 houses forward left seat 8L and forward right seat 8R in its forward part (which can also be considered to be a front at least partially enclosed compartment means for housing front seat means for seating at least two persons substantially laterally disposed one aside the other, as in seats 8L and 8R); and behind them in compartment means 2B it houses a forward-facing rear center seat 9C and behind that an aft-facing rearmost center seat 10C. The forward-facing rear center seat 9C and aft-facing rearmost center seat 10C together provide the seat means for seating at least two persons, substantially longitudinally disposed one in front of the other. Access to the rearmost center seat 10C is via rear door means 11; access to the rear center seat 9C may be from the front doors 7 via a passage behind front seats 8R or 8L (which may have folding seat backs) or via side door means (not illustrated here but shown in FIG. 26B) on one or both sides of seat 9C. In this embodiment cargo bed means (cargo bed 18) for carrying cargo thereon is provided in two cargo bed sections by pickup truck type left side and right side cargo beds 18L and 18R. The cargo beds are bordered in front by front wall means 13, on their inner (towards vehicle centerline) sides by side walls 12, on their outer sides by cargo bed side wall means 20, and on their rear sides by cargo bed rear closure means 14. Each cargo bed section is located laterally disposed on a side of a person's seat (either seat 9C or 10C) in the seat means. The embodiment of FIG. 26A has rear tires 5 located outboard of the cargo bed side wall means 20, with optional tire cover means 32 for covering the top side and optionally the front and rear sides of the rear tires 5L and 5R. The tops of the tires may be at a higher level than the floor levels of the pickup beds 18L and 18R. The engine compartment 16, front windshield 6, front tires 4, and front and rear bumpers 3A and 3B, are also visible in FIG. 26A.

The embodiment of FIG. 26B is similar to the embodiment of FIG. 26A, with a forward-facing rearmost center seat 34C in lieu of the aft-facing rearmost center seat 10C of FIG. 26A. Access to the rear center seat 9C is illustrated via side door means 33, which may be on one or both sides of seat 9C. Side door means 33 may be of pivoting or sliding type and may open up, out, or back. Bi-fold type side door means are also possible. Side door means 33 are also shown providing access to seat 34C. Side door means may optionally be provided on one side rather than both, and may optionally use combined long door means for simultaneous access to both seats 9C and 34C. In a variant embodiment wherein seat 9C is replaced with a rearward facing seat facing toward seat 34C, common (not necessarily very long) side door means could be provided to access both of the facing seats 9C and 34C. Side door means lower sills may optionally be raised (e.g, by 6" for example) relative to the cargo carrying floor of the cargo beds 18L and 18R. Opposite side side door means could optionally be left open, and seats 9C and/or 34C may be foldable or retractable, to permit carriage of cargo loads running through both the opposite side side door means and extending into both the cargo beds 18L and 18R. An optional alternate rear tire location is also illustrated in FIG. 26B, with rear tire(s) 5C substantially centrally located behind rearmost j center seat 34C. Again, the tops of the tires may be at a higher level than the floor levels of the pickup beds 18L and 1R, and tires may be of different sizes from those illustrated. Tire(s) 5C may be accessed for changing from the rear, for example through the use of a split configuration rear bumper 3B, as illustrated. Tire(s) 5C may be steerable to improve vehicle steering performance. Supplementary low profile "outrigger" tires 5S may also optionally be provided under the outer sides of the pickup beds, which contact the ground either always or only in "tight" or "high-G" turns to prevent excessive sideward lean (roll) of the vehicle. This Figure also illustrates use of rear wall means 11W (but alternatively rear hatch means similar to 11H in FIG. 22 and similar to those provided on current hatchback and some station wagon vehicles, could be provided to access a small storage area or shelf behind seat 34C).

Thus the embodiments of FIGS. 26A and 26B provide a motor vehicle comprising running gear means (including front tires 4) for permitting said motor vehicle to move and maneuver upon a road surface and body means (vehicle body 2) for carrying a load which body means is supported by said running gear means, wherein said body means comprises (i) at least partially enclosed compartment means 2B for housing seat means for seating at least two persons substantially longitudinally disposed one in front of the other (in seats 9C and 10C in FIG. 26A; in seats 9C and 34C in FIG. 26B), (ii) front at least partially enclosed compartment means for housing front seat means for seating at least two persons substantially laterally disposed one aside the other (in seats 8L and 8R, as described earlier), which front at least partially enclosed compartment means is boated substantially contiguously and in front of said at least partially enclosed compartment means 2B, and (iii) cargo bed means for carrying cargo thereon, which cargo bed means includes a cargo bed section (e.g., left side cargo bed 18L) which is substantially located laterally disposed on a side of a person's seat (e.g., seat 9C) in said seat means in said at least partially enclosed compartment means, and which cargo bed means further includes a second cargo bed section (e.g., right side cargo bed 18R) which is substantially located laterally disposed on the opposite side of said side of a person's seat in said seat means in said at least partially enclosed compartment means.

FIGS. 27A, 27B, 27C, 27D, 27E, 27F, 27G, and 27H show side views or partial side views of various embodiments of the invention illustrating enclosed or enclosable storage areas.

Figure 27A:
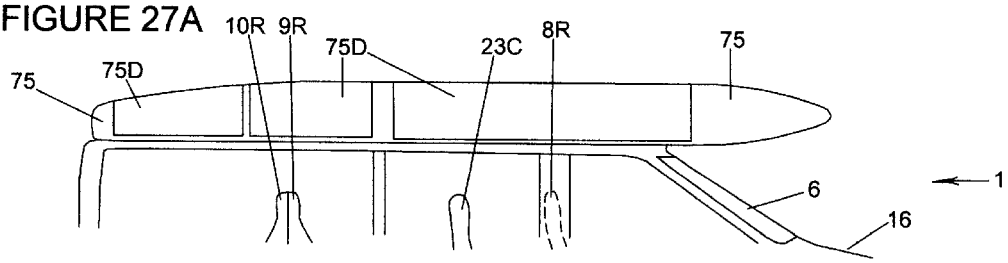
FIGS. 27A, 27B, 27C, 27D, 27E, 27F, 27G, and 27H show side views or partial side views of various embodiments of the invention illustrating enclosed or enclosable storage areas.

FIG. 27A shows a right side view of an embodiment such as that illustrated earlier in FIG. 3A, now illustrating the use of representative doors 75D for a rooftop storage compartment 75.

Figure 27B:
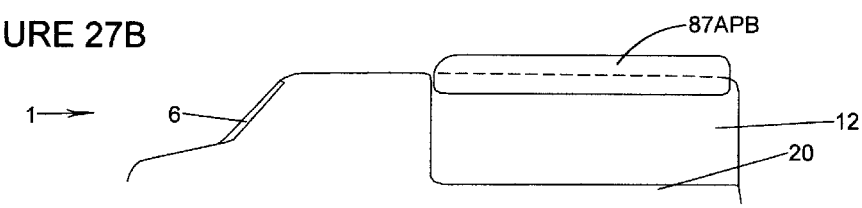

FIG. 27B shows a left side view of an embodiment of the invention similar to that shown in FIG. 3C, now illustrating the use of a storage compartment elevated above a pickup or cargo bed (87APB).

Figure 27C:
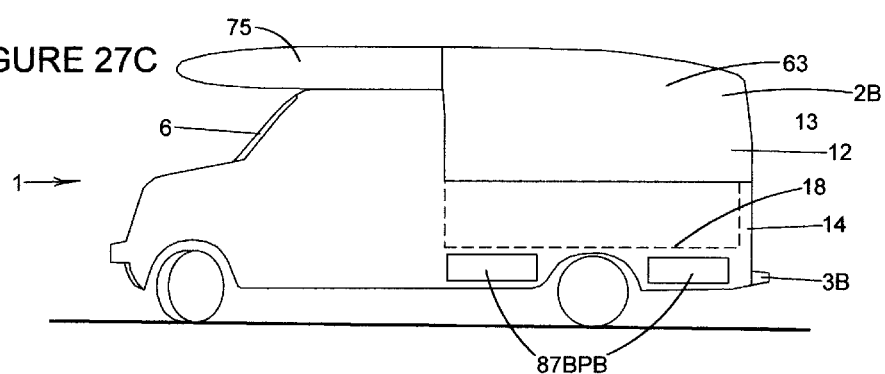

FIG. 27C shows a left side view of an embodiment in the same class as the embodiment of FIG. 27B, now illustrating the use of a rooftop storage compartment 75 (optionally accessible from its side or rear), a raised ceiling 63, and a storage compartment below a pickup or cargo bed (87BPB). Taller windows may be provided on either side of the passenger seating area in the area of the body with the raised ceiling 63.

Figure 27D:
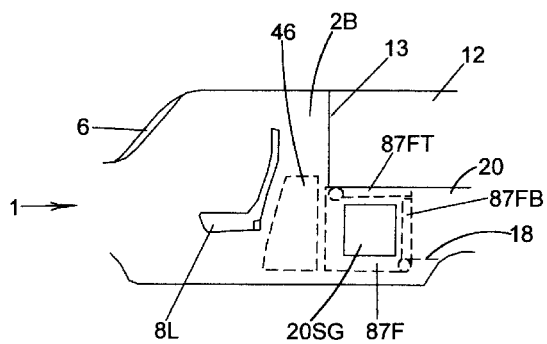

FIG. 27D shows a partial left side view of an embodiment in the same class the the embodiments of FIGS. 27B and 27C, now also showing a storage compartment 46, which could optionally be enclosable, behind the front left seat 8L; and a storage compartment 87F at the front end of a cargo bed (18) which is in part bounded by a back wall 87FB of a storage compartment at the front end of a cargo bed (which back wall folds up from the cargo bed floor, as illustrated) and by a top cover 87FT of a storage compartment at the front end of a cargo bed (which top cover folds up from the front wall means 13, as illustrated). The storage compartment 87F may optionally be connected to and open into the storage compartment 46. Optional side gate or door mean 20SG may be furnished to enable easy loading or unloading of the storage compartment 87F from outside the vehicle 1.

Thus the embodiment shown in FIG. 27D illustrates a motor vehicle 1 further comprising enclosable storage compartment means (46) for carrying and storing articles at a location in at least partially enclosed compartment means 2B. The embodiment shown in FIG. 27D also illustrates a motor vehicle 1 further comprising enclosable storage compartment means (87F) for carrying and storing articles, which enclosable storage compartment means occupies some space in said cargo bed means (cargo bed 18), and further comprising retraction means for retracting the structure (e.g., top cover 87FT and back wall 87FB) of said enclosable storage compartment means to a configuration occupying less space in said cargo bed means (i.e., when top cover 87FT and back wall 87FB are folded forward and down, respectively, the cargo bed 18 extends all the way forward up to the front wall means 13).

Figure 27E:
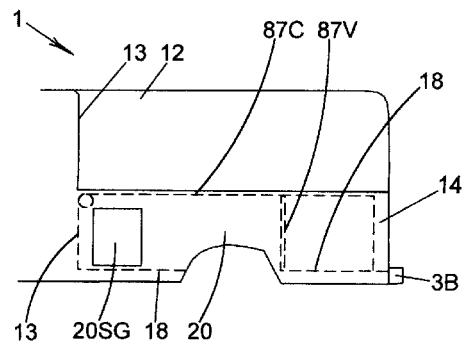

FIG. 27E shows a partial left side view of an embodiment in the same class the the embodiments of FIGS. 27B, 27C and 27D, now showing a roll-out cover 87C to make an enclosed storage compartment above at least some portion of the cargo bed 18. The roll-out cover 87C serves as nonpermanent means for covering the top of said cargo bed on an as-desired basis. The roll-out cover 87C may range in thickness from a thin sheet to a tarp, and zippered edges may optionally be used to provide a positive seal along the side-edges of the roll-out cover. The enclosed storage compartment is bounded in front by front wall means 13, behind by a deployable/slide-in substantially vertical partition 87V in the cargo bed (or, alternatively, by cargo bed rear closure means 14), underneath by the floor of the cargo bed 18, on top by the roll-out cover 87C, and on the sides by side wall 12 and cargo bed side wall means 20. Access to the storage compartment may be by retracting the roll-out-cover 87C, by undeploying or sliding out the partition 87V, and/or through an optional (openable) side gate or door 20SG.

Figure 27F:
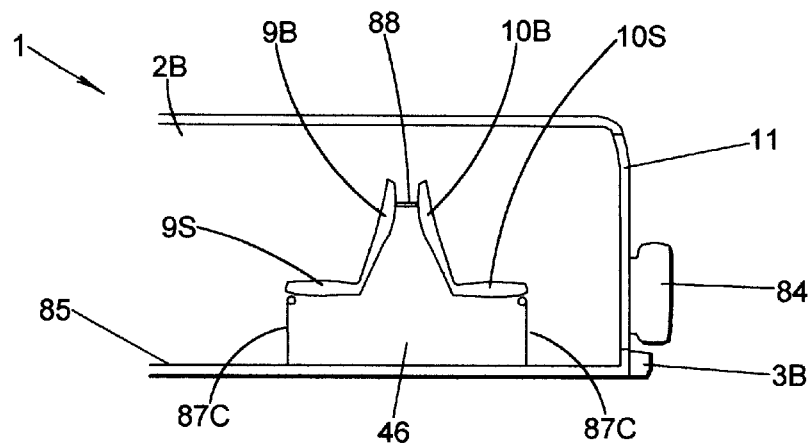
Figure 27G:
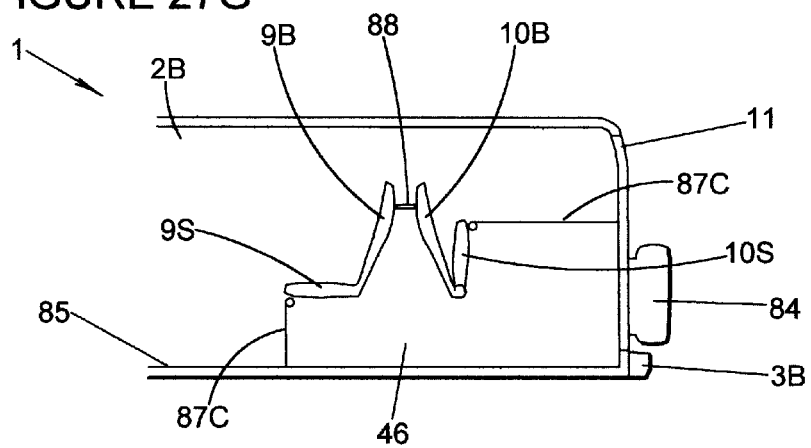
Figure 27H:
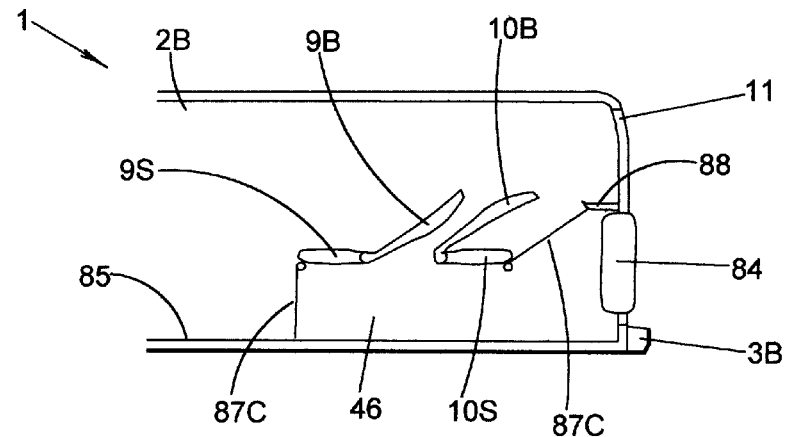

FIGS. 27F, 27G and 27H show partial left side views of a longitudinal cross-section of embodiments of a motor vehicle 1 somewhat similar to that shown in FIG. 3A. The aft part of at least partially enclosed compartment means 2B in the motor vehicle 1 is shown, with a forward-facing rear seat (similar to seat 9C or 9R in FIGS. 3A or 1A) having a forward-facing rear seat back 9B and a forward-facing rear seat cushion 9S, and also having a aft-facing rearmost seat (similar to seat 10C or 10R in FIG. 3A or 1A) with an aft-facing rearmost seat back 10B and an aft-facing rearmost seat cushion 10S. Rear door means 11 serves as supporting means for a spare tire 84 in these illustrated embodiments of the invention, at a location just above the rear bumper 3B. A storage compartment 46 which is enclosable, is formed in a region under the above-described seats, and is bounded by a seating area floor 85 underneath, the seat backs 9B and 10B, the seat cushions 9s and 10S, an optional cover panel/sheet/shelf 88 on top, and roll-out covers 87C to make a substantially enclosed storage compartment, as illustrated. This storage compartment 46 serves as enclosable storage compartment means for carrying and storing articles at a location in the at least partially enclosed compartment means 2B. Somewhat different seat configurations are shown in each of FIGS. 27F, 27G and 27H. FIG. 27F shows an embodiment in a configuration where both the illustrated seats are in a configuration suitable for normal sifting occupancy. FIG. 27G shows the aft-facing rearmost seat cushion 10S folded up to a non-sittable configuration, and the rearmost roll-out cover 87C reconfigured to a more horizontal, valance-cover-like configuration to provide a larger size storage compartment 46. FIG. 27H shows an embodiment with the cover panel/sheet/shelf 88 moved to a location on the rear door means 11 and the rearmost roll-out cover 87C connecting to it. Seat back 9B is shown in a reclined configuration, and can be used by a semi-reclining occupant. Seat back 10B is shown in a folded away, non-sittable configuration. In this embodiment also a substantially enclosed (with contents not visible from outside the vehicle) and large size storage compartment 46 is provided.

FIGS. 28A, 28B, 28C, 28D, 28E, 28F, 28G, 28H, 28I and 28J show rear views of various means for providing a covering surface above a cargo bed.

Figure 28A:
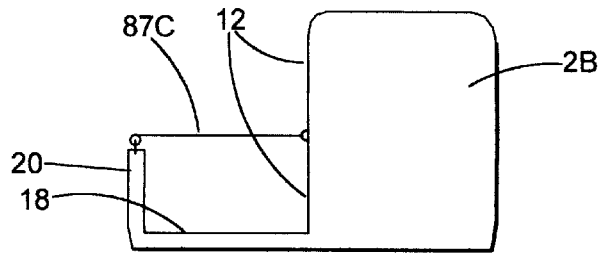
FIGS. 28A, 28B, 28C, 28D, 28E, 28F, 28G, 28H, 28I and 28J show rear views of various means for providing a covering surface above a cargo bed.

FIG. 28A shows a partial rear view of a lateral cross-section of an embodiment in the same class the the embodiments of FIGS. 2A through 2D, with an at least partially enclosed compartment means 2B separated by sidewall 12 from a pickup or cargo bed 18, which in turn is bounded on its sides by side wall 12 and by cargo bed side wall means 20. The illustrated embodiment now shows a roll-out cover 87C to make an enclosed storage compartment above at least some portion of the cargo bed 18. The roll-out cover 87C serves as nonpermanent means for covering the top of said cargo bed on an as-desired basis. This roll-out cover deploys transversely, as compared with the longitudinally deployable roll-out cover earlier illustrated in FIG. 27E. In alternate variations, it could deploy right to left or left to right, or have portions deploying in both directions.

Figure 28B:
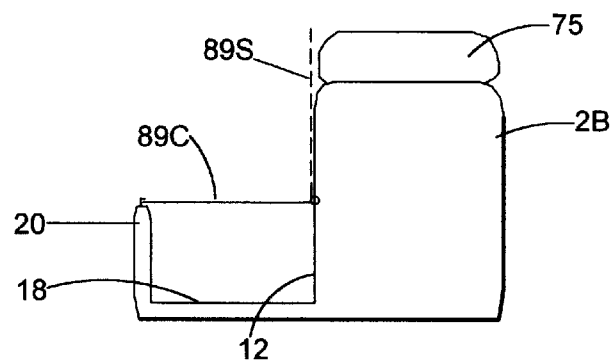

FIG. 28B shows an embodiment similar to FIG. 28A, with the use of a pickup bed cover panel in its covering position 89C, in lieu of the roll-out cover 87C. The pickup bed cover panel serves as nonpermanent means for covering the top of the cargo bed 18 on an as-desired basis. The pickup bed cover panel in its stowed or noncovering position is designated 89S, and shown in dashed lines. This illustrated embodiment also includes a rooftop storage compartment 75. The pickup bed cover panel is hingedly attached along one edge to the side wall 12, and will preferably be fastenably attached at its other edge to the cargo bed side wall means 20 when in its covering position, and to either the upper portion of the side wall 12 or to the storage compartment 75 when in its stowed position. Panel deployment or movement from the covering to the stowed position and vice-versa may be manual, power assisted, or powered. Spring and damper means may be provided for enhancing deployment forces and dynamics.

Figure 28C:
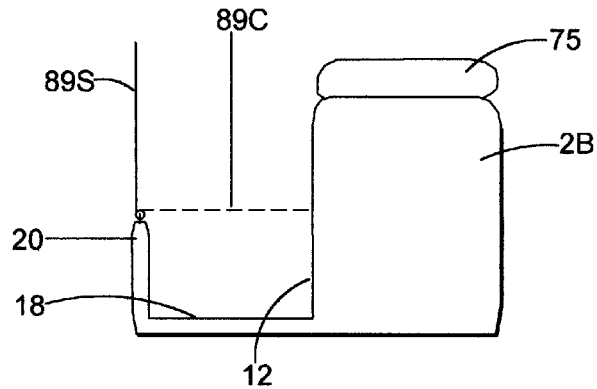

FIG. 28C shows an embodiment similar to FIG. 28B, but with the pickup bed cover panel now hingedly attached to the cargo bed side wall means 20 rather than to the side wall 12.

Figure 28D:
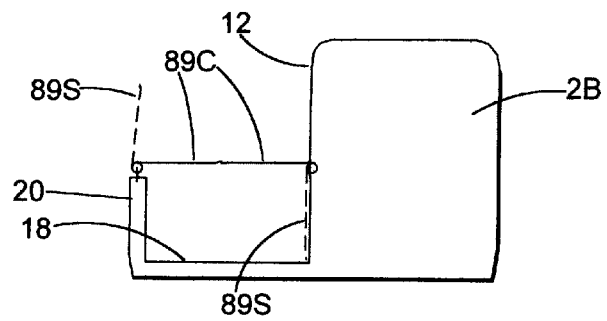

FIG. 28D shows an embodiment similar to FIGS. 28B and 28C, with two pickup bed cover panels one each hingedly attached to the side wall 12 and to the cargo bed side wall means 20. The connecting edges of these panels in their covering positions 89C are preferably fastened together by fastening means, and when the panels are in their stowed positions the hinges are preferably locked by hinge locking means known in the prior art. In this illustrated embodiment one covering panel is shown stowed pointing up and one is shown stowed pointing down—however variants may have both point up, both point down, or both point in opposite directions in one of two ways.

Figure 28E:
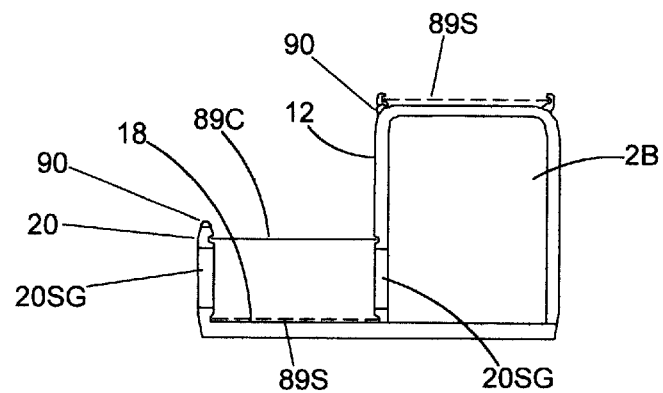

FIG. 28E shows an embodiment wherein the pickup bed covering panel 89C, in its covering position, is a panel slid in from the back of the vehicle along edge holding slots (as illustrated) or rails or brackets. Two pickup bed cover panel stowed positions 89S are shown, one above the roof of the at least partially enclosed body means 2B, and the other along the floor of the pickup or cargo bed 18. A third alternative would be to stow the panel remotely from the vehicle, e.g. hang it on a garage wall when it is not in use. Optional side gate or door means 20SG may be provided to access the enclosed pickup bed volume from the outside of the vehicle, or from the at least partially enclosed compartment means 2B through the side wall 12, as illustrated. Tie down reels or hooks 90 are also shown in this Figure, which serve as means for enabling a cargo load to be secured in said cargo bed 18, when the cover panel is not installed in its covering position. The embodiment of FIG. 28E (and other embodiments) could also incorporate slide-in substantially vertical partitions such as 87V illustrated earlier in FIG. 27E.

Figure 28F:
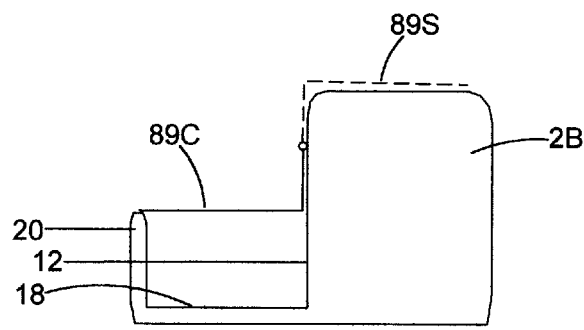

FIG. 28F shows an embodiment of the invention similar to the embodiment of FIG. 28B, but with a higher location for a hingeline for the cover panel, and a cover panel geometry including a substantially right-angle joint between two panel component members. A hinge may optionally be provided at this joint to minimize vertical height of the vehicle with the cover panel while the cover panel is being deployed or retracted. The pickup bed cover panel in its covering position is designated 89C, and the pickup bed cover panel in its stowed or noncovering position is designated 89S, and shown in dashed lines. Note that in its stowed position the cover panel goes above the roof of the at least partially enclosed compartment means 2B, as illustrated.

Figure 28G:
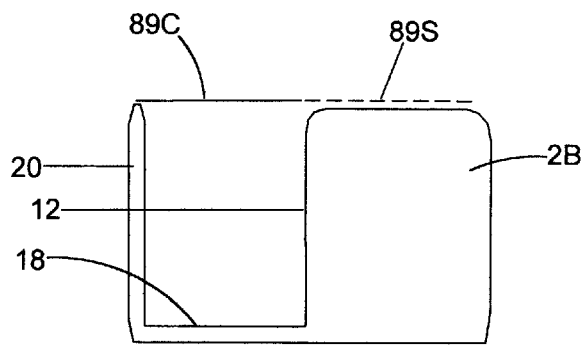

FIG. 28G illustrates another variant embodiment similar to FIG. 28F, but with a very high cargo bed side wall means 20 and the use of a substantially flat cover panel in both its covering position 89C and its stowed position 89S. The cover panel may be rotated or slid from its covering to its stowed position, in variants of this embodiment.

Figure 28H:
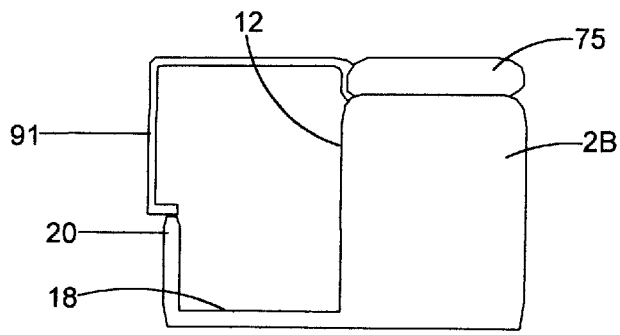

FIG. 28H illustrates an embodiment with a preferably detachable camper body 91 installed above the pickup or cargo bed 18. The preferably detachable camper body 91 serves as nonpermanent means for covering the top of said cargo bed on an as-desired basis. Typical camper amenities such as bed(s), cooking facilities, and/or bathroom facilities may also be installed along with the camper body 91. The seats in at least partially enclosed compartment means 2B may also recline or fold flat to provide more sleeping capacity, and passage means for moving from the camper means into the at least partially enclosed compartment means 2B and vice-versa, may be provided.

Figure 28I:
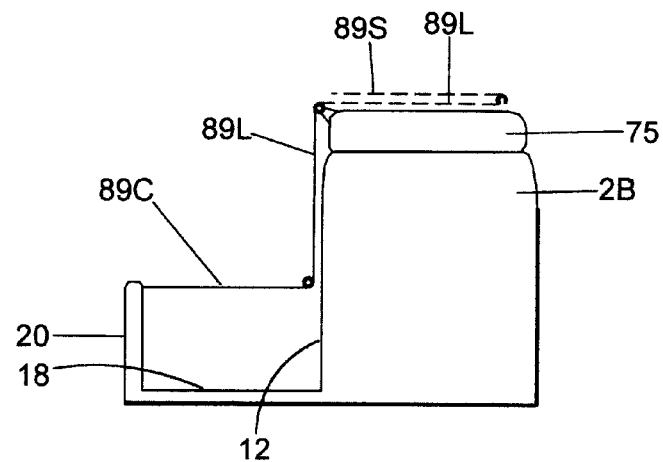

FIG. 28I illustrates an embodiment somewhat similar to FIG. 28F. Again, the pickup bed cover panel in its covering position is designated 89C, and the pickup bed cover panel in its stowed or noncovering position is designated 89S, and shown in dashed lines. In this embodiment a cover panel linkage mechanism 89L including a connecting panel or framework connects the cover panel to the vehicle through a double hinge mechanism, as illustrated. Alternate hinge mechanisms are also possible within the spirit and scope of the invention.

Figure 28J:
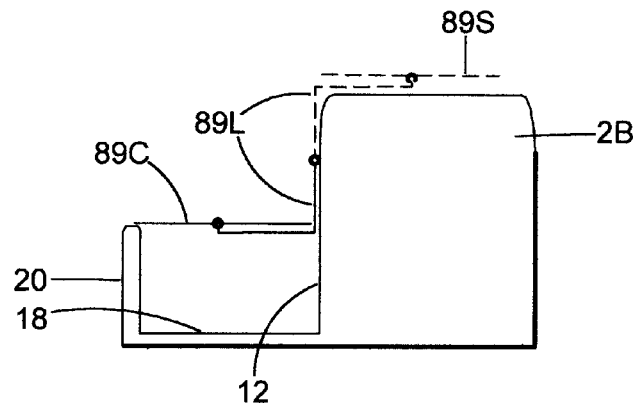

FIG. 28J illustrates yet another cover panel and linkage configuration. Again, the pickup bed cover panel in its covering position is designated 89C, and the pickup bed cover panel in its stowed or noncovering position is designated 89S, and shown in dashed lines. In this embodiment the cover panel linkage mechanism 89L including a connecting framework with a substantially right-angle joint, connects the cover panel to the vehicle through a double hinge mechanism, as illustrated. Alternate hinge mechanisms are also possible within the spirit and scope of the invention.

While certain preferred embodiments of the invention have been described in detail above, it should be understood that further modifications and variations are possible within the spirit and scope of the invention as claimed.

What is claimed is:

1. A motor vehicle comprising:
    running gear means for permitting said motor vehicle to move and maneuver upon a road surface;
    a vehicle body with a substantially enclosed compartment surrounding the driver's seat, said compartment having an extension extending rearwardly to a rear end of said body, said extension having a first side wall, a rear wall, and a second side wall, said second side wall spaced inwardly of an outer perimeter of the body;
    a roof extending over said enclosed compartment above the driver's seat and above the compartment extension to a rear end of the body; and
    an open top cargo bed bounded at a forward edge by a rear wall of said enclosed compartment and at one side edge by said second side wall.

2. The motor vehicle of claim 1, wherein said extension contains seating for passengers.

3. The motor vehicle of claim 1, wherein said first side wall is spaced inwardly of the outer perimeter of the body.

4. The motor vehicle of claim 3, further comprising a second open top cargo bed bounded by said rear wall of the enclosed compartment and said first side wall.

5. The motor vehicle of claim 1, further comprising a second compartment extension extending rearwardly from the enclosed compartment rear wall and bounded at one side by the cargo bed and at another side substantially by the outer periphery of the vehicle body.

6. The motor vehicle of claim 1, further comprising a rooftop storage compartment.

7. The motor vehicle of claim 1, further comprising a storage compartment within said enclosed compartment.

8. The motor vehicle of claim 1, further comprising a storage compartment in said cargo bed.

9. The motor vehicle of claim 8, further comprising means for retracting the structure of said storage compartment to a configuration occupying less space in said cargo bed.

10. The motor vehicle of claim 1, further comprising means for repositioning at least one of said second wall and said rear wall of said enclosed compartment, and for changing the size of said cargo bed concurrently.

11. The motor vehicle of claim 1, with wall means and gate means for enclosing the perimeter of said cargo bed, and with gate movement means for enabling said gate means to be moved to an alternate nonenclosing position so as to facilitate loading and unloading of cargo onto and from said cargo bed.

12. The motor vehicle of claim 1, further comprising nonpermanent means for covering the top of said cargo bed on an as-desired basis.

13. The motor vehicle of claim 1, further comprising securing means for securing articles on said cargo bed.

14. The motor vehicle of claim 1, wherein said running gear means includes at least three tires which normally contact said road surface.

15. The motor vehicle of claim 14, wherein said tires include a tire which is located substantially to a side of said cargo bed with the outer face of said tire located outboard of the corresponding side of said body.

16. The motor vehicle of claim 1, further comprising door means for permitting entry into and egress from said substantially enclosed compartment.

17. The motor vehicle of claim 16, wherein said door means includes at least two doors on one side of said substantially enclosed compartment, at least one door on the other side of said substantially enclosed compartment, and at least one door at the back of said substantially enclosed compartment, all in conjunction to provide easy entry into and egress from various seats housed in said substantially enclosed compartment.

* * * * *